US012456533B2

(12) United States Patent
Wang et al.

(10) Patent No.: US 12,456,533 B2
(45) Date of Patent: Oct. 28, 2025

(54) SHIFT REGISTER AND DRIVING METHOD THEREFOR, AND DISPLAY SUBSTRATE AND DISPLAY APPARATUS

(71) Applicant: BOE Technology Group Co., Ltd., Beijing (CN)

(72) Inventors: Zhichong Wang, Beijing (CN); Peng Liu, Beijing (CN); Jing Feng, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/689,081

(22) PCT Filed: Aug. 23, 2022

(86) PCT No.: PCT/CN2022/114317
§ 371 (c)(1),
(2) Date: Mar. 5, 2024

(87) PCT Pub. No.: WO2024/040442
PCT Pub. Date: Feb. 29, 2024

(65) Prior Publication Data
US 2025/0131968 A1    Apr. 24, 2025

(51) Int. Cl.
*G11C 19/28* (2006.01)
*G09G 3/3233* (2016.01)
(Continued)

(52) U.S. Cl.
CPC ......... *G11C 19/287* (2013.01); *G09G 3/3233* (2013.01); *H10K 59/131* (2023.02);
(Continued)

(58) Field of Classification Search
CPC ............... G11C 19/287; G09G 3/3233; G09G 2300/0408; G09G 2300/0426;
(Continued)

(56) References Cited

U.S. PATENT DOCUMENTS 11,276,364 B2 *  3/2022  Li ........................... G11C 19/28
11,893,922 B2 *  2/2024  Guo ....................... G11C 19/28
(Continued)

FOREIGN PATENT DOCUMENTS

CN   101048871 A   10/2007
CN   105304013 A   2/2016
(Continued)

OTHER PUBLICATIONS

International Search Report for PCT/CN2022/114317 Mailed Feb. 22, 2023.

*Primary Examiner* — Douglas Wilson
(74) *Attorney, Agent, or Firm* — Ling Wu; Stephen Yang; Ling and Yang Intellectual Property

(57) ABSTRACT

Disclosed is a shift register, comprising: a first control sub-circuit, which provides a signal of a signal input end for a first node; a second control sub-circuit, which provides a signal of a second power source end or a signal of the first clock signal end for the second node; a third control sub-circuit, which provides a signal of the second clock signal end or a signal of the first power source end for a fourth node and maintains the potential of the fourth node; a first output sub-circuit, which provides the signal of the first power source end or the signal of the second power source end for a first signal output end; and a second output sub-circuit, which provides the signal of the first power source end or the signal of the second power source end for a second signal output end.

20 Claims, 13 Drawing Sheets

(51) Int. Cl.
*H10K 59/131* (2023.01)
*H01L 21/77* (2017.01)
*H10K 59/12* (2023.01)
*H10K 71/20* (2023.01)

(52) U.S. Cl.
CPC ............... *G09G 2300/0408* (2013.01); *G09G 2300/0426* (2013.01); *G09G 2300/0819* (2013.01); *G09G 2300/0842* (2013.01); *G09G 2310/0286* (2013.01); *G09G 2310/08* (2013.01); *H01L 21/77* (2013.01); *H10K 59/1201* (2023.02); *H10K 71/20* (2023.02)

(58) Field of Classification Search
CPC ... G09G 2300/0819; G09G 2300/0842; G09G 2300/0861; G09G 2310/0286; G09G 2310/08; H10K 59/131; H10K 59/1201; H10K 71/20; H01L 21/77
See application file for complete search history.

(56) References Cited

U.S. PATENT DOCUMENTS

| | | | |
|---|---|---|---|
| 2011/0292007 A1 | 12/2011 | Ohhashi | |
| 2017/0004760 A1* | 1/2017 | Jang | G09G 3/3677 |
| 2017/0110050 A1* | 4/2017 | Park | G09G 3/3208 |

FOREIGN PATENT DOCUMENTS

| | | | |
|---|---|---|---|
| CN | 105304013 B | * | 1/2018 |
| CN | 111540313 A | | 8/2020 |
| CN | 214541584 U | | 10/2021 |
| CN | 113707086 A | | 11/2021 |
| CN | 113707087 A | | 11/2021 |
| CN | 113920924 A | | 1/2022 |
| CN | 113971932 A | | 1/2022 |
| CN | 114299884 A | | 4/2022 |
| CN | 114333706 A | | 4/2022 |

* cited by examiner

SHIFT REGISTER AND DRIVING METHOD THEREFOR, AND DISPLAY SUBSTRATE AND DISPLAY APPARATUS

CROSS-REFERENCE TO RELATED APPLICATION

The present application is a U.S. National Phase Entry of International Application No. PCT/CN2022/114317 having an international filing date of Aug. 23, 2022. The entire contents of the above-identified application are hereby incorporated by reference.

TECHNICAL FIELD

The present disclosure relates, but is not limited to, the field of display technologies, in particular to a shift register and a drive method thereof, a display substrate, and a display apparatus.

BACKGROUND

An Organic Light Emitting Diode (OLED) and a Quantum dot Light Emitting Diode (QLED) are active light emitting display devices and have advantages such as self-luminescence, a wide viewing angle, a high contrast ratio, low power consumption, an extremely high response speed, lightness and thinness, flexibility, and a low cost. With constant development of display technologies, a flexible display apparatus (Flexible Display) in which an OLED or a QLED is used as a light emitting device and signal control is performed through a Thin Film Transistor (TFT) has become a mainstream product in the field of display at present. A drive circuit is an important auxiliary circuit in the OLED.

SUMMARY

The following is a summary of subject matter described herein in detail. The summary is not intended to limit the scope of protection of claims.

In a first aspect, an embodiment of the present disclosure provides a shift register including a first control sub-circuit, a second control sub-circuit, a third control sub-circuit, a first output sub-circuit, and a second output sub-circuit.

The first control sub-circuit is respectively connected with a signal input terminal, a first node, a second node, a first clock signal terminal, a second clock signal terminal, and a first power supply terminal, and is configured to provide a signal of the signal input terminal to the first node under control of the first clock signal terminal, the second clock signal terminal, the second node, and the first power supply terminal and maintain a potential of the first node.

The second control sub-circuit is respectively connected with a second power supply terminal, the first clock signal terminal, the first node, and the second node, and is configured to provide a signal of the second power supply terminal or the first clock signal terminal to the second node under control of the first clock signal terminal and the first node.

The third control sub-circuit is respectively connected with the first node, the second node, a fourth node, the second clock signal terminal, and the first power supply terminal, and is configured to provide a signal of the second clock signal terminal or the first power supply terminal to the fourth node under control of the second clock signal terminal, the first node, and the second node and maintain a potential of the fourth node.

The first output sub-circuit is respectively connected with the first power supply terminal, the second power supply terminal, the first node, the fourth node, and a first signal output terminal, and is configured to provide a signal of the first power supply terminal or the second power supply terminal to the first signal output terminal under control of the first node and the fourth node.

The second output sub-circuit is connected with the first signal output terminal, the third control sub-circuit, the first power supply terminal, the second power supply terminal, and a second signal output terminal, respectively, and is configured to provide a signal of the first power supply terminal or the second power supply terminal to the second signal output terminal under control of the third control sub-circuit and the first signal output terminal.

In an exemplary implementation mode, the first control sub-circuit includes a first transistor, a fourth transistor, a fifth transistor, and a first capacitor, and the first capacitor includes a first electrode plate and a second electrode plate.

A control electrode of the first transistor is connected with the first clock signal terminal, a first electrode of the first transistor is connected with the signal input terminal, and a second electrode of the first transistor is connected with the first node.

A control electrode of the fourth transistor is connected with the second node, a first electrode of the fourth transistor is connected with the first power supply terminal, and a second electrode of the fourth transistor is connected with a seventh node.

A control electrode of the fifth transistor is connected with the second clock signal terminal, a first electrode of the fifth transistor is connected with the seventh node, and a second electrode of the fifth transistor is connected with the first node.

The first electrode plate of the first capacitor is connected with the first node, and the second electrode plate of the first capacitor is connected with the second clock signal terminal.

In an exemplary implementation mode, the first control sub-circuit includes a first transistor, a fourth transistor, a fifth transistor, a first capacitor, and a fourth capacitor, the first capacitor includes a first electrode plate and a second electrode plate, and the fourth capacitor includes a first electrode plate and a second electrode plate.

A control electrode of the first transistor is connected with the first clock signal terminal, a first electrode of the first transistor is connected with the signal input terminal, and a second electrode of the first transistor is connected with the first node.

A control electrode of the fourth transistor is connected with the second node, a first electrode of the fourth transistor is connected with the first power supply terminal, and a second electrode of the fourth transistor is connected with a seventh node.

A control electrode of the fifth transistor is connected with the first node, a first electrode of the fifth transistor is connected with the second clock signal terminal, and a second electrode of the fifth transistor is connected with the seventh node.

The first electrode plate of the first capacitor is connected with the first node, and the second electrode plate of the first capacitor is connected with the first signal output terminal.

The first electrode plate of the fourth capacitor is connected with the seventh node, and the second electrode plate of the fourth capacitor is connected with the first node.

In an exemplary implementation mode, the second control sub-circuit includes a second transistor and a third transistor.

A control electrode of the second transistor is connected with the first clock signal terminal, a first electrode of the second transistor is connected with the second power supply terminal, and a second electrode of the second transistor is connected with the second node.

A control electrode of the third transistor is connected with the first node, a first electrode of the third transistor is connected with the first clock signal terminal, and a second electrode of the third transistor is connected with the second node.

In an exemplary implementation mode, the third control sub-circuit includes a sixth transistor, a seventh transistor, an eighth transistor, a second capacitor, and a third capacitor.

A control electrode of the sixth transistor is connected with the second node, a first electrode of the sixth transistor is connected with the second clock signal terminal, and a second electrode of the sixth transistor is connected with a third node.

A control electrode of the seventh transistor is connected with the second clock signal terminal, a first electrode of the seventh transistor is connected with the third node, and a second electrode of the seventh transistor is connected with the fourth node.

A control electrode of the eighth transistor is connected with the first node, a first electrode of the eighth transistor is connected with the first power supply terminal, and a second electrode of the eighth transistor is connected with the fourth node.

A first electrode plate of the second capacitor is connected with the second node, and a second electrode plate of the second capacitor is connected with the third node.

A first electrode plate of the third capacitor is connected with the fourth node, and a second electrode plate of the third capacitor is connected with the first power supply terminal.

In an exemplary implementation mode, the first output sub-circuit includes a ninth transistor and a tenth transistor.

A control electrode of the ninth transistor is connected with the fourth node, a first electrode of the ninth transistor is connected with the first power supply terminal, and a second electrode of the ninth transistor is connected with the first signal output terminal.

A control electrode of the tenth transistor is connected with the first node, a first electrode of the tenth transistor is connected with the second power supply terminal, and a second electrode of the tenth transistor is connected with the first signal output terminal.

In an exemplary implementation mode, the second output sub-circuit includes an eleventh transistor, a twelfth transistor, a thirteenth transistor, and a fourteenth transistor.

A control electrode of the eleventh transistor is connected with the third control sub-circuit, a first electrode of the eleventh transistor is connected with the second power supply terminal, and a second electrode of the eleventh transistor is connected with a sixth node.

A control electrode of the twelfth transistor is connected with the first signal output terminal, a first electrode of the twelfth transistor is connected with the first power supply terminal, and a second electrode of the twelfth transistor is connected with the sixth node.

A control electrode of the thirteenth transistor is connected with the sixth node, a first electrode of the thirteenth transistor is connected with the second power supply terminal, and a second electrode of the thirteenth transistor is connected with the second signal output terminal.

A control electrode of the fourteenth transistor is connected with the first signal output terminal, a first electrode of the fourteenth transistor is connected with the first power supply terminal, and a second electrode of the fourteenth transistor is connected with the second signal output terminal.

In an exemplary implementation mode, the second output sub-circuit further includes a fifth capacitor, and the fifth capacitor includes a first electrode plate and a second electrode plate.

The first electrode plate of the fifth capacitor is connected with the sixth node, and the second electrode plate of the fifth capacitor is connected with the first clock signal terminal or the second clock signal terminal.

In an exemplary implementation mode, the first control sub-circuit includes a first transistor, a fourth transistor, a fifth transistor, and a first capacitor, and the first capacitor includes a first electrode plate and a second electrode plate; the second control sub-circuit includes a second transistor and a third transistor; the third control sub-circuit includes a sixth transistor, a seventh transistor, an eighth transistor, a second capacitor, and a third capacitor; the first output sub-circuit includes a ninth transistor and a tenth transistor; the second output sub-circuit includes an eleventh transistor, a twelfth transistor, a thirteenth transistor, and a fourteenth transistor.

A control electrode of the first transistor is connected with the first clock signal terminal, a first electrode of the first transistor is connected with the signal input terminal, and a second electrode of the first transistor is connected with the first node.

A control electrode of the second transistor is connected with the first clock signal terminal, a first electrode of the second transistor is connected with the second power supply terminal, and a second electrode of the second transistor is connected with the second node.

A control electrode of the third transistor is connected with the first node, a first electrode of the third transistor is connected with the first clock signal terminal, and a second electrode of the third transistor is connected with the second node.

A control electrode of the fourth transistor is connected with the second node, a first electrode of the fourth transistor is connected with the first power supply terminal, and a second electrode of the fourth transistor is connected with a seventh node.

A control electrode of the fifth transistor is connected with the second clock signal terminal, a first electrode of the fifth transistor is connected with the seventh node, and a second electrode of the fifth transistor is connected with the first node.

A control electrode of the sixth transistor is connected with the second node, a first electrode of the sixth transistor is connected with the second clock signal terminal, and a second electrode of the sixth transistor is connected with a third node.

A control electrode of the seventh transistor is connected with the second clock signal terminal, a first electrode of the seventh transistor is connected with the third node, and a second electrode of the seventh transistor is connected with the fourth node.

A control electrode of the eighth transistor is connected with the first node, a first electrode of the eighth transistor is connected with the first power supply terminal, and a second electrode of the eighth transistor is connected with the fourth node.

A control electrode of the ninth transistor is connected with the fourth node, a first electrode of the ninth transistor is connected with the first power supply terminal, and a second electrode of the ninth transistor is connected with the first signal output terminal.

A control electrode of the tenth transistor is connected with the first node, a first electrode of the tenth transistor is connected with the second power supply terminal, and a second electrode of the tenth transistor is connected with the first signal output terminal.

A control electrode of the eleventh transistor is connected with the third node or the fourth node, a first electrode of the eleventh transistor is connected with the second power supply terminal, and a second electrode of the eleventh transistor is connected with a sixth node.

A control electrode of the twelfth transistor is connected with the first signal output terminal, a first electrode of the twelfth transistor is connected with the first power supply terminal, and a second electrode of the twelfth transistor is connected with the sixth node.

A control electrode of the thirteenth transistor is connected with the sixth node, a first electrode of the thirteenth transistor is connected with the second power supply terminal, and a second electrode of the thirteenth transistor is connected with the second signal output terminal.

A control electrode of the fourteenth transistor is connected with the first signal output terminal, a first electrode of the fourteenth transistor is connected with the first power supply terminal, and a second electrode of the fourteenth transistor is connected with the second signal output terminal.

The first electrode plate of the first capacitor is connected with the first node, and the second electrode plate of the first capacitor is connected with the second clock signal terminal.

A first electrode plate of the second capacitor is connected with the second node, and a second electrode plate of the second capacitor is connected with the third node.

A first electrode plate of the third capacitor is connected with the fourth node, and a second electrode plate of the third capacitor is connected with the first power supply terminal.

In an exemplary implementation mode, the first transistor to the fourteenth transistor are P-type transistors.

In an exemplary implementation mode, a signal output by the first signal output terminal and a signal output by the second signal output terminal are mutually inverted signals.

In a second aspect, an embodiment of the present disclosure also provides a display substrate including a base substrate and a circuit structure layer disposed on the base substrate, the circuit structure layer includes a light emitting drive circuit, and the light emitting drive circuit includes a plurality of cascaded shift registers.

A first signal output terminal of a shift register in an i-th stage is electrically connected with a signal input terminal of a shift register in an (i+1)-th stage, wherein $1 \le i \le M-1$ and M is a total number of stages of the shift registers.

At least one shift register includes a first control sub-circuit, a second control sub-circuit, a third control sub-circuit, a first output sub-circuit, and a second output sub-circuit.

The first control sub-circuit is respectively connected with a signal input terminal, a first node, a second node, a first clock signal terminal, a second clock signal terminal, and a first power supply terminal, and is configured to provide a signal of the signal input terminal to the first node under control of the first clock signal terminal, the second clock signal terminal, the second node, and the first power supply terminal and maintain a potential of the first node.

The second control sub-circuit is respectively connected with a second power supply terminal, the first clock signal terminal, the first node, and the second node, and is configured to provide a signal of the second power supply terminal or the first clock signal terminal to the second node under control of the first clock signal terminal and the first node.

The third control sub-circuit is respectively connected with the first node, the second node, a fourth node, the second clock signal terminal, and the first power supply terminal, and is configured to provide a signal of the second clock signal terminal or the first power supply terminal to the fourth node under control of the second clock signal terminal, the first node, and the second node and maintain a potential of the fourth node.

The first output sub-circuit is respectively connected with the first power supply terminal, the second power supply terminal, the first node, the fourth node, and the first signal output terminal, and is configured to provide a signal of the first power supply terminal or the second power supply terminal to the first signal output terminal under control of the first node and the fourth node.

The second output sub-circuit is connected with the first signal output terminal, the third control sub-circuit, the first power supply terminal, the second power supply terminal, and the second signal output terminal, respectively, and is configured to provide a signal of the first power supply terminal or the second power supply terminal to the second signal output terminal under control of the third control sub-circuit and the first signal output terminal.

In an exemplary implementation mode, the display substrate further includes: an initial signal line, a first clock signal line, a second clock signal line, a second power supply line, and a third power supply line extending along a second direction, the initial signal line, the first clock signal line, the second clock signal line, the third power supply line, and the second power supply line are arranged along a first direction, and the first direction intersects with the second direction.

A signal input terminal of a shift register in a first stage is electrically connected with the initial signal line, first power supply terminals of all shift registers are electrically connected with the third power supply line, second power supply terminals of all shift registers are electrically connected with the second power supply line, first clock signal terminals of shift registers in odd-numbered stages are connected with the first clock signal line, second clock signal terminals of shift registers in odd-numbered stages are connected with the second clock signal line, first clock signal terminals of shift registers in even-numbered stages are connected with the second clock signal line, and second clock signal terminals of shift registers in even-numbered stages are connected with the first clock signal line.

In an exemplary implementation mode, the circuit structure layer includes: a semiconductor layer, a first insulation layer, a first conductive layer, a second insulation layer, a second conductive layer, a third insulation layer, and a third conductive layer which are sequentially stacked on the base substrate.

The semiconductor layer includes: active layers of all transistors located in the light emitting drive circuit.

The first conductive layer includes: control electrodes of all transistors and a first electrode plate of a first capacitor to a first electrode plate of a third capacitor located in the light emitting drive circuit.

The second conductive layer includes a second electrode plate of the first capacitor to a second electrode plate of the third capacitor located in the light emitting drive circuit.

The third conductive layer includes an initial signal line, a first clock signal line, a second clock signal line, a first power supply line, and a second power supply line.

In an exemplary implementation mode, the third conductive layer further includes first electrodes and second electrodes of all transistors located in the light emitting drive circuit.

In an exemplary implementation mode, the shift register includes: a first transistor to a fourteenth transistor.

In a plane where the display substrate is located, in the first direction, all transistors and capacitors are located between the third power supply line and the second power supply line, a second capacitor is located between the third power supply line and an eighth transistor, the eighth transistor is located between the second capacitor and, a ninth transistor and a tenth transistor, the ninth transistor and the tenth transistor are located between the eighth transistor and, an eleventh transistor and a twelfth transistor, the eleventh transistor and the twelfth transistor are located between the ninth transistor and the tenth transistor and a thirteenth transistor and the fourteenth transistor, and the thirteenth transistor and the fourteenth transistor are located between the eleventh transistor and the twelfth transistor and the second power supply line; in the second direction, the third capacitor, the ninth transistor, the tenth transistor, and the first capacitor are sequentially arranged along the second direction, the twelfth transistor and the eleventh transistor are sequentially arranged along the second direction, and the fourteenth transistor and the thirteenth transistor are sequentially arranged along the second direction.

In an exemplary implementation mode, the first conductive layer further includes the first power supply line; the first power supply line is in a shape of a broken line, the first power supply line is connected with the first power supply terminal and extends along the first direction.

On a plane parallel to the display substrate, in the first direction, the first power supply line is located on a side of the third capacitor away from a control electrode of the eighth transistor; in the second direction, the first power supply line is located on a side of a control electrode of the fourteenth transistor away from a control electrode of the thirteenth transistor.

In an exemplary implementation mode, an orthographic projection of the first power supply line on the base substrate is at least partially overlapped with orthographic projections of a first electrode of the ninth transistor, a first electrode of the twelfth transistor, and a first electrode of the fourteenth transistor on the base substrate, respectively.

A first electrode of the eighth transistor and a first electrode of the ninth transistor in the third conductive layer are of an integrally formed structure.

In an exemplary implementation mode, the first conductive layer further includes a first signal output line and a second signal output line; the first signal output line is in a shape of a strip and extends along the first direction, and the second signal output line is in an "L" shape.

In a plane where the first conductive layer is located, in the second direction, the first signal output line is located between the control electrode of the thirteenth transistor and the first power supply line, the first signal output line and the control electrode of the fourteenth transistor are of an integrally formed structure, and the second signal output line is located on a side of the first power supply line away from the first signal output line; in the first direction, the first signal output line is located on a side of the control electrode of the fourteenth transistor away from a control electrode of the twelfth transistor, and the second signal output line is located on a side of the first electrode plate of the third capacitor away from the control electrode of the eighth transistor.

In an exemplary implementation mode, the first conductive layer further includes a second connection line, the second connection line, the first electrode plate of the third capacitor, a control electrode of the ninth transistor are of an integrally formed structure, and a control electrode of the eleventh transistor is in an "L" shape.

The third conductive layer further includes a fourth connection line, and first electrodes and second electrodes of the first transistor to the fourteenth transistor, the fourth connection line is in a shape of a broken line and extends along the second direction, and an orthographic projection of the fourth connection line on the base substrate is at least partially overlapped with orthographic projections of the control electrode of the eleventh transistor and the first electrode plate of the third capacitor on the base substrate, respectively.

A second electrode of the ninth transistor includes a third structure and a fourth structure connected with each other, the third structure is in a shape of a strip and extends along the first direction, and is located between a second electrode of the eighth transistor and the fourth connection line, and is connected with the fourth structure at an end close to the fourth connection line; the fourth structure is in a shape of a strip and extends along the second direction, and one end close to the third structure is connected with the third structure.

In an exemplary implementation mode, a second electrode of the thirteenth transistor includes a fifth structure and a sixth structure connected with connected with each other, the fifth structure is in a shape of a strip and extends along the first direction, and is located between a first electrode of the thirteenth transistor and a first electrode of the fourteenth transistor; the sixth structure is in an "L" shape, is located between a first electrode of the fourteenth transistor and the second power supply line in the first direction, is connected with the fifth structure on a side close to the first electrode of the thirteenth transistor in the second direction, and an orthographic projection of the sixth structure on the base substrate is at least partially overlapped with an orthographic projection of the second signal output line on the base substrate.

The first electrode of the twelfth transistor and the first electrode of the fourteenth transistor are both in an "L" shape, and are located on a side of the fourth connection line away from the third power supply line.

In an exemplary implementation mode, the shift register includes: a first transistor to a fourteenth transistor.

In a plane where the display substrate is located, in the first direction, all transistors and capacitors are located between the third power supply line and the second power supply line, a second capacitor is located between the third power supply line and an eighth transistor, the eighth transistor is located between the second capacitor and, a ninth transistor and a tenth transistor, the ninth transistor and the tenth transistor are located between the eighth transistor and the second power supply line, an eleventh transistor and a twelfth transistor are located between the third power supply line and, a thirteenth transistor and the fourteenth transistor, and the thirteenth transistor and the fourteenth transistor are located between the eleventh transistor and the twelfth transistor and the second power supply line; in the second direction, the thirteenth transistor, the fourteenth transistor, the third capacitor, the ninth transistor, the tenth transistor, and the first capacitor are sequentially arranged along the second direction.

In an exemplary implementation mode, the first conductive layer further includes a first power supply line, the first power supply line is connected with the first power supply terminal; the first power supply line is in an "L" shape.

In a plane where the first conductive layer is located, in the first direction, the first power supply line is located on a side of the first electrode plate of the third capacitor away from a first electrode plate of the second capacitor; in the second direction, the first power supply line is located between a control electrode of the fourteenth transistor and the first electrode plate of the first capacitor.

In an exemplary implementation mode, an orthographic projection of the first power supply line on the base substrate is at least partially overlapped with an orthographic projection of the first electrode of the ninth transistor on the base substrate.

The first electrode of the eighth transistor and the first electrode of the ninth transistor in the third conductive layer are of an integrally formed structure.

In an exemplary implementation mode, the first conductive layer further includes a power supply connection line, and the second conductive layer further includes a first signal output line and a second signal output line; the first signal output line and the second signal output line are both in a shape of a broken line extending along the first direction.

In a plane where the second conductive layer is located, in the second direction, the first signal output line is located between a second electrode plate of the first capacitor and a second electrode plate of the third capacitor, and the second signal output line is located on a side of the second electrode plate of the third capacitor away from the second electrode plate of the first capacitor; in the first direction, both the first signal output line and the second signal output line are located on a side of the second electrode plate of the third capacitor away from a second electrode plate of the second capacitor.

The power supply connection line is in an "n" shape, in the second direction, the power supply connection line is located on a side of a control electrode of the thirteenth transistor away from a control electrode of the fourteenth transistor, and is provided with an opening facing away from a side of the thirteenth transistor; an orthographic projection of the power supply connection line on the base substrate is at least partially overlapped with orthographic projections of the second power supply line and a first electrode of the thirteenth transistor on the base substrate, respectively.

In an exemplary implementation mode, the first conductive layer further includes a second connection line, the second connection line is integrally formed with the first electrode plate of the third capacitor, a control electrode of the ninth transistor, and a control electrode of the eleventh transistor, the control electrode of the eleventh transistor is in an "n" shape and is provided with an opening facing a side of the twelfth transistor.

The third conductive layer further includes first electrodes and second electrodes of the first transistor to the fourteenth transistor, a second electrode of the ninth transistor includes a third structure, a fourth structure, and a ninth structure connected with each other, the third structure is in a shape of a strip and extends along the first direction, is located between a second electrode of the eighth transistor and the second power supply line, and is connected with the fourth structure at an end close to the second power supply line; the fourth structure is in a shape of a strip, is located on a side of the second power supply line close to the third power supply line, extends along the second direction, and one end close to the third structure is connected with the third structure; the ninth structure is in a shape of a strip and is located on a side of the fourth structure away from the second power supply line, and an orthographic projection of the fourth structure on the base substrate is at least partially overlapped with an orthographic projection of a control electrode of the fourth transistor on the base substrate.

In an exemplary implementation mode, the second electrode of the thirteenth transistor is of a strip structure and extends along the first direction, the first electrode of the thirteenth transistor includes a seventh structure and an eighth structure connected with each other, the seventh structure is in a shape of a strip and extends along the first direction, with one end connected with the first electrode of the eleventh transistor and the other end connected with the eighth structure; the eighth structure is of a square structure and is integrally formed with the seventh structure, and an orthographic projection of the eighth structure on the base substrate is at least partially overlapped with an orthographic projection of the power supply connection line on the base substrate.

First electrodes of the twelfth transistor and the fourteenth transistor are of strip structures extending along the first direction and connected with each other. One end of the first electrode of the twelfth transistor is connected with the third power supply line, and the other end is connected with the first electrode of the fourteenth transistor. The first electrode of the fourteenth transistor is located on a side of the first electrode of the twelfth transistor away from the third power supply line. The first electrode of the twelfth transistor and, the first electrode of the fourteenth transistor and the third power supply line are of an integrally formed structure.

In an exemplary implementation mode, the third conductive layer further includes a signal input line, the signal input line is in a shape of a broken line and extends along the first direction, in a plane where the third conductive layer is located and in the first direction, the signal input line is located between the third power supply line and the second power supply line; in the second direction, the signal input line is located on a side of the tenth transistor away from the ninth transistor.

In a plane where the second conductive layer is located, a second electrode plate of the second capacitor and the first electrode plate of the third capacitor are arranged along the first direction, and in the second direction, the second electrode plate of the second capacitor and the second electrode plate of the third capacitor are located on a same side of the second electrode plate of the first capacitor.

The second electrode plate of the first capacitor is in a shape of a broken line and extends along the first direction, and an orthographic projection of the second electrode plate of the first capacitor on the base substrate and an orthographic projection of the first electrode plate of the first capacitor on the base substrate have an overlapping region; the second electrode plate of the second capacitor is in a square shape, and an orthographic projection of the second electrode plate of the second capacitor on the base substrate and an orthographic projection of the first electrode plate of the second capacitor on the base substrate have an overlapping region; the second electrode plate of the third capacitor is in a shape of a strip and extends along the first direction, and an orthographic projection of the second electrode plate of the third capacitor on the base substrate and an orthographic projection of the first electrode plate of the third capacitor on the base substrate have an overlapping region.

In an exemplary implementation mode, the signal input line and the first electrode of the first transistor are of an integrally formed structure.

In an exemplary implementation mode, any one of the ninth transistor, the tenth transistor, the thirteenth transistor, and the fourteenth transistor includes four sub-transistors connected in parallel with each other, and in any one of the transistors, active layers of the four sub-transistors are disposed independently of each other, control electrodes of the four sub-transistors are of an integrally formed structure, first electrodes of the four sub-transistors are of an integrally formed structure, second electrodes of the four sub-transistors are of an integrally formed structure.

In an exemplary implementation mode, in the plane where the display substrate is located, in the first direction, the first transistor and the fourth transistor to the seventh transistor are located between the third power supply line and the second capacitor, and the second transistor and the third transistor are located between the fifth transistor and the first capacitor.

In an exemplary implementation mode, the third conductive layer includes first electrodes and second electrodes of the first transistor to the fourteenth transistor, a second electrode of the sixth transistor and a first electrode of the seventh transistor share one electrode, a second electrode of the ninth transistor and a second electrode of the tenth transistor share one electrode, and a second electrode of the thirteenth transistor and a second electrode of the fourteenth transistor share one electrode.

In an exemplary implementation mode, the first power supply line and the second power supply line provide a same power supply signal.

In a third aspect, an embodiment of the present disclosure also provides a display apparatus including the display substrate described in any of the above embodiments.

In a fourth aspect, an embodiment of the present disclosure also provides a drive method of a shift register, configured to drive the shift register described in any of the above embodiments, the method includes: providing, by a first control sub-circuit, a signal of a signal input terminal to a first node under control of a first clock signal terminal, a second clock signal terminal, a second node, and a first power supply terminal and maintaining a potential of the first node; providing, by a second control sub-circuit, a signal of a second power supply terminal or the first clock signal terminal to a second node under control of the first clock signal terminal and the first node; providing, by a third control sub-circuit, a signal of the second clock signal terminal or the first power supply terminal to a fourth node under control of the second clock signal terminal, the first node, and the second node and maintaining a potential of the fourth node; providing, by a first output sub-circuit, a signal of the first power supply terminal or the second power supply terminal to a first signal output terminal under control of the first node and the fourth node; and providing, by a second output sub-circuit, a signal of the first power supply terminal or the second power supply terminal to a second signal output terminal under control of the third control sub-circuit and the first signal output terminal.

After drawings and detailed description are read and understood, other aspects may be comprehended.

BRIEF DESCRIPTION OF DRAWINGS

Accompanying drawings are intended to provide a further understanding of technical solutions of the present disclosure and constitute a part of the specification, and are used for explaining the technical solutions of the present disclosure together with the embodiments of the present disclosure, and do not constitute limitations on the technical solutions of the present disclosure. A shape and a size of each component in the drawings do not reflect actual scales, and are only intended to schematically illustrate contents of the present disclosure.

DETAILED DESCRIPTION

Figure 1:
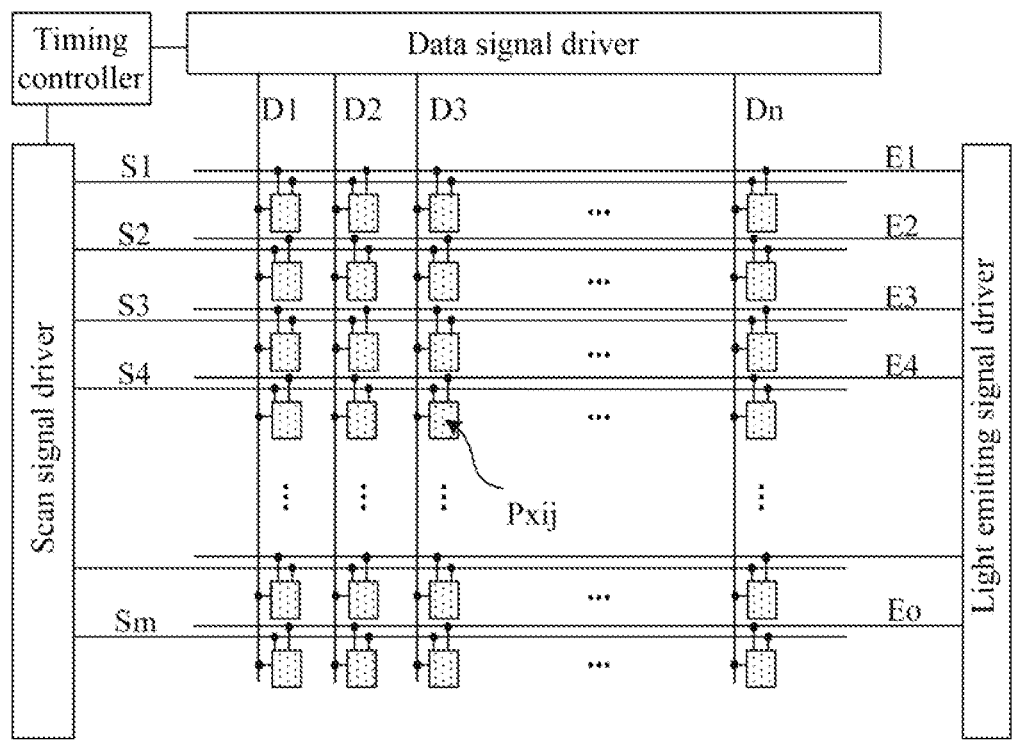
FIG. 1 is a schematic diagram of a structure of a display apparatus.

The embodiments of the present disclosure will be described in detail below with reference to the drawings. Implementation modes may be implemented in multiple different forms. Those of ordinary skill in the art may easily understand such a fact that modes and contents may be transformed into various forms without departing from the purpose and scope of the present disclosure. Therefore, the present disclosure should not be explained as being limited to contents recorded in following implementation modes only. The embodiments in the present disclosure and features in the embodiments may be randomly combined with each other in case of no conflict. In order to keep following description of the embodiments of the present disclosure clear and concise, detailed description of part of known functions and known components are omitted in the present disclosure. The drawings of the embodiments of the present disclosure relate only to structures involved in the embodiments of the present disclosure, and other structures may be referred to conventional designs.

A scale of the drawings in the present disclosure may be used as a reference in an actual process, but is not limited thereto. For example, a thickness and a pitch of each film layer, and a width and a pitch of each signal line may be adjusted according to an actual situation. The drawings described in the present disclosure are only schematic diagrams of structures, and one mode of the present disclosure is not limited to shapes or numerical values or the like shown in the drawings.

Ordinal numerals "first", "second", "third", etc., in the specification are set to avoid confusion of constituent elements, not to limit a quantity.

In the specification, for convenience, expressions "central", "up", "down", "front", "back", "vertical", "horizontal", "top", "bottom", "inside", "outside", etc., indicating orientations or positional relationships to explain positional relationships of constituent elements with reference to the drawings are only for convenience of describing the specification and simplifying the description, and do not indicate or imply that a referred apparatus or element must have a specific orientation and be structured and operated in the specific orientation, and thus cannot be understood as limitations on the present disclosure. The positional relationships of the constituent elements are changed as appropriate according to a direction of describing each constituent element. Therefore, it is not limited to the expressions described in the specification, and appropriate replacements may be made appropriately according to situations.

In the specification, unless otherwise specified and defined, terms "installation", "mutual connection", and "connection" should be generally understood. For example, it may be a fixed connection, or a detachable connection, or an integral connection. It may be a mechanical connection or electrical connection. It may be a direct connection, or an indirect connection through middleware, or communication inside two elements. Those of ordinary skill in the art may understand specific meanings of the above terms in the present disclosure according to specific situations.

In the specification, a transistor refers to an element that at least includes three terminals, i.e., a gate electrode, a drain electrode, and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that in the specification, the channel region refers to a region where a current mainly flows.

In the specification, a first electrode may be a drain electrode, and a second electrode may be a source electrode. Or, the first electrode may be a source electrode, and the second electrode may be a drain electrode. In a case that transistors with opposite polarities are used, or in a case that a direction of a current is changed during work of a circuit, or the like, functions of the "source electrode" and the "drain electrode" may sometimes be interchanged. Therefore, in the specification, the "source electrode" and the "drain electrode" may be interchanged, and a "source terminal" and a "drain terminal", may be interchanged. In an embodiment of the present disclosure, the gate electrode may be referred to as a control electrode.

In the specification, an "electrical connection" includes a case that constituent elements are connected together through an element with a certain electrical action. "An element with a certain electrical action" is not particularly limited as long as electrical signals between the connected constituent elements may be sent and received. Examples of "an element with a certain electrical action" not only include an electrode and a wiring, but also include a switching element such as a transistor, a resistor, an inductor, a capacitor, another element with various functions, etc.

In the specification, "parallel" refers to a state in which an angle formed by two straight lines is −10° or more and 102° or less, and thus also includes a state in which the angle is −5° or more and 5° or less. In addition, "perpendicular" refers to a state in which an angle formed by two straight lines is 80° or more and 100° or less, and thus also includes a state in which the angle is 85° or more and 95° or less.

In the specification, a "film" and a "layer" are interchangeable. For example, a "conductive layer" may be replaced with a "conductive film" sometimes. Similarly, an "insulation film" may be replaced with an "insulation layer" sometimes.

A triangle, rectangle, trapezoid, pentagon, or hexagon, etc. in the specification are not strictly defined, and it may be an approximate triangle, rectangle, trapezoid, pentagon, or hexagon, etc. There may be some small deformations caused by tolerance, and there may be a chamfer, an arc edge, deformation, etc.

In the embodiments of the present disclosure, "about" refers to that a boundary is not strictly defined and a numerical value within a range of process and measurement errors is allowed.

FIG. 1 is a schematic diagram of a structure of a display apparatus, the display apparatus may include a timing controller, a data signal driver, a scan signal driver, a light emitting signal driver, and a pixel array. The timing controller is connected with the data signal driver, the scan signal driver, and the light emitting signal driver, respectively, the data signal driver is connected with a plurality of data signal lines (D1 to Dn) respectively, the scan signal driver is connected with a plurality of scan signal lines (S1 to Sm) respectively, and the light emitting signal driver is connected with a plurality of light emitting signal lines (E1 to Eo) respectively. The pixel array may include a plurality of sub-pixels Pxij, wherein i and j may be natural numbers, at least one sub-pixel Pxij may include a circuit unit and a light emitting device connected with the circuit unit, and the circuit unit may include at least one scan signal line, at least one data signal line, at least one light emitting signal line, and a pixel drive circuit. In an exemplary implementation mode, the timing controller may provide a gray scale value and a control signal suitable for a specification of the data signal driver to the data signal driver, may provide a clock signal, and a scan start signal, etc., suitable for a specification of the scan signal driver to the scan signal driver, and may provide a clock signal, and an emission stop signal, etc., suitable for a specification of the light emitting signal driver to the light emitting signal driver. The data signal driver may generate a data voltage to be provided to the data signal lines D1, D2, D3, . . . , and Dn using the gray scale value and the control signal received from the timing controller. For example, the data signal driver may sample the gray scale value using a clock signal and apply a data voltage corresponding to the gray scale value to the data signal lines D1 to Dn by taking a pixel row as a unit, wherein n may be a natural number. The scan signal driver may generate a scan signal to be provided to the scan signal lines S1, S2, S3, . . . and Sm by receiving a clock signal, and a scan start signal, etc. and the like from the timing controller. For example, the scan signal driver may sequentially provide a scan signal with an on-level pulse to the scan signal lines S1 to Sm. For example, the scan signal driver may be constructed in a form of a shift register, and generate a scan signal in a manner of sequentially transmitting a scan start signal provided in a form of an on-level pulse to a next-stage circuit under control of a clock signal, wherein m may be a natural number. The light emitting signal driver may generate an emission signal to be provided to the light emitting signal lines E1, E2, E3, . . . , and Eo by receiving the clock signal, the emission stop signal, and the like from the timing controller. For example, the light emitting signal driver may sequentially provide an emission signal with an off-level pulse to the light emitting signal lines E1 to Eo. For example, the light emitting driver may be constructed in a form of a shift register and generate an emission signal in a manner of sequentially transmitting an emission stop signal provided in a form of an off-level pulse to a next-stage circuit under control of a clock signal, wherein o may be a natural number.

Figure 2:
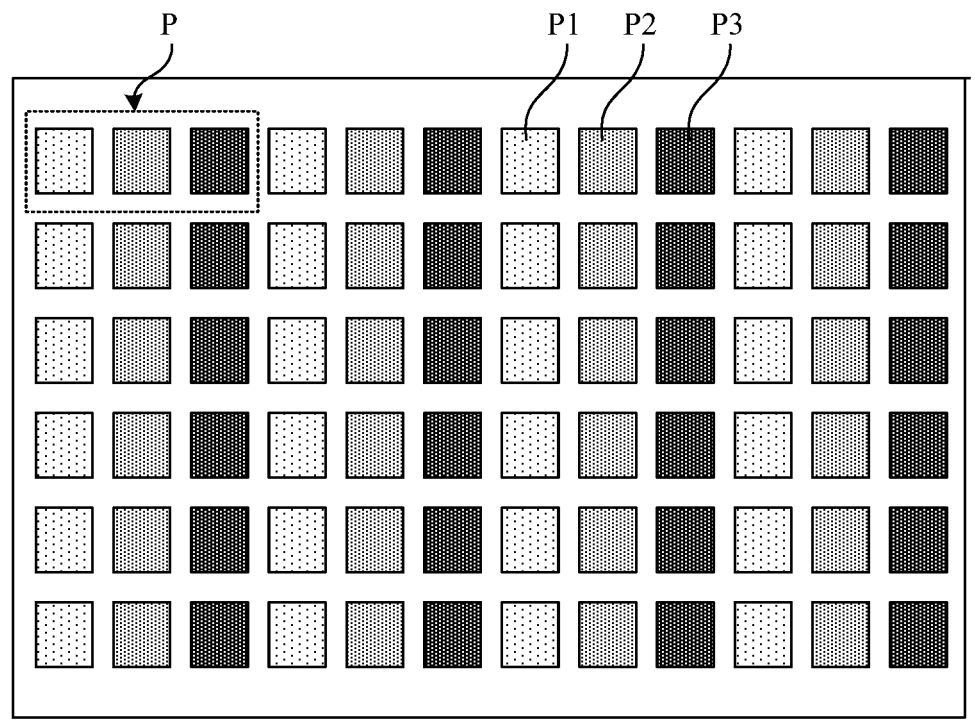
FIG. 2 is a schematic diagram of a planar structure of a display substrate.

FIG. 2 is a schematic diagram of a planar structure of a display substrate. As shown in FIG. 2, the display substrate may include a plurality of pixel units P arranged in a matrix, at least one of the plurality of pixel units P includes a first sub-pixel P1 emitting light of a first color, a second sub-pixel P2 emitting light of a second color, and a third sub-pixel P3 emitting light of a third color. The first sub-pixel P1, the second sub-pixel P2, and the third sub-pixel P3 each include a pixel drive circuit and a light emitting device. Pixel drive circuits in the first sub-pixel P1, the second sub-pixel P2, and the third sub-pixel P3 are connected with a scan signal line, a data signal line, and a light emitting signal line respectively. A pixel drive circuit is configured to receive a data voltage transmitted by the data signal line under control of the scan signal line and the light emitting signal line, and output a corresponding current to the light emitting device. Light emitting devices in the first sub-pixel P1, the second sub-pixel P2, and the third sub-pixel P3 are respectively connected with a pixel drive circuit of a sub-pixel where a light emitting device is located, and the light emitting device is configured to emit light with corresponding brightness in response to a current output by the pixel drive circuit of the sub-pixel where the light-emitting device is located.

In an exemplary embodiment, a red (R) sub-pixel, a green (G) sub-pixel, and a blue (B) sub-pixel may be included in a pixel unit P. In an exemplary implementation mode, a sub-pixel in the pixel unit may be in a shape of a rectangle, a rhombus, a pentagon, or a hexagon. Three sub-pixels may be arranged side by side horizontally, side by side vertically, or in a manner like a Chinese character "品", which is not limited in the present disclosure.

Figure 3:
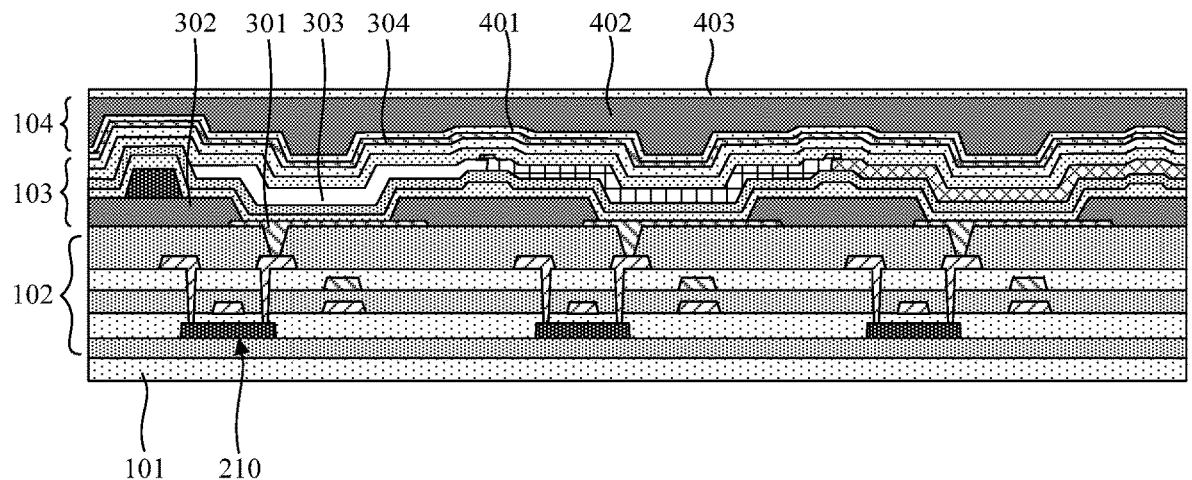
FIG. 3 is a schematic diagram of a cross-sectional structure of a display substrate.

FIG. 3 is a schematic diagram of a cross-sectional structure of a display substrate, which illustrates a structure of three sub-pixels of an OLED display substrate. As shown in FIG. 3, on a plane perpendicular to the display substrate, the display substrate may include a drive circuit layer 102 disposed on a base substrate 101, a light emitting structure layer 103 disposed on a side of the drive circuit layer 102 away from the base substrate 101, and an encapsulation layer 104 disposed on a side of the light emitting structure layer 103 away from the base substrate 101. In some possible implementation modes, the display substrate may include another film layer, such as a post spacer, which is not limited in the present disclosure.

In an exemplary implementation mode, the base substrate 101 may be a flexible base substrate, or may be a rigid base substrate. The drive circuit layer 102 of each sub-pixel may include a plurality of transistors and a storage capacitor constituting a pixel drive circuit. The light emitting structure layer 103 may include an anode 301, a pixel definition layer 302, an organic emitting layer 303, and a cathode 304. The anode 301 is connected with a drain electrode of a drive transistor 210 through a via, the organic emitting layer 303 is connected with the anode 301, and the cathode 304 is connected with the organic emitting layer 303. The organic emitting layer 303 emits light of a corresponding color under drive of the anode 301 and the cathode 304. The encapsulation layer 104 may include a first encapsulation layer 401, a second encapsulation layer 402, and a third encapsulation layer 403 that are stacked. The first encapsulation layer 401 and the third encapsulation layer 403 may be made of an inorganic material, the second encapsulation layer 402 may be made of an organic material, and the second encapsulation layer 402 is disposed between the first encapsulation layer 401 and the third encapsulation layer 403 so as to prevent external water vapor from entering the light-emitting structure layer 103.

In an exemplary implementation mode, the organic emitting layer 303 may include a Hole Injection Layer (HIL), a Hole Transport Layer (HTL), an Electron Block Layer (EBL), an Emitting Layer (EML), a Hole Block Layer (HBL), an Electron Transport Layer (ETL), and an Electron Injection Layer (EIL) which are stacked. In an exemplary implementation mode, hole injection layers of all sub-pixels may be connected together to be a common layer, electron injection layers of all the sub-pixels may be connected together to be a common layer, hole transport layers of all the sub-pixels may be connected together to be a common layer, electron transport layers of all the sub-pixels may be connected together to be a common layer, hole block layers of all the sub-pixels may be connected together to be a common layer, emitting layers of adjacent sub-pixels may be overlapped slightly or may be isolated, and electron block layers of adjacent sub-pixels may be overlapped slightly or may be isolated.

Figure 4:
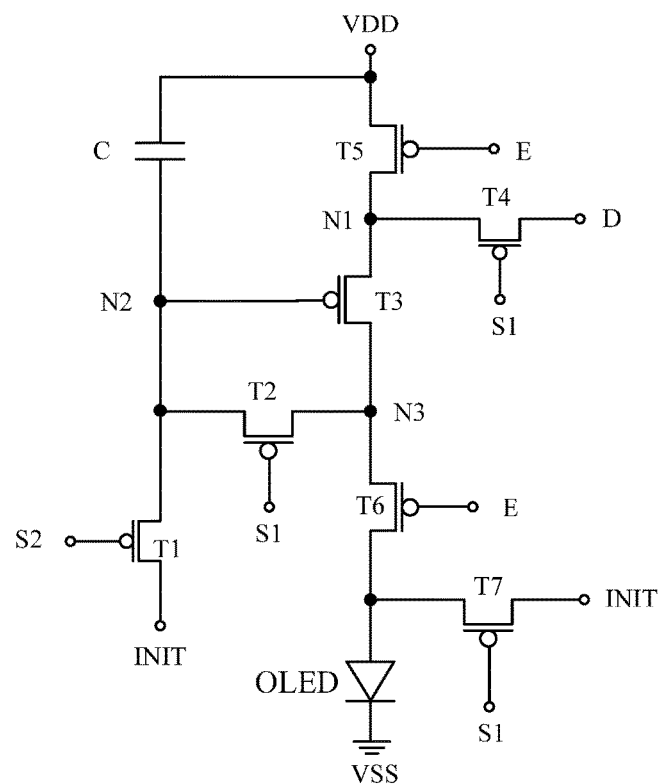
FIG. 4 is a schematic diagram of an equivalent circuit of a pixel drive circuit.

In an exemplary implementation mode, the pixel drive circuit may be of a structure of 3T1C, 4T1C, 5T1C, 5T2C, 6T1C, or 7T1C. FIG. 4 is a schematic diagram of an equivalent circuit of a pixel drive circuit. As shown in FIG. 4, the pixel drive circuit may include seven transistors (a first transistor T1 to a seventh transistor T7) and one storage capacitor C, and the pixel drive circuit may be connected with seven signal lines (a data signal line D, a first scan signal line S1, a second scan signal line S2, a light emitting signal line E, an initial signal line INIT, a first power supply line VDD, and a second power supply line VSS).

In an exemplary implementation mode, the pixel drive circuit may include a first node N1, a second node N2, and a third node N3. The first node N1 is connected with a first electrode of the third transistor T3, a second electrode of the fourth transistor T4, and a second electrode of the fifth transistor T5 respectively. The second node N2 is connected with a second electrode of the first transistor T1, a first electrode of the second transistor T2, a control electrode of the third transistor T3, and a second terminal of the storage capacitor C respectively. The third node N3 is connected with a second electrode of the second transistor T2, a second electrode of the third transistor T3, and a first electrode of the sixth transistor T6 respectively.

In an exemplary implementation mode, a first terminal of the storage capacitor C is connected with the first power supply line VDD, and the second terminal of the storage capacitor C is connected with the second node N2, i.e., the second terminal of the storage capacitor C is connected with the control electrode of the third transistor T3.

A control electrode of the first transistor T1 is connected with the second scan signal line S2, a first electrode of the first transistor T1 is connected with the initial signal line INIT, and the second electrode of the first transistor is connected with the second node N2. When a scan signal with an on-level is applied to the second scan signal line S2, the first transistor T1 transmits an initialization voltage to the control electrode of the third transistor T3, so as to initialize a charge amount of the control electrode of the third transistor T3.

A control electrode of the second transistor T2 is connected with the first scan signal line S1, the first electrode of the second transistor T2 is connected with the second node N2, and the second electrode of the second transistor T2 is connected with the third node N3. When a scan signal with an on-level is applied to the first scan signal line S1, the second transistor T2 enables the control electrode of the third transistor T3 to be connected with the second electrode.

The control electrode of the third transistor T3 is connected with the second node N2, i.e., the control electrode of the third transistor T3 is connected with the second terminal of the storage capacitor C, the first electrode of the third transistor T3 is connected with the first node N1, and the second electrode of the third transistor T3 is connected with the third node N3. The third transistor T3 may be referred to as a drive transistor, and the third transistor T3 determines an amount of a drive current flowing between the first power supply line VDD and the second power supply line VSS according to a potential difference between the control electrode and the first electrode of the third transistor T3.

A control electrode of the fourth transistor T4 is connected with the first scan signal line S1, a first electrode of the fourth transistor T4 is connected with the data signal line D, and the second electrode of the fourth transistor T4 is connected with the first node N1. The fourth transistor T4, may be referred to as a switching transistor, a scan transistor, etc., and the fourth transistor T4 enables a data voltage of the data signal line D to be input into the pixel drive circuit when a scan signal with an on-level is applied to the first scan signal line S1.

A control electrode of the fifth transistor T5 is connected with the light emitting signal line E, a first electrode of the fifth transistor T5 is connected with the first power supply line VDD, and the second electrode of the fifth transistor T5 is connected with the first node N1. A control electrode of the sixth transistor T6 is connected with the light emitting signal line E, the first electrode of the sixth transistor T6 is connected with the third node N3, and a second electrode of the sixth transistor T6 is connected with a first electrode of a light emitting device. The fifth transistor T5 and the sixth transistor T6 may be referred to as light emitting transistors. When a light emitting signal with an on-level is applied to the light emitting signal line E, the fifth transistor T5 and the sixth transistor T6 enable the light emitting device to emit light by forming a drive current path between the first power supply line VDD and the second power supply line VSS.

A control electrode of the seventh transistor T7 is connected with the first scan signal line S1, a first electrode of the seventh transistor T7 is connected with the initial signal line INIT, and a second electrode of the seventh transistor T7 is connected with the first electrode of the light emitting device. When a scan signal with an on-level is applied to the first scan signal line S1, the seventh transistor T7 transmits an initialization voltage to the first electrode of the light emitting device so as to initialize a charge amount accumulated in the first electrode of the light emitting device or release a charge amount accumulated in the first electrode of the light emitting device.

In an exemplary implementation mode, a second electrode of the light emitting device is connected with the second power supply line VSS, a signal of the second power supply line VSS is a low-level signal, and a signal of the first power supply line VDD is a high-level signal continuously provided. The first scan signal line S1 is a scan signal line in a pixel drive circuit in a current display row, and the second scan signal line S2 is a scan signal line in a pixel drive circuit in a previous display row, that is, for an n-th display row, the first scan signal line S1 is S(n), and the second scan signal line S2 is S(n−1). The second scan signal line S2 in the current display row and the first scan signal line S1 in the pixel drive circuit in the previous display row are a same signal line, such that signal lines of a display panel may be reduced, so as to achieve a narrow bezel of the display panel.

In an exemplary implementation mode, the first transistor T1 to the seventh transistor T7 may be P-type transistors, or may be N-type transistors. Use of a same type of transistors in a pixel drive circuit may simplify a process flow, reduce a process difficulty of a display panel, and improve a product yield. In some possible implementation modes, the first transistor T1 to the seventh transistor T7 may include a P-type transistor and an N-type transistor.

In an exemplary implementation mode, the first scan signal line S1, the second scan signal line S2, the light emitting signal line E, and the initial signal line INIT extend along a horizontal direction, and the second power supply line VSS, the first power supply line VDD, and the data signal line D extend along a vertical direction.

In an exemplary implementation mode, the light emitting device may be an Organic Light Emitting Diode (OLED) including a first electrode (anode), an organic emitting layer, and a second electrode (cathode) that are stacked.

Figure 5:
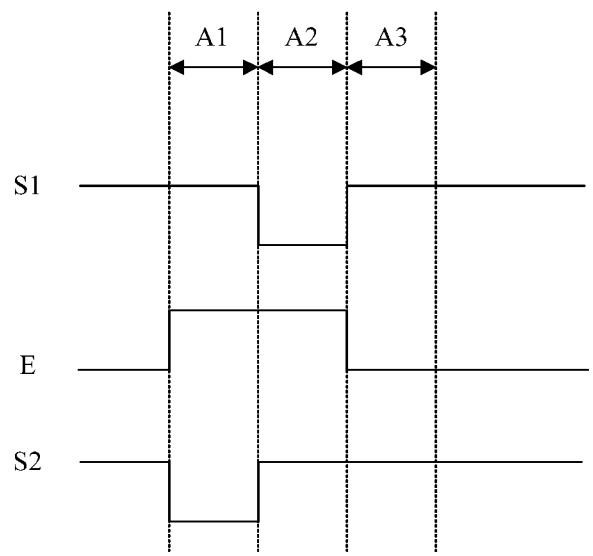
FIG. 5 is a working timing diagram of a pixel drive circuit.

FIG. 5 is a working timing diagram of a pixel drive circuit. An exemplary embodiment will be described below through a working process of the pixel drive circuit illustrated in FIG. 4. The pixel drive circuit in FIG. 4 includes seven transistors (a first transistor T1 to a seventh transistor T7), one storage capacitor C, and seven signal lines (a data signal line D, a first scan signal line S1, a second scan signal line S2, a light emitting signal line E, an initial signal line INIT, a first power supply line VDD, and a second power supply line VSS), wherein all of the seven transistors are P-type transistors.

In an exemplary implementation mode, the working process of the pixel drive circuit may include following stages.

In a first stage A1, referred to as a reset stage, a signal of the second scan signal line S2 is a low-level signal, and signals of the first scan signal line S1 and the light emitting signal line E are high-level signals. The signal of the second scan signal line S2 is the low-level signal, so that the first transistor T1 is turned on, and a signal of the initial signal line INIT is provided to a second node N2 to initialize the storage capacitor C to clear an original data voltage in the storage capacitor. The signals of the first scan signal line S1 and the light emitting signal line E are high-level signals, so that the second transistor T2, the fourth transistor T4, the fifth transistor T5, the sixth transistor T6, and the seventh transistor T7 are turned off. An OLED does not emit light in this stage.

In a second stage A2, referred to as a data writing stage or a threshold compensation stage, a signal of the first scan signal line S1 is a low-level signal, signals of the second scan signal line S2 and the light emitting signal line E are high-level signals, and the data signal line D outputs a data voltage. In this stage, a second terminal of the storage capacitor C is at a low level, so the third transistor T3 is turned on. The signal of the first scan signal line S1 is the low-level signal, so that the second transistor T2, the fourth transistor T4, and the seventh transistor T7 are turned on. The second transistor T2 and the fourth transistor T4 are turned on, so that the data voltage output by the data signal line D is provided to the second node N2 through a first node N1, the turned-on third transistor T3, a third node N3, and the turned-on second transistor T2, and the storage capacitor C is charged with a difference between the data voltage output by the data signal line D and a threshold voltage of the third transistor T3. A voltage at the second terminal (the second node N2) of the storage capacitor C is Vd−|Vth|, wherein Vd is the data voltage output by the data signal line D, and Vth is the threshold voltage of the third transistor T3. The seventh transistor T7 is turned on, so that an initialization voltage of the initial signal line INIT is provided to a first electrode of the OLED to initialize (reset) the first electrode of the OLED and clear a pre-stored voltage therein, thereby completing initialization to ensure that the OLED does not emit light. A signal of the second scan signal line S2 is a high-level signal, so that the first transistor T1 is turned off. A signal of the light emitting signal line E is a high-level signal, so that the fifth transistor T5 and the sixth transistor T6 are turned off.

In a third stage A3, referred to as a light emitting stage, a signal of the light emitting signal line E is a low-level signal, and signals of the first scan signal line S1 and the second scan signal line S2 are high-level signals. The signal of the light emitting signal line E is the low-level signal, so that the fifth transistor T5 and the sixth transistor T6 are turned on, and a power voltage output by the first power supply line VDD provides a drive voltage to the first electrode of the OLED through the turned-on fifth transistor T5, the third transistor T3, and the sixth transistor T6 to drive the OLED to emit light.

In a drive process of the pixel drive circuit, a drive current flowing through the third transistor T3 (drive transistor) is determined by a voltage difference between a gate electrode and a first electrode of the third transistor T3. The voltage of the second node N2 is Vd−|Vthj|, so the drive current of the third transistor T3 is as follows.

$$I=K^*(Vgs-Vth)^2=K^*[(Vdd-Vd+|Vth|)-Vth]^2=K^*[(Vdd-Vd)]^2$$

Herein, I is the drive current flowing through the third transistor T3, i.e., a drive current for driving the OLED, K is a constant, Vgs is the voltage difference between the gate electrode and the first electrode of the third transistor T3, Vth is the threshold voltage of the third transistor T3, Vd is the data voltage output by the data signal line D, and Vdd is the power voltage output by the first power supply line VDD.

An Emitting Gate Driver on Array (EM GOA) circuit is usually used for a light emitting signal driver. A commonly used EM GOA circuit usually outputs one type of light emitting signal (EM). With development of OLED display technologies, requirements for drive signals generated by drive circuits of OLED display products have increased. The commonly used EM GOA circuits cannot output different types of light emitting signals to meet a demand for different light emitting signals in practical applications.

Figure 6:
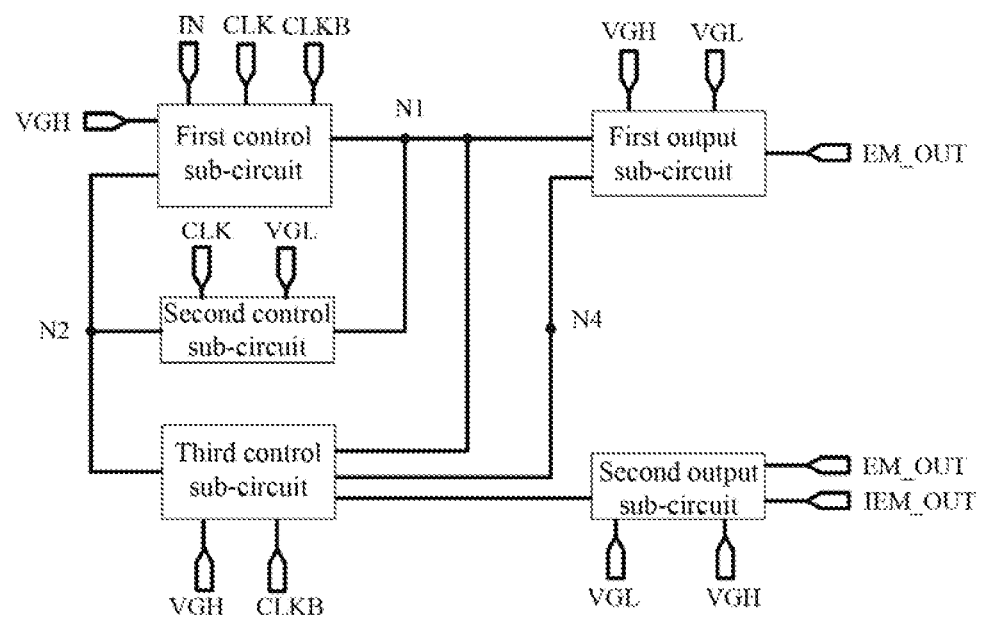
FIG. 6 is a schematic diagram of a structure of a shift register according to an embodiment of the present disclosure.

An exemplary embodiment of the present disclosure provides a shift register, as shown in FIG. 6, the shift register includes a first control sub-circuit, a second control sub-circuit, a third control sub-circuit, a first output sub-circuit, and a second output sub-circuit.

The first control sub-circuit is respectively connected with a signal input terminal IN, a first node N1, a second node N2, a first clock signal terminal CLK, a second clock signal terminal CLKB, and a first power supply terminal VGH, and is configured to provide a signal of the signal input terminal IN to the first node N1 under control of the first clock signal terminal CLK, the second clock signal terminal CLKB, the second node N2, and the first power supply terminal VGH, and maintain a potential of the first node N1.

The second control sub-circuit is respectively connected with a second power supply terminal VGL, the first clock signal terminal CLK, the first node N1, and the second node N2, and is configured to provide a signal of the second power supply terminal VGL or the first clock signal terminal CLK to the second node N2 under control of the first clock signal terminal CLK and the first node N1.

The third control sub-circuit is respectively connected with the first node N1, the second node N2, a fourth node N4, the second clock signal terminal CLKB, and the first power supply terminal VGH, and is configured to provide a signal of the second clock signal terminal CLKB or the first power supply terminal VGH to the fourth node N4 under control of the second clock signal terminal CLKB, the first node N1, and the second node N2, and maintain a potential of the fourth node N4.

The first output sub-circuit is respectively connected with the first power supply terminal VGH, the second power supply terminal VGL, the first node N1, the fourth node N4, and a first signal output terminal EM_OUT, and is configured to provide a signal of the first power supply terminal VGH or the second power supply terminal VGL to the first signal output terminal EM_OUT under control of the first node N1 and the fourth node N4.

The second output sub-circuit is connected with the first signal output terminal EM_OUT, the third control sub-circuit, the first power supply terminal VGH, the second power supply terminal VGL, and a second signal output terminal IEM_OUT, respectively, and is configured to provide a signal of the first power supply terminal VGH or the second power supply terminal VGL to the second signal output terminal IEM_OUT under control of the third control sub-circuit and the first signal output terminal EM_OUT.

A shift register according to an embodiment of the present disclosure includes a first control sub-circuit, a second control sub-circuit, a third control sub-circuit, a first output sub-circuit, and a second output sub-circuit, wherein the first output sub-circuit may provide a signal of a first power supply terminal or a second power supply terminal to a first signal output terminal under control of a first node and a fourth node, and the second output sub-circuit may provide the signal of the first power supply terminal or the second power supply terminal to a second signal output terminal under control of the third control sub-circuit and the first signal output terminal. The first sub-output circuit and the second sub-output circuit output signals to the first signal output terminal and the second signal output terminal, respectively, which may satisfy a demand for different signals and overcome a problem of being unable to satisfy a demand for different signals in practical applications.

In an exemplary implementation mode, a signal output by the first signal output terminal EM_OUT and a signal output by the second signal output terminal IEM_OUT are mutually inverted signals. In the shift register according to the embodiment of the present disclosure, signals output by the first signal output terminal EM_OUT and the second signal output terminal IEM_OUT are mutually inverted signals, which may meet a demand for different types of signals in practical applications on a basis of achieving control of a width of a pulse signal output by a signal output terminal. In an embodiment of the present disclosure, different types of signals with adjustable pulse signal widths are synchronously provided in a same shift register circuit, for example, the shift register may be an Emitting Gate Driver on Array (EM GOA) circuit, and a same EM GOA circuit may output different types of light emitting signals to meet a demand for different light emitting signals in practical applications.

In an embodiment of the present disclosure, a same EM GOA circuit may provide a light emitting signal (EM signal) with an adjustable pulse width and a light emitting signal IEM signal which is a mutually inverted signal with the EM signal, thereby improving an integration degree of the circuit to a great extent.

Figure 7:
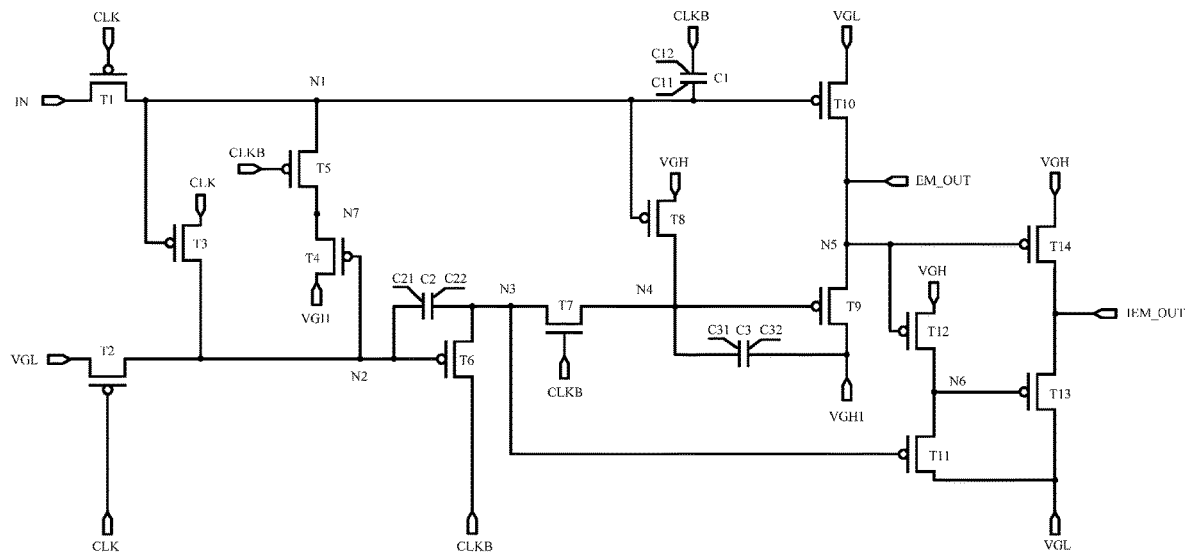
FIG. 7 is an equivalent circuit diagram of a shift register according to an exemplary embodiment of the present disclosure.
Figure 9A:
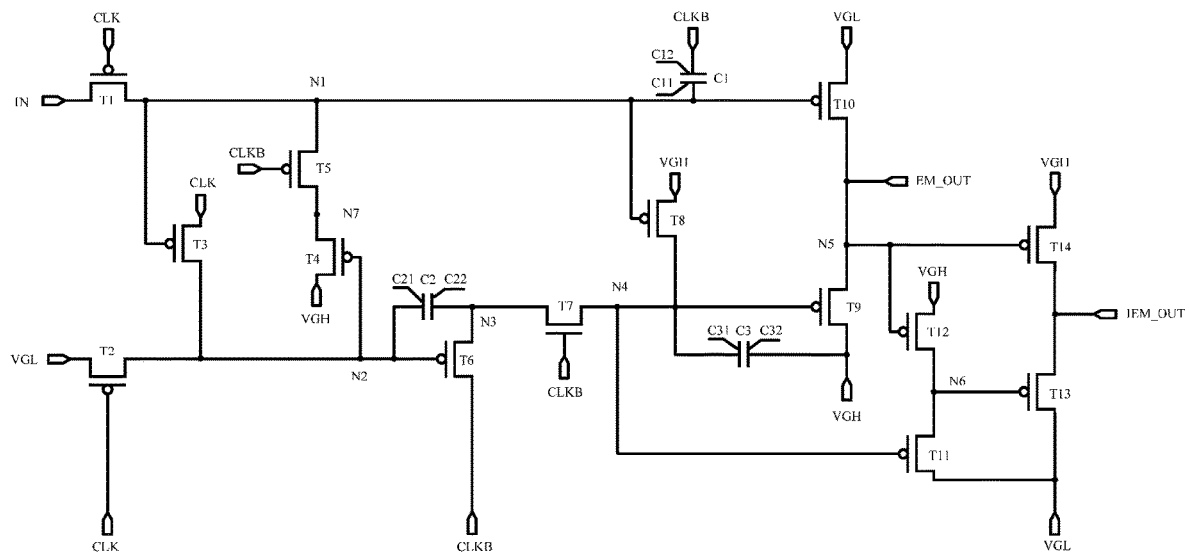
FIG. 9a is an equivalent circuit diagram of a shift register according to an exemplary embodiment of the present disclosure.
Figure 9B:
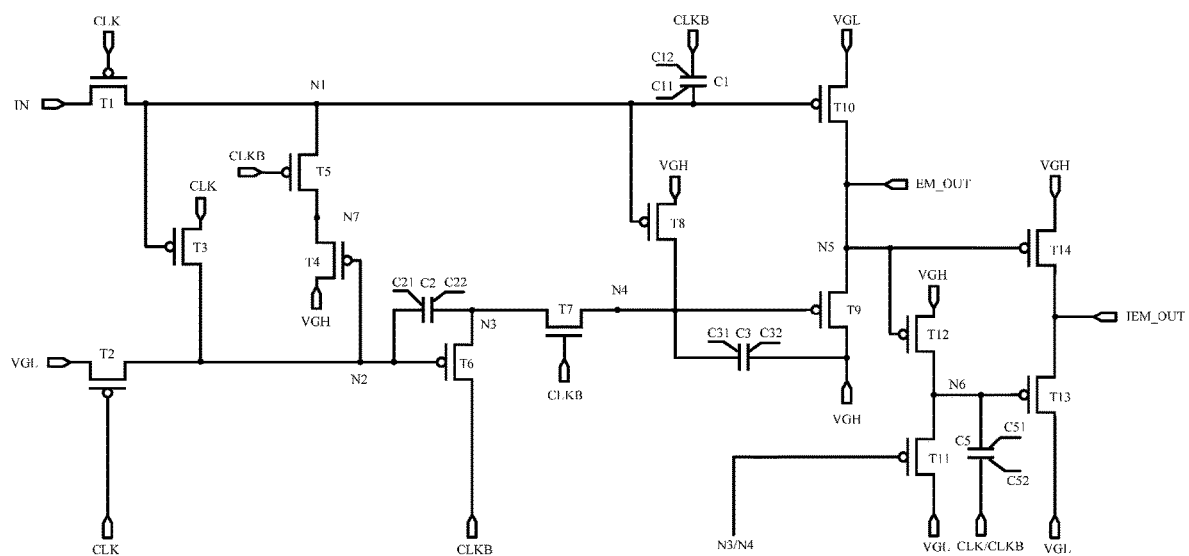
FIG. 9b is an equivalent circuit diagram of a shift register according to an exemplary embodiment of the present disclosure.

In an exemplary implementation mode, as shown in FIGS. 7 and 9a-9b, a first control sub-circuit may include a first transistor T1, a fourth transistor T4, a fifth transistor T5, and a first capacitor C1, and the first capacitor C1 includes a first electrode plate C11 and a second electrode plate C12.

A control electrode of the first transistor T1 is connected with a first clock signal terminal CLK, a first electrode of the first transistor T1 is connected with a signal input terminal IN, and a second electrode of the first transistor T1 is connected with a first node N1.

A control electrode of the fourth transistor T4 is connected with a second node N2, a first electrode of the fourth transistor T4 is connected with a first power supply terminal VGH, and a second electrode of the fourth transistor T4 is connected with a seventh node N7.

A control electrode of the fifth transistor T5 is connected with a second clock signal terminal CLKB, a first electrode of the fifth transistor T5 is connected with the seventh node N7, and a second electrode of the fifth transistor T5 is connected with the first node N1.

The first electrode plate C11 of the first capacitor C1 is connected with the first node N1, and the second electrode plate C12 of the first capacitor C1 is connected with the second clock signal terminal CLKB.

Figure 9C:
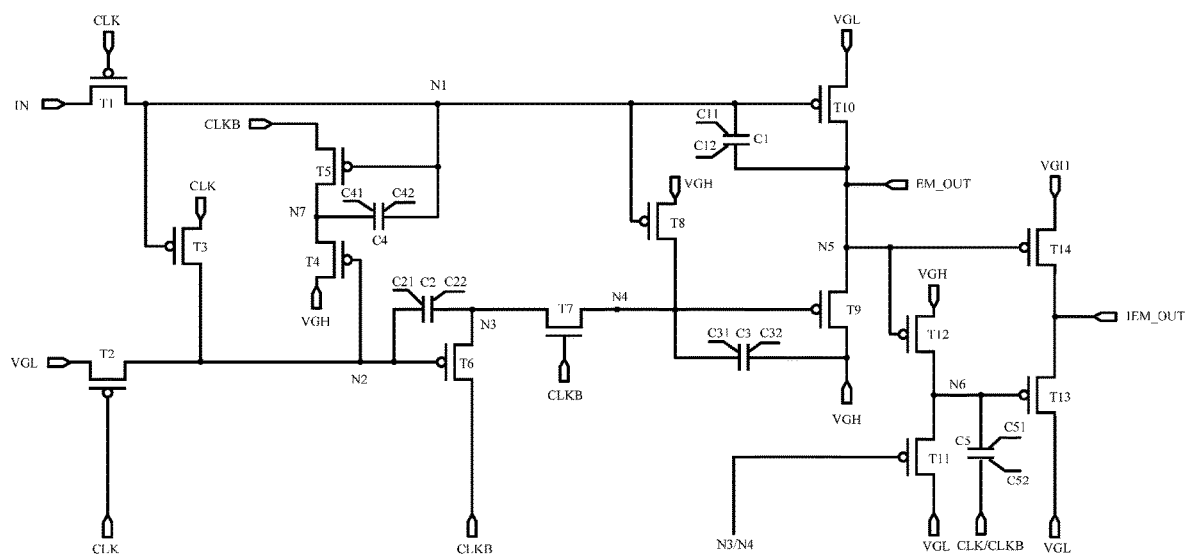
FIG. 9c is an equivalent circuit diagram of a shift register according to an exemplary embodiment of the present disclosure.

In an exemplary implementation mode, as shown in FIG. 9c, a first control sub-circuit may include a first transistor T1, a fourth transistor T4, a fifth transistor T5, a first capacitor C1, and a fourth capacitor C4, the first capacitor C1 may include a first electrode plate C11 and a second electrode plate C12, and the fourth capacitor C4 may include a first electrode plate C41 and a second electrode plate C42.

A control electrode of the first transistor T1 is connected with a first clock signal terminal CLK, a first electrode of the first transistor T1 is connected with a signal input terminal IN, and a second electrode of the first transistor T1 is connected with a first node N1.

A control electrode of the fourth transistor T4 is connected with a second node N2, a first electrode of the fourth transistor T4 is connected with a first power supply terminal VGH, and a second electrode of the fourth transistor T4 is connected with a seventh node N7.

A control electrode of the fifth transistor T5 is connected with the first node N1, a first electrode of the fifth transistor T5 is connected with a second clock signal terminal CLKB, and a second electrode of the fifth transistor T5 is connected with the seventh node N7.

The first electrode plate C11 of the first capacitor C1 is connected with the first node N1, and the second electrode plate C12 of the first capacitor C1 is connected with a first signal output terminal EM_OUT.

The first electrode plate C41 of the fourth capacitor C4 is connected with the seventh node N7, and the second electrode plate C42 of the fourth capacitor C4 is connected with the first node N1.

In an exemplary implementation mode, as shown in FIGS. 7 and 9a-9c, a second control sub-circuit may include a second transistor T2 and a third transistor T3.

A control electrode of the second transistor T2 is connected with the first clock signal terminal CLK, a first electrode of the second transistor T2 is connected with the second power supply terminal VGL, and a second electrode of the second transistor T2 is connected with the second node N2.

A control electrode of the third transistor T3 is connected with the first node N1, a first electrode of the third transistor T3 is connected with the first clock signal terminal CLK, and a second electrode of the third transistor T3 is connected with the second node N2.

In an exemplary implementation mode, as shown in FIGS. 7 and 9a-9c, a third control sub-circuit may include a sixth transistor T6, a seventh transistor T7, an eighth transistor T8, a second capacitor C2, and a third capacitor C3.

A control electrode of the sixth transistor T6 is connected with the second node N2, a first electrode of the sixth transistor T6 is connected with the second clock signal terminal CLKB, and a second electrode of the sixth transistor T6 is connected with a third node N3.

A control electrode of the seventh transistor T7 is connected with the second clock signal terminal CLKB, a first electrode of the seventh transistor T7 is connected with the third node N3, and a second electrode of the seventh transistor T7 is connected with a fourth node N4.

A control electrode of the eighth transistor T8 is connected with the first node N1, a first electrode of the eighth transistor T8 is connected with the first power supply terminal VGH, and a second electrode of the eighth transistor T8 is connected with the fourth node N4.

A first electrode plate C21 of the second capacitor C2 is connected with the second node N2, and a second electrode plate C22 of the second capacitor C2 is connected with the third node N3.

A first electrode plate C31 of the third capacitor C3 is connected with the fourth node N4, and a second electrode plate C32 of the third capacitor C3 is connected with the first power supply terminal VGH.

In an exemplary implementation mode, as shown in FIGS. 7 and 9a-9c, a first output sub-circuit may include a ninth transistor T9 and a tenth transistor T10.

A control electrode of the ninth transistor T9 is connected with the fourth node N4, a first electrode of the ninth transistor T9 is connected with the first power supply terminal VGH, and a second electrode of the ninth transistor T9 is connected with the first signal output terminal EM_OUT.

A control electrode of the tenth transistor T10 is connected with the first node N1, a first electrode of the tenth transistor T10 is connected with the second power supply terminal VGL, and a second electrode of the tenth transistor T10 is connected with the first signal output terminal EM_OUT.

In an exemplary implementation mode, as shown in FIGS. 7 and 9a, a second output sub-circuit may include an eleventh transistor T11, a twelfth transistor T12, a thirteenth transistor T13, and a fourteenth transistor T14.

A control electrode of the eleventh transistor T11 is connected with a third control sub-circuit, a first electrode of the eleventh transistor T11 is connected with the second power supply terminal VGL, and a second electrode of the eleventh transistor T11 is connected with a sixth node N6; for example, the control electrode of the eleventh transistor T11 may be connected with the third node N3 (shown in FIG. 7) or the fourth node N4 (shown in FIG. 9a).

A control electrode of the twelfth transistor T12 is connected with the first signal output terminal EM_OUT, a first electrode of the twelfth transistor T12 is connected with the first power supply terminal VGH, and a second electrode of the twelfth transistor T12 is connected with the sixth node N6.

A control electrode of the thirteenth transistor T13 is connected with the sixth node N6, a first electrode of the thirteenth transistor T13 is connected with the second power supply terminal VGL, and a second electrode of the thirteenth transistor T13 is connected with a second signal output terminal IEM_OUT.

A control electrode of the fourteenth transistor T14 is connected with the first signal output terminal EM_OUT, a first electrode of the fourteenth transistor T14 is connected with the first power supply terminal VGH, and a second electrode of the fourteenth transistor T14 is connected with the second signal output terminal IEM_OUT.

In an exemplary implementation mode, as shown in FIGS. 9b and 9c, the second output sub-circuit may further include a fifth capacitor C5, and the fifth capacitor C5 includes a first electrode plate C51 and a second electrode plate C52.

The first electrode plate C51 of the fifth capacitor C5 is connected with the sixth node N6, and the second electrode plate C52 of the fifth capacitor C5 is connected with the first clock signal terminal CLK or the second clock signal terminal CLKB.

In an exemplary implementation mode, as shown in FIGS. 7 and 9a, a first control sub-circuit may include a first transistor T1, a fourth transistor T4, a fifth transistor T5, and a first capacitor C1, and the first capacitor C1 includes a first electrode plate C11 and a second electrode plate C12; a second control sub-circuit may include a second transistor T2 and a third transistor T3; a third control sub-circuit may include a sixth transistor T6, a seventh transistor T7, an eighth transistor T8, a second capacitor C2, and a third capacitor C3; a first output sub-circuit may include a ninth transistor T9 and a tenth transistor T10; a second output sub-circuit may include an eleventh transistor T11, a twelfth transistor T12, a thirteenth transistor T13, and a fourteenth transistor T14.

A control electrode of the first transistor T1 is connected with a first clock signal terminal CLK, a first electrode of the first transistor T1 is connected with a signal input terminal IN, and a second electrode of the first transistor T1 is connected with a first node N1.

A control electrode of the second transistor T2 is connected with the first clock signal terminal CLK, a first electrode of the second transistor T2 is connected with a second power supply terminal VGL, and a second electrode of the second transistor T2 is connected with a second node N2.

A control electrode of the third transistor T3 is connected with the first node N1, a first electrode of the third transistor T3 is connected with the first clock signal terminal CLK, and a second electrode of the third transistor T3 is connected with the second node N2.

A control electrode of the fourth transistor T4 is connected with the second node N2, a first electrode of the fourth transistor T4 is connected with a first power supply terminal VGH, and a second electrode of the fourth transistor T4 is connected with a seventh node N7.

A control electrode of the fifth transistor T5 is connected with a second clock signal terminal CLKB, a first electrode of the fifth transistor T5 is connected with the seventh node N7, and a second electrode of the fifth transistor T5 is connected with the first node N1.

A control electrode of the sixth transistor T6 is connected with the second node N2, a first electrode of the sixth transistor T6 is connected with the second clock signal terminal CLKB, and a second electrode of the sixth transistor T6 is connected with a third node N3.

A control electrode of the seventh transistor T7 is connected with the second clock signal terminal CLKB, a first electrode of the seventh transistor T7 is connected with the third node N3, and a second electrode of the seventh transistor T7 is connected with a fourth node N4.

A control electrode of the eighth transistor T8 is connected with the first node N1, a first electrode of the eighth transistor T8 is connected with the first power supply terminal VGH, and a second electrode of the eighth transistor T8 is connected with the fourth node N4.

A control electrode of the ninth transistor T9 is connected with the fourth node N4, a first electrode of the ninth transistor T9 is connected with the first power supply terminal VGH, and a second electrode of the ninth transistor T9 is connected with a first signal output terminal EM_OUT.

A control electrode of the tenth transistor T10 is connected with the first node N1, a first electrode of the tenth transistor T10 is connected with the second power supply terminal VGL, and a second electrode of the tenth transistor T10 is connected with the first signal output terminal EM_OUT.

A control electrode of the eleventh transistor T11 is connected with the third node N3 or the fourth node N4, a first electrode of the eleventh transistor T11 is connected with the second power supply terminal VGL, and a second electrode of the eleventh transistor T11 is connected with a sixth node N6.

A control electrode of the twelfth transistor T12 is connected with the first signal output terminal EM_OUT, a first electrode of the twelfth transistor T12 is connected with the first power supply terminal VGH, and a second electrode of the twelfth transistor T12 is connected with the sixth node N6.

A control electrode of the thirteenth transistor T13 is connected with the sixth node N6, a first electrode of the thirteenth transistor T13 is connected with the second power supply terminal VGL, and a second electrode of the thirteenth transistor T13 is connected with a second signal output terminal IEM_OUT.

A control electrode of the fourteenth transistor T14 is connected with the first signal output terminal EM_OUT, a first electrode of the fourteenth transistor T14 is connected with the first power supply terminal VGH, and a second electrode of the fourteenth transistor T14 is connected with the second signal output terminal IEM_OUT.

The first electrode plate C11 of the first capacitor C1 is connected with the first node N1, and the second electrode plate C12 of the first capacitor C1 is connected with the second clock signal terminal CLKB.

A first electrode plate C21 of the second capacitor C2 is connected with the second node N2, and a second electrode plate C22 of the second capacitor C2 is connected with the third node N3.

A first electrode plate C31 of the third capacitor C3 is connected with the fourth node N4, and a second electrode plate C32 of the third capacitor C3 is connected with the first power supply terminal VGH.

In an exemplary implementation mode, the first transistor T1 to the fourteenth transistor T14 are P-type transistors.

A shift register according to an exemplary embodiment is illustrated below through a working process of the shift register.

Figure 8:
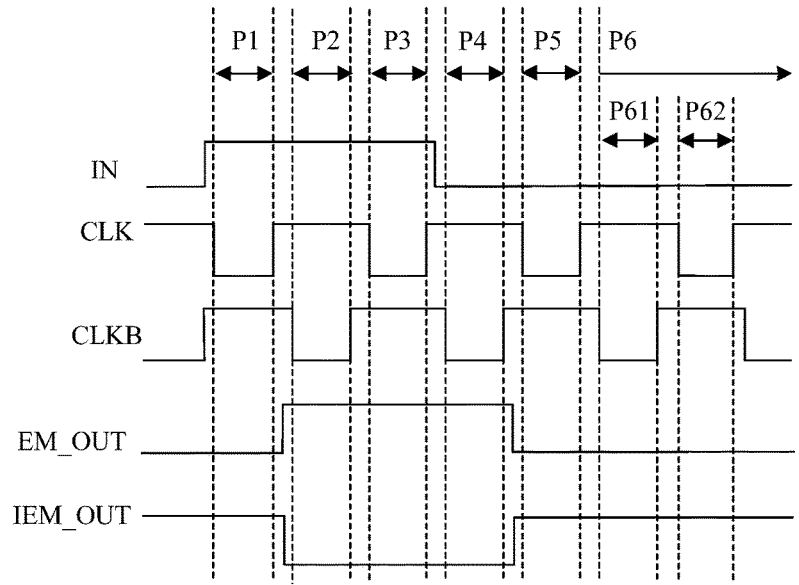
FIG. 8 is a working timing diagram of a shift register according to an exemplary embodiment of the present disclosure.

FIG. 7 is an equivalent circuit diagram of a shift register according to an exemplary embodiment, and FIG. 8 is a working timing diagram of a shift register according to an exemplary embodiment. As shown in FIGS. 7 and 8, a shift register according to an exemplary embodiment includes 14 switching transistors (T1 to T14), 3 capacitor units (C1, C2, and C3), 3 signal input terminals (CLK, CLKB, and IN), 2 signal output terminals (EM_OUT and IEM_OUT), and 2 power supply terminals (VGH and VGL). Herein, the first transistor T1 to the fourteenth transistor T14 shown in FIG. 7 may all be P-type transistors.

In an exemplary implementation mode, a signal of the first power supply terminal VGH is a high-level signal, and a signal of the second power supply terminal VGL is a low-level signal.

In an exemplary implementation mode, a signal output by the first signal output terminal EM_OUT and a signal output by the second signal output terminal IEM_OUT are both signals with adjustable pulse widths and are mutually inverted signals, i.e., they have a same period and opposite voltages, and a pulse width may be adjusted according to a signal input by a signal input terminal IN.

In an exemplary implementation mode, a duration in which the signal input terminal IN is an effective level signal may be one or more times a period of a clock signal of the first clock signal terminal CLK. For example, the duration in which the signal input terminal IN is an effective level signal may be three times the period of the clock signal of the first clock signal terminal CLK.

As shown in FIGS. 7 and 8, the working process of the shift register according to the exemplary embodiment may include a first stage P1 to a fifth stage P5.

In the first stage P1, signals of the signal input terminal IN and the second clock signal terminal CLKB are high-level signals and a signal of the first clock signal terminal CLK is a low-level signal. The low-level signal of the first clock signal terminal CLK enables the first transistor T1 and the second transistor T2 to be turned on, the high-level signal input by the signal input terminal IN is written into a first node N1 via the first transistor T1, the first node N1 is at a high level, the third transistor T3, the eighth transistor T8, and the tenth transistor T10 are turned off, a signal of the second power supply terminal VGL cannot be written into a fifth node N5 via the tenth transistor T10, the fifth node N5 maintains a low level of a previous frame, and the first signal output terminal EM_OUT outputs a low-level signal; since the second transistor T2 is turned on, a low-level signal of the second power supply terminal VGL is written into a second node N2 via the second transistor T2, the second node N2 is at a low level, the fourth transistor T4 and the sixth transistor T6 are turned on, a signal of the first power supply terminal VGH is written into a seventh node N7 via the fourth transistor T4, the seventh node N7 is at a high level, a high-level signal of the second clock signal terminal CLKB enables the fifth transistor T5 to be turned off, a signal of the seventh node N7 cannot be written into the first node N1 via the fifth transistor T5, the high-level signal of the second clock signal terminal CLKB is written into a third node N3 via the sixth transistor T6, the third node N3 is at a high level, the eleventh transistor T11 is turned off, since a signal of the second clock signal terminal CLKB is a high-level signal, the seventh transistor T7 is turned off, a high-level signal of the third node N3 cannot be written into a fourth node N4 via the seventh transistor T7, the fourth node N4 maintains a high level of the previous frame, the ninth transistor T9 is turned off, and the signal of the first power supply terminal VGH cannot be written into a fifth node N5 via the ninth transistor T9; since the fifth node N5 is at a low level, the twelfth transistor T12 and the fourteenth transistor T14 are turned on, the signal of the first power supply terminal VGH is transmitted to the second signal output terminal IEM_OUT via the fourteenth transistor T14, the second signal output terminal IEM_OUT outputs a high-level signal, the signal of the first power supply terminal VGH is written into a sixth node N6 via the twelfth transistor T12, the sixth node N6 is at a high level, the thirteenth transistor T13 is turned off, and the signal of the second power supply terminal VGL cannot be output to the second signal output terminal IEM_OUT via the thirteenth transistor T13. In this stage, the first signal output terminal EM_OUT outputs a low-level signal, and the second signal output terminal IEM_OUT outputs a high-level signal.

In the second stage P2, signals of the signal input terminal IN and the first clock signal terminal CLK are high-level signals and a signal of the second clock signal terminal CLKB is a low-level signal. A high-level signal of the first clock signal terminal CLK enables the first transistor T1 and the second transistor T2 to be turned off, and a high-level signal input by the signal input terminal IN cannot be written into the first node N1 via the first transistor T1; since the second transistor T2 is turned off, a low-level signal of the second power supply terminal VGL cannot be written into the second node N2 via the second transistor T2, the second node N2 maintains a low level of a previous frame, the fourth transistor T4 and the sixth transistor T6 are turned on, since the signal of the second clock signal terminal CLKB is the low-level signal, the fifth transistor T5 is turned on, a signal of the first power supply terminal VGH is written into the first node N1 via the fourth transistor T4 and the fifth transistor T5, the first node N1 is at a high level, the third transistor T3, the eighth transistor T8, and the tenth transistor T10 are turned off, a signal of the second power supply terminal VGL cannot be written into the fifth node N5 via the tenth transistor T10, since the sixth transistor T6 is turned on, the low-level signal of the second clock signal terminal CLKB is written to the third node N3 via the sixth transistor T6, the third node N3 is at a low level, the low-level signal of the second clock signal terminal enables the seventh transistor T7 to be turned on, the low-level signal of the third node N3 is written into the fourth node N4 via the seventh transistor T7, the fourth node N4 is at a low level, the ninth transistor T9 is turned on, the signal of the first power supply terminal VGH is written into the fifth node N5 via the ninth transistor T9, the fifth node N5 is at a high level, and the first signal output terminal EM_OUT outputs a high-level signal; since the fifth node N5 is at a high level, the twelfth transistor T12 and the fourteenth transistor T14 are turned off, the signal of the first power supply terminal VGH cannot be transmitted to the second signal output terminal IEM_OUT via the fourteenth transistor T14, and the signal of the first power supply terminal VGH cannot be written into the sixth node N6 via the twelfth transistor T12. Since the third node N3 is at a low level, the eleventh transistor T11 is turned on, the low-level signal of the second power supply terminal VGL is written into the sixth node N6 via the eleventh transistor T11, the sixth node N6 is at a low level, the thirteenth transistor T13 is turned on, the signal of the second power supply terminal VGL is transmitted to the second signal output terminal IEM_OUT via the thirteenth transistor T13, and the second signal output terminal IEM_OUT outputs a low-level signal. In this stage, the first signal output terminal EM_OUT outputs a high-level signal, and the second signal output terminal IEM_OUT outputs a low-level signal.

In the third stage P3, signals of the signal input terminal IN and the second clock signal terminal CLKB are high-level signals and a signal of the first clock signal terminal CLK is a low-level signal. The low-level signal of the first clock signal terminal CLK enables the first transistor T1 and the second transistor T2 to be turned on, a high-level signal input by the signal input terminal IN is written into the first node N1 via the first transistor T1, the first node N1 is at a high level, the third transistor T3, the eighth transistor T8, and the tenth transistor T10 are turned off, and a signal of the second power supply terminal VGL cannot be written into the fifth node N5 via the tenth transistor T10; since the second transistor T2 is turned on, a low-level signal of the second power supply terminal VGL is written into the second node N2 via the second transistor T2, the second node N2 is at a low level, the fourth transistor T4 and the sixth transistor T6 are turned on, a signal of the first power supply terminal VGH is written into the seventh node N7 via the fourth transistor T4, the seventh node N7 is at a high level, a high-level signal of the second clock signal terminal CLKB enables the fifth transistor T5 to be turned off, a signal of the seventh node N7 cannot be written into the first node N1 via the fifth transistor T5, the high-level signal of the second clock signal terminal CLKB is written into the third node N3 via the sixth transistor T6, the third node N3 is at a high level, the eleventh transistor T11 is turned off, since a signal of the second clock signal terminal CLKB is a high-level signal, the seventh transistor T7 is turned off, a high-level signal of the third node N3 cannot be written into the fourth node N4 via the seventh transistor T7, the fourth node N4 maintains a low level of a previous frame, the ninth transistor T9 is turned on, the signal of the first power supply terminal VGH is written into the fifth node N5 via the ninth transistor T9, the fifth node N5 is at a high level, and the first signal output terminal EM_OUT outputs a high-level signal; since the fifth node N5 is at a high level, the twelfth transistor T12 and the fourteenth transistor T14 are turned off, the signal of the first power supply terminal VGH cannot be transmitted to the second signal output terminal IEM_OUT via the fourteenth transistor T14, the signal of the first power supply terminal VGH cannot be written into the sixth node N6 via the twelfth transistor T12, the sixth node N6 maintains a low level of a previous frame, the thirteenth transistor T13 is turned on, the signal of the second power supply terminal VGL is transmitted to the second signal output terminal IEM_OUT via the thirteenth transistor T13, and the second signal output terminal IEM_OUT outputs a low-level signal. In this stage, the first signal output terminal EM_OUT outputs a high-level signal, and the second signal output terminal IEM_OUT outputs a low-level signal.

In the fourth stage P4, a signal of the first clock signal terminal CLK is a high-level signal, and signals of the signal input terminal IN and the second clock signal terminal CLKB are low-level signals. The high-level signal of the first clock signal terminal CLK enables the first transistor T1 and the second transistor T2 to be turned off, and a low-level signal input by the signal input terminal IN cannot be written into the first node N1 via the first transistor T1; since the second transistor T2 is turned off, a low-level signal of the second power supply terminal VGL cannot be written into the second node N2 via the second transistor T2, the second node N2 maintains a low level of a previous frame, the fourth transistor T4 and the sixth transistor T6 are turned on, since a signal of the second clock signal terminal CLKB is a low-level signal, the fifth transistor T5 is turned on, a signal of the first power supply terminal VGH is written into the first node N1 via the fourth transistor T4 and the fifth transistor T5, the first node N1 is at a high level, the third transistor T3, the eighth transistor T8, and the tenth transistor T10 are turned off, a signal of the second power supply terminal VGL cannot be written into the fifth node N5 via the tenth transistor T10, a low-level signal of the second clock signal terminal CLKB is written into the third node N3 via the sixth transistor T6, the third node N3 is at a low level, the eleventh transistor T11 is turned on, the low-level signal of the second clock signal terminal CLKB enables the seventh transistor T7 to be turned on, a low-level signal of the third node N3 is written into the fourth node N4 via the seventh transistor T7, the fourth node N4 is at a low level, the ninth transistor T9 is turned on, the signal of the first power supply terminal VGH is written into the fifth node N5 via the ninth transistor T9, the fifth node N5 is at a high level, and the first signal output terminal EM_OUT outputs a high-level signal; since the fifth node N5 is at a high level, the twelfth transistor T12 and the fourteenth transistor T14 are turned off, the signal of the first power supply terminal VGH cannot be transmitted to the second signal output terminal IEM_OUT via the fourteenth transistor T14, and the signal of the first power supply terminal VGH cannot be written into the sixth node N6 via the twelfth transistor T12. Since the eleventh transistor T11 is turned on, the low-level signal of the second power supply terminal VGL is written into the sixth node N6 via the eleventh transistor T11, the sixth node N6 is at a low level, the thirteenth transistor T13 is turned on, the signal of the second power supply terminal VGL is transmitted to the second signal output terminal IEM_OUT via the thirteenth transistor T13, and the second signal output terminal IEM_OUT outputs a low-level signal. In this stage, the first signal output terminal EM_OUT outputs a high-level signal, and the second signal output terminal IEM_OUT outputs a low-level signal.

In the fifth stage P5, a signal of the second clock signal terminal CLKB is a high-level signal, and signals of the signal input terminal IN and the first clock signal terminal CLK are low-level signals. A low-level signal of the first clock signal terminal CLK enables the first transistor T1 and the second transistor T2 to be turned on, a low-level signal input by the signal input terminal IN is written into the first node N1, the first node N1 is at a low level, the third transistor T3, the eighth transistor T8, and the tenth transistor T10 are turned on, a signal of the second power supply terminal VGL is written into the fifth node N5 via the tenth transistor T10, the fifth node N5 is at a low level, and the first signal output terminal EM_OUT outputs a low-level signal; since the second transistor T2 is turned on, a low-level signal of the second power supply terminal VGL is written into the second node N2 via the second transistor T2, the second node N2 is at a low level, the fourth transistor T4 and the sixth transistor T6 are turned on, a signal of the first power supply terminal VGH is written into the seventh node N7 via the fourth transistor T4, the seventh node N7 is at a high level, the high-level signal of the second clock signal terminal CLKB enables the fifth transistor T5 to be turned off, a signal of the seventh node N7 cannot be written into the first node N1 via the fifth transistor T5, the high-level signal of the second clock signal terminal CLKB is written into the third node N3 via the sixth transistor T6, the third node N3 is at a high level, the eleventh transistor T11 is turned off, since the signal of the second clock signal terminal CLKB is the high-level signal, the seventh transistor T7 is turned off, a high-level signal of the third node N3 cannot be written into the fourth node N4 via the seventh transistor T7, since the eighth transistor T8 is turned on, the signal of the first power supply terminal VGH is written into the fourth node N4 via the eighth transistor T8, the fourth node N4 is at a high level, the ninth transistor T9 is turned off, and the signal of the first power supply terminal VGH cannot be written into the fifth node N5 via the ninth transistor T9; since the fifth node N5 is at a low level, the twelfth transistor T12 and the fourteenth transistor T14 are turned on, the signal of the first power supply terminal VGH is transmitted to the second signal output terminal IEM_OUT via the fourteenth transistor T14, and the second signal output terminal IEM_OUT outputs a high-level signal. The signal of the first power supply terminal VGH is written into the sixth node N6 via the twelfth transistor T12, and the sixth node N6 is at a high level and the thirteenth transistor T13 is turned off. In this stage, the first signal output terminal EM_OUT outputs a low-level signal, and the second signal output terminal IEM_OUT outputs a high-level signal.

In a sixth stage P6, in this stage, an input signal of the signal input terminal IN remains unchanged as a low-level signal, signals of the first clock signal terminal CLK and the second clock signal terminal CLKB periodically change, and signals output by the first signal output terminal EM_OUT and the second signal output terminal IEM_OUT remain unchanged, i.e., the first signal output terminal EM_OUT outputs a low-level signal and the second signal output terminal IEM_OUT outputs a high-level signal. Description is given below by taking a first sub-stage P61 and a second sub-stage P62 as an example.

In the first sub-stage P61, a signal of the first clock signal terminal CLK is a high-level signal, and a signal of the second clock signal terminal CLKB is a low-level signal. The high-level signal of the first clock signal terminal CLK enables the first transistor T1 and the second transistor T2 to be turned off, a low-level signal input by the signal input terminal IN cannot be written into the first node N1 via the first transistor T1, a low-level signal of the second power supply terminal VGL cannot be written into the second node N2 via the second transistor T2, the first node N1 maintains a low level of a previous frame, the third transistor T3, the eighth transistor T8, and the tenth transistor T10 are turned on, the high-level signal of the first clock signal terminal CLK is written into the second node N2 via the third transistor T3, the second node N2 is at a high level, the fourth transistor T4 and the sixth transistor T6 are turned off, the low-level signal of the second clock signal terminal CLKB cannot be written into the third node N3 via the sixth transistor T6, the third node N3 maintains a high level of the previous frame, a high-level signal of the first power supply terminal VGH is written into the fourth node N4 via the eighth transistor T8, the ninth transistor T9 is turned off, the high-level signal of the first power supply terminal VGH cannot be written into the fifth node N5 via the ninth transistor T9, since the tenth transistor T10 is turned on, the low-level signal of the second power supply terminal VGL is written into the fifth node N5 via the tenth transistor T10, the fifth node N5 is at a low level, and the first signal output terminal EM_OUT outputs a low-level signal; since the third node N3 maintains the high level of the previous frame, the eleventh transistor T11 is turned off, and the low-level signal of the second power supply terminal VGL cannot be written into the sixth node N6 via the eleventh transistor T11. Since the fifth node N5 is at a low level, the twelfth transistor T12 and the fourteenth transistor T14 are turned on, the high-level signal of the first power supply terminal VGH is written into the sixth node N6 via the twelfth transistor T12, the thirteenth transistor T13 is turned off, the low-level signal of the second power supply terminal VGL cannot be transmitted to the second signal output terminal IEM_OUT via the thirteenth transistor T13, the high-level signal of the first power supply terminal VGH is transmitted to the second signal output terminal IEM_OUT via the fourteenth transistor T14, and a signal output by the second signal output terminal IEM_OUT is a high-level signal.

In the second sub-stage P62, a signal of the first clock signal terminal CLK is a low-level signal, and a signal of the second clock signal terminal CLKB is a high-level signal. The low-level signal of the first clock signal terminal CLK enables the first transistor T1 and the second transistor T2 to be turned on, a low-level signal input by the signal input terminal IN is written into the first node N1 via the first transistor T1, a low-level signal of the second power supply terminal VGL is written into the second node N2 via the second transistor T2, the first node N1 and the second node N2 are both at low-levels, the third transistor T3, the eighth transistor T8, the tenth transistor T10, the fourth transistor T4, and the sixth transistor T6 are all turned on, the high-level signal of the second clock signal terminal CLKB is written into the third node N3 via the sixth transistor T6, the third node N3 is at a high level, a high-level signal of the first power supply terminal VGH is written into the fourth node N4 via the eighth transistor T8, the ninth transistor T9 is turned off, the high-level signal of the first power supply terminal VGH cannot be written into the fifth node N5 via the ninth transistor T9, since the tenth transistor T10 is turned on, the low-level signal of the second power supply terminal VGL is written into the fifth node N5 via the tenth transistor T10, the fifth node N5 is at a low level, and a signal output by the first signal output terminal EM_OUT is a low-level signal; since the third node N3 is at a high level, the eleventh transistor T11 is turned off, the low-level signal of the second power supply terminal VGL cannot be written into the sixth node N6 via the eleventh transistor T11. Since the fifth node N5 is at a low level, the twelfth transistor T12 and the fourteenth transistor T14 are turned on, the high-level signal of the first power supply terminal VGH is written into the sixth node N6 via the twelfth transistor T12, the thirteenth transistor T13 is turned off, the low-level signal of the second power supply terminal VGL cannot be transmitted to the second signal output terminal IEM_OUT via the thirteenth transistor T13, the high-level signal of the first power supply terminal VGH is transmitted to the second signal output terminal IEM_OUT via the fourteenth transistor T14, and a signal output by the second signal output terminal IEM_OUT is a high-level signal.

In an exemplary implementation mode, the working timing diagram of the shift register of the equivalent circuit diagram of the shift register shown in FIG. 9a is the same as that of FIG. 8. The working process of the shift register shown in FIG. 9a may include a first stage H1 to a sixth stage H6, signals of the signal input terminal IN, the first clock signal terminal CLK, the second clock signal terminal CLKB, the first signal output terminal EM_OUT, and the second signal output terminal IEM_OUT in the first stage H1 to the sixth stage H6 are the same as those in the first stage P1 to the sixth stage P6 in FIG. 8. Working processes of a plurality of transistors and a plurality of capacitors in the shift register shown in FIG. 9a in the first stage H1 to the sixth stage H6 will be described in detail below.

In the first stage H1, signals of the signal input terminal IN and the second clock signal terminal CLKB are high-level signals and a signal of the first clock signal terminal CLK is a low-level signal. The low-level signal of the first clock signal terminal CLK enables the first transistor T1 and the second transistor T2 to be turned on, a high-level signal input by the signal input terminal IN is written into the first node N1 via the first transistor T1, the first node N1 is at a high level, the third transistor T3, the eighth transistor T8, and the tenth transistor T10 are turned off, a signal of the second power supply terminal VGL cannot be written into the fifth node N5 via the tenth transistor T10, the fifth node N5 maintains a low level of a previous frame, and the first signal output terminal EM_OUT outputs a low-level signal;

since the second transistor T2 is turned on, the low-level signal of the second power supply terminal VGL is written into the second node N2 via the second transistor T2, the second node N2 is at a low level, the fourth transistor T4 and the sixth transistor T6 are turned on, a signal of the first power supply terminal VGH is written into the seventh node N7 via the fourth transistor T4, the seventh node N7 is at a high level, the high-level signal of the second clock signal terminal CLKB enables the fifth transistor T5 to be turned off, a signal of the seventh node N7 cannot be written into the first node N1 via the fifth transistor T5, the high-level signal of the second clock signal terminal CLKB is written into the third node N3 via the sixth transistor T6, the third node N3 is at a high level, since the signal of the second clock signal terminal CLKB is the high-level signal, the seventh transistor T7 is turned off, a high-level signal of the third node N3 cannot be written into the fourth node N4 via the seventh transistor T7, the fourth node N4 maintains a high level of the previous frame, the ninth transistor T9 and the eleventh transistor T11 are turned off, the signal of the first power supply terminal VGH cannot be written into the fifth node N5 via the ninth transistor T9, and the low-level signal of the second power supply terminal VGL cannot be written into the sixth node N6 via the eleventh transistor T11; since the fifth node N5 is at a low level, the first signal output terminal EM_OUT outputs a low-level signal, the twelfth transistor T12 and the fourteenth transistor T14 are turned on, the signal of the first power supply terminal VGH is transmitted to the second signal output terminal IEM_OUT via the fourteenth transistor T14, the second signal output terminal IEM_OUT outputs a high-level signal, the signal of the first power supply terminal VGH is written into the sixth node N6 via the twelfth transistor T12, the sixth node N6 is at a high level, the thirteenth transistor T13 is turned off, and the signal of the second power supply terminal VGL cannot be output to the second signal output terminal IEM_OUT via the thirteenth transistor T13. In this stage, the first signal output terminal EM_OUT outputs a low-level signal, and the second signal output terminal IEM_OUT outputs a high-level signal.

In the second stage H2, signals of the signal input terminal IN and the first clock signal terminal CLK are high-level signals and a signal of the second clock signal terminal CLKB is a low-level signal. The high-level signal of the first clock signal terminal CLK enables the first transistor T1 and the second transistor T2 to be turned off, and a high-level signal input by the signal input terminal IN cannot be written into the first node N1 via the first transistor T1; since the second transistor T2 is turned off, a low-level signal of the second power supply terminal VGL cannot be written into the second node N2 via the second transistor T2, the second node N2 maintains a low level of a previous frame, the fourth transistor T4 and the sixth transistor T6 are turned on, since the signal of the second clock signal terminal CLKB is the low-level signal, the fifth transistor T5 is turned on, a signal of the first power supply terminal VGH is written into the first node N1 via the fourth transistor T4 and the fifth transistor T5, the first node N1 is at a high level, the third transistor T3, the eighth transistor T8, and the tenth transistor T10 are turned off, the signal of the second power supply terminal VGL cannot be written into the fifth node N5 via the tenth transistor T10, since the sixth transistor T6 is turned on, the low-level signal of the second clock signal terminal CLKB is written into the third node N3 via the sixth transistor T6, the third node N3 is at a low level, the low-level signal of the second clock signal terminal CLKB enables the seventh transistor T7 to be turned on, a low-level signal of the third node N3 is written into the fourth node N4 via the seventh transistor T7, the fourth node N4 is at a low level, the ninth transistor T9 and the eleventh transistor T11 are turned on, the signal of the first power supply terminal VGH is written into the fifth node N5 via the ninth transistor T9, the fifth node N5 is at a high level, and the first signal output terminal EM_OUT outputs a high-level signal; since the fifth node N5 is at a high level, the twelfth transistor T12 and the fourteenth transistor T14 are turned off, the signal of the first power supply terminal VGH cannot be transmitted to the second signal output terminal IEM_OUT via the fourteenth transistor T14, and the signal of the first power supply terminal VGH cannot be written into the sixth node N6 via the twelfth transistor T12; since the eleventh transistor T11 is turned on, the low-level signal of the second power supply terminal VGL is written into the sixth node N6 via the eleventh transistor T11, the sixth node N6 is at a low level, the thirteenth transistor T13 is turned on, the signal of the second power supply terminal VGL is transmitted to the second signal output terminal IEM_OUT via the thirteenth transistor T13, and the second signal output terminal IEM_OUT outputs a low-level signal. In this stage, the first signal output terminal EM_OUT outputs a high-level signal, and the second signal output terminal IEM_OUT outputs a low-level signal.

In the third stage H3, signals of the signal input terminal IN and the second clock signal terminal CLKB are high-level signals and a signal of the first clock signal terminal CLK is a low-level signal. The low-level signal of the first clock signal terminal CLK enables the first transistor T1 and the second transistor T2 to be turned on, a high-level signal input by the signal input terminal IN is written into the first node N1 via the first transistor T1, the first node N1 is at a high level, the third transistor T3, the eighth transistor T8, and the tenth transistor T10 are turned off, and a signal of the second power supply terminal VGL cannot be written into the fifth node N5 via the tenth transistor T10; since the second transistor T2 is turned on, the low-level signal of the second power supply terminal VGL is written into the second node N2 via the second transistor T2, the second node N2 is at a low level, the fourth transistor T4 and the sixth transistor T6 are turned on, a signal of the first power supply terminal VGH is written into the seventh node N7 via the fourth transistor T4, the seventh node N7 is at a high level, the high-level signal of the second clock signal terminal CLKB enables the fifth transistor T5 to be turned off, a signal of the seventh node N7 cannot be written into the first node N1 via the fifth transistor T5, the high-level signal of the second clock signal terminal CLKB is written into the third node N3 via the sixth transistor T6, the third node N3 is at a high level, since the signal of the second clock signal terminal CLKB is a high-level signal, the seventh transistor T7 is turned off, a high-level signal of the third node N3 cannot be written into the fourth node N4 via the seventh transistor T7, the fourth node N4 maintains a low level of a previous frame, the ninth transistor T9 and the eleventh transistor T11 are turned on, the signal of the first power supply terminal VGH is written into the fifth node N5 via the ninth transistor T9, the fifth node N5 is at a high level, and the first signal output terminal EM_OUT outputs a high-level signal; since the fifth node N5 is at a high level, the twelfth transistor T12 and the fourteenth transistor T14 are turned off, the signal of the first power supply terminal VGH cannot be transmitted to the second signal output terminal IEM_OUT via the fourteenth transistor T14, the signal of the first power supply terminal VGH cannot be written into the sixth node N6 via the twelfth transistor T12, since the eleventh transistor T11 is turned on, the low-level signal of the second power supply terminal VGL is written into the sixth node N6 via the eleventh transistor T11, the sixth node N6 is at a low level, the thirteenth transistor T13 is turned on, the signal of the second power supply terminal VGL is transmitted to the second signal output terminal IEM_OUT via the thirteenth transistor T13, and the second signal output terminal IEM_OUT outputs a low-level signal. In this stage, the first signal output terminal EM_OUT outputs a high-level signal, and the second signal output terminal IEM_OUT outputs a low-level signal.

In the fourth stage H4, a signal of the first clock signal terminal CLK is a high-level signal, and signals of the signal input terminal IN and the second clock signal terminal CLKB are low-level signals. The high-level signal of the first clock signal terminal CLK enables the first transistor T1 and the second transistor T2 to be turned off, a high-level signal input by the signal input terminal IN cannot be written into the first node N1 via the first transistor T1, the third transistor T3, the eighth transistor T8, and the tenth transistor T10 are turned off, and a signal of the second power supply terminal VGL cannot be written into the fifth node N5 via the tenth transistor T10; since the second transistor T2 is turned off, a low-level signal of the second power supply terminal VGL cannot be written into the second node N2 via the second transistor T2, the second node N2 maintains a low level of a previous frame, the fourth transistor T4 and the sixth transistor T6 are turned on, since a signal of the second clock signal terminal CLKB is a low-level signal, the fifth transistor T5 and the seventh transistor T7 are turned on, a signal of the first power supply terminal VGH is written into the first node N1 via the fourth transistor T4 and the fifth transistor T5, the first node N1 maintains a high level, since the sixth transistor T6 is turned on, the low-level signal of the second clock signal terminal CLKB is written into the third node N3 via the sixth transistor T6, the third node N3 is at a low level, since the seventh transistor T7 is turned on, a low-level signal of the third node N3 is written into the fourth node N4 via the seventh transistor T7, the fourth node N4 is at a low level, the eleventh transistor T11 and the ninth transistor T9 are turned on, the signal of the first power supply terminal VGH is written into the fifth node N5 via the ninth transistor T9, the fifth node N5 is at a high level, and the first signal output terminal EM_OUT outputs a high-level signal; since the fifth node N5 is at a high level, the twelfth transistor T12 and the fourteenth transistor T14 are turned off, the signal of the first power supply terminal VGH cannot be transmitted to the second signal output terminal IEM_OUT via the fourteenth transistor T14, and the signal of the first power supply terminal VGH cannot be written into the sixth node N6 via the twelfth transistor T12. Since the eleventh transistor T11 is turned on, the low-level signal of the second power supply terminal VGL is written into the sixth node N6 via the eleventh transistor T11, the sixth node N6 is at a low level, the thirteenth transistor T13 is turned on, the signal of the second power supply terminal VGL is transmitted to the second signal output terminal IEM_OUT via the thirteenth transistor T13, and the second signal output terminal IEM_OUT outputs a low-level signal. In this stage, the first signal output terminal EM_OUT outputs a high-level signal, and the second signal output terminal IEM_OUT outputs a low-level signal.

In the fifth stage H5, a signal of the second clock signal terminal CLKB is a high-level signal, and signals of the signal input terminal IN and the first clock signal terminal CLK are low-level signals. A low-level signal of the first clock signal terminal CLK enables the first transistor T1 and the second transistor T2 to be turned on, a low-level signal input by the signal input terminal IN is written into the first node N1, the first node N1 is at a low level, the third transistor T3, the eighth transistor T8, and the tenth transistor T10 are turned on, a signal of the second power supply terminal VGL is written into the fifth node N5 via the tenth transistor T10, the fifth node N5 is at a low level, and the first signal output terminal EM_OUT outputs a low-level signal; since the second transistor T2 is turned on, a low-level signal of the second power supply terminal VGL is written into the second node N2 via the second transistor T2, the second node N2 is at a low level, the fourth transistor T4 and the sixth transistor T6 are turned on, a signal of the first power supply terminal VGH is written into the seventh node N7 via the fourth transistor T4, the seventh node N7 is at a high level, the high-level signal of the second clock signal terminal CLKB enables the fifth transistor T5 to be turned off, a signal of the seventh node N7 cannot be written into the first node N1 via the fifth transistor T5, the high-level signal of the second clock signal terminal CLKB is written into the third node N3 via the sixth transistor T6, the third node N3 is at a high level, since the signal of the second clock signal terminal CLKB is the high-level signal, the seventh transistor T7 is turned off, a high-level signal of the third node N3 cannot be written into the fourth node N4 via the seventh transistor T7, since the eighth transistor T8 is turned on, the signal of the first power supply terminal VGH is written into the fourth node N4 via the eighth transistor T8, the fourth node N4 is at a high level, the ninth transistor T9 and the eleventh transistor T11 are turned off, and the signal of the first power supply terminal VGH cannot be written into the fifth node N5 via the ninth transistor T9; since the fifth node N5 is at a low level, the twelfth transistor T12 and the fourteenth transistor T14 are turned on, the signal of the first power supply terminal VGH is transmitted to the second signal output terminal IEM_OUT via the fourteenth transistor T14, the second signal output terminal IEM_OUT outputs a high-level signal, the signal of the first power supply terminal VGH is written into the sixth node N6 via the twelfth transistor T12, the sixth node N6 is at a high level, the thirteenth transistor T13 is turned off, and the signal of the second power supply terminal VGL cannot be transmitted to the second signal output terminal IEM_OUT via the thirteenth transistor T13. In this stage, the first signal output terminal EM_OUT outputs a low-level signal, and the second signal output terminal IEM_OUT outputs a high-level signal.

In the sixth stage H6, in this stage, an input signal of the signal input terminal IN remains unchanged as a low-level signal, signals of the first clock signal terminal CLK and the second clock signal terminal CLKB periodically change, and signals of the first signal output terminal EM_OUT and the second signal output terminal IEM_OUT remain unchanged, i.e., the first signal output terminal EM_OUT outputs a low-level signal and the second signal output terminal IEM_OUT outputs a high-level signal. Description is given below by taking a first sub-stage H61 and a second sub-stage H62 as an example.

In the first sub-stage H61, a signal of the first clock signal terminal CLK is a high-level signal, and a signal of the second clock signal terminal CLKB is a low-level signal. The high-level signal of the first clock signal terminal CLK enables the first transistor T1 and the second transistor T2 to be turned off, a low-level signal input by the signal input terminal IN cannot be written into the first node N1 via the first transistor T1, a low-level signal of the second power supply terminal VGL cannot be written into the second node N2 via the second transistor T2, the first node N1 maintains a low level of a previous frame, the third transistor T3, the eighth transistor T8, and the tenth transistor T10 are turned on, the high-level signal of the first clock signal terminal CLK is written into the second node N2 via the third transistor T3, the second node N2 is at a high level, the fourth transistor T4 and the sixth transistor T6 are turned off, the low-level signal of the second clock signal terminal CLKB cannot be written into the third node N3 via the sixth transistor T6, the third node N3 maintains a high level of the previous frame, a high-level signal of the first power supply terminal VGH is written into the fourth node N4 via the eighth transistor T8, the fourth node N4 is at a high level, the ninth transistor T9 and the eleventh transistor T11 are turned off, the high-level signal of the first power supply terminal VGH cannot be written into the fifth node N5 via the ninth transistor T9. since the tenth transistor T10 is turned on, the low-level signal of the second power supply terminal VGL is written into the fifth node N5 via the tenth transistor T10, the fifth node N5 is at a low level, and the first signal output terminal EM_OUT outputs a low-level signal; since the eleventh transistor T11 is turned off, the low-level signal of the second power supply terminal VGL cannot be written into the sixth node N6 via the eleventh transistor T11. Since the fifth node N5 is at a low level, the twelfth transistor T12 and the fourteenth transistor T14 are turned on, and the high-level signal of the first power supply terminal VGH is transmitted to the second signal output terminal IEM_OUT via the fourteenth transistor T14. A signal output by the second signal output terminal IEM_OUT is a high-level signal. The high-level signal of the first power supply terminal VGH is written into the sixth node N6 via the twelfth transistor T12, the sixth node N6 is at a high level, the thirteenth transistor T13 is turned off, and a low-level signal of the second power supply terminal VGL cannot be transmitted to the second signal output terminal IEM_OUT via the thirteenth transistor T13.

In the second sub-stage H62, a signal of the first clock signal terminal CLK is a low-level signal, and a signal of the second clock signal terminal CLKB is a high-level signal. The low-level signal of the first clock signal terminal CLK enables the first transistor T1 and the second transistor T2 to be turned on, a low-level signal input by the signal input terminal IN is written into the first node N1 via the first transistor T1, a low-level signal of the second power supply terminal VGL is written into the second node N2 via the second transistor T2, the first node N1 and the second node N2 are both at low-levels, the third transistor T3, the eighth transistor T8, the tenth transistor T10, the fourth transistor T4, and the sixth transistor T6 are turned on, the high-level signal of the second clock signal terminal CLKB is written into the third node N3 via the sixth transistor T6, the third node N3 is at a high level, a high-level signal of the first power supply terminal VGH is written into the fourth node N4 via the eighth transistor T8, the ninth transistor T9 and the eleventh transistor T11 are turned off, the high-level signal of the first power supply terminal VGH cannot be written into the fifth node N5 via the ninth transistor T9, since the tenth transistor T10 is turned on, the low-level signal of the second power supply terminal VGL is written into the fifth node N5 via the tenth transistor T10, the fifth node N5 is at a low level, and a signal output by the first signal output terminal EM_OUT is a low-level signal; since the eleventh transistor T11 is turned off, the low-level signal of the second power supply terminal VGL cannot be written into the sixth node N6 via the eleventh transistor T11. Since the fifth node N5 is at a low level, the twelfth transistor T12 and the fourteenth transistor T14 are turned on, the high-level signal of the first power supply terminal VGH is transmitted to the second signal output terminal IEM_OUT via the fourteenth transistor T14, and a signal output by the second signal output terminal IEM_OUT is a high-level signal. The high-level signal of the first power supply terminal VGH is written into the sixth node N6 via the twelfth transistor T12, the sixth node N6 is at a high level, the thirteenth transistor T13 is turned off, the low-level signal of the second power supply terminal VGL cannot be transmitted to the second signal output terminal IEM_OUT via the thirteenth transistor T13.

In an exemplary implementation mode, the working timing diagram of the shift register of the equivalent circuit diagram of the shift register shown in FIG. 9b is the same as that of FIG. 8. In the circuit diagram shown in FIG. 9b, a fifth capacitor is added on a basis of the circuit diagram shown in FIG. 7, a control electrode of the eleventh transistor T11 is connected with the third node N3 or the fourth node N4, a first electrode plate C51 of the fifth capacitor C5 is connected with the sixth node N6, and a second electrode plate C52 of the fifth capacitor C5 is connected with the first clock signal terminal CLK or the second clock signal terminal CLKB. In FIG. 9b, in a case that the eleventh transistor T11 is connected with the third node N3, working processes of the plurality of transistors are the same as those of the first stage P1 to the sixth stage P6 described above, and in a case that the eleventh transistor T11 is connected with the fourth node N4, working processes of the plurality of transistors are the same as those of the first stage H1 to the sixth stage H6 described above.

In an exemplary implementation mode, the working timing diagram of the shift register of the equivalent circuit diagram of the shift register shown in FIG. 9c is the same as that of FIG. 8, and a fourth capacitor C4 is added in FIG. 9c on a basis of FIG. 9b. The working process of the shift register shown in FIG. 9c may include a first stage M1 to a sixth stage M6, and signals of the signal input terminal IN, the first clock signal terminal CLK, the second clock signal terminal CLKB, and a signal output terminal OUT of the first stage M1 to the sixth stage M6 are the same as those of the first stage P1 to the sixth stage P6 in FIG. 8. Working processes of a plurality of transistors and a plurality of capacitors in the first stage M1 to the sixth stage M6 in a case that the eleventh transistor T11 is connected with the fourth node N4 and the second electrode plate C52 of the fifth capacitor C5 is connected with the first clock signal terminal CLK in the shift register shown in FIG. 9c will be described in detail below.

In the first stage M1, signals of the signal input terminal IN and the second clock signal terminal CLKB are high-level signals and a signal of the first clock signal terminal CLK is a low-level signal. The low-level signal of the first clock signal terminal CLK enables the first transistor T1 and the second transistor T2 to be turned on, a high-level signal input by the signal input terminal IN is written into the first node N1 via the first transistor T1, the first node N1 is at a high level, the third transistor T3, the fifth transistor T5, the eighth transistor T8, and the tenth transistor T10 are turned off, a signal of the second power supply terminal VGL cannot be written into the fifth node N5 via the tenth transistor T10, the fifth node N5 maintains a low level of a previous frame, and the first signal output terminal EM_OUT outputs a low-level signal; since the second transistor T2 is turned on, the low-level signal of the second power supply terminal VGL is written into the second node N2 via the second transistor T2, the second node N2 is at a low level, the fourth transistor T4 and the sixth transistor T6 are turned on, a signal of the first power supply terminal VGH is written into the seventh node N7 via the fourth transistor T4, the seventh node N7 is at a high level, the high level of the first node N1 enables the fifth transistor T5 to be turned off, a signal of the second clock signal terminal CLKB cannot be written into the seventh node N7 via the fifth transistor T5, a high-level signal of the second clock signal terminal CLKB is written into the third node N3 via the sixth transistor T6, the third node N3 is at a high level, since the signal of the second clock signal terminal CLKB is a high-level signal, the seventh transistor T7 is turned off, a high-level signal of the third node N3 cannot be written into the fourth node N4 via the seventh transistor T7, the fourth node N4 maintains a high level of the previous frame, the ninth transistor T9 and the eleventh transistor T11 are turned off, the signal of the first power supply terminal VGH cannot be written into the fifth node N5 via the ninth transistor T9, and the low-level signal of the second power supply terminal VGL cannot be written into the sixth node N6 via the eleventh transistor T11; since the fifth node N5 is at a low level, the twelfth transistor T12 and the fourteenth transistor T14 are turned on, the signal of the first power supply terminal VGH is transmitted to the second signal output terminal IEM_OUT via the fourteenth transistor T14, the second signal output terminal IEM_OUT outputs a high-level signal, the signal of the first power supply terminal VGH is written into the sixth node N6 via the twelfth transistor T12, the sixth node N6 is at a high level, the thirteenth transistor T13 is turned off, and the signal of the second power supply terminal VGL cannot be output to the second signal output terminal IEM_OUT via the thirteenth transistor T13. In this stage, the first signal output terminal EM_OUT outputs a low-level signal, and the second signal output terminal IEM_OUT outputs a high-level signal.

In the second stage M2, signals of the signal input terminal IN and the first clock signal terminal CLK are high-level signals and a signal of the second clock signal terminal CLKB is a low-level signal. A high-level signal of the first clock signal terminal CLK enables the first transistor T1 and the second transistor T2 to be turned off, a high-level signal input by the signal input terminal IN cannot be written into the first node N1 via the first transistor T1, the first node N1 maintains a high level of a previous frame, the third transistor T3, the fifth transistor T5, the eighth transistor T8, and the tenth transistor T10 are turned off, and a signal of the second power supply terminal VGL cannot be written into the fifth node N5 via the tenth transistor T10; since the second transistor T2 is turned off, a low-level signal of the second power supply terminal VGL cannot be written into the second node N2 via the second transistor T2, the second node N2 maintains a low level of the previous frame, the fourth transistor T4 and the sixth transistor T6 are turned on, a signal of the first power supply terminal VGH is written into the seventh node N7 via the fourth transistor T4, the seventh node N7 is at a high level, the high level of the first node N1 enables the fifth transistor T5 to be turned off, the signal of the second clock signal terminal CLKB cannot be written into the seventh node N7 via the fifth transistor T5, the low-level signal of the second clock signal terminal CLKB is written into the third node N3 via the sixth transistor T6, the third node N3 is at a low level, the low-level signal of the second clock signal terminal CLKB enables the seventh transistor T7 to be turned on, the low-level signal of the third node N3 is written into the fourth node N4 via the seventh transistor T7, the fourth node N4 is at a low level, the ninth transistor T9 and the eleventh transistor T11 are turned on, the signal of the first power supply terminal VGH is written into the fifth node N5 via the ninth transistor T9, the fifth node N5 is at a high level, and the first signal output terminal EM_OUT outputs a high-level signal; since the fifth node N5 is at a high level, the twelfth transistor T12 and the fourteenth transistor T14 are turned off, the signal of the first power supply terminal VGH cannot be transmitted to the second signal output terminal IEM_OUT via the fourteenth transistor T14, and the signal of the first power supply terminal VGH cannot be written into the sixth node N6 via the twelfth transistor T12; since the eleventh transistor T11 is turned on, the low-level signal of the second power supply terminal VGL is written into the sixth node N6 via the eleventh transistor T11, the sixth node N6 is at a low level, the thirteenth transistor T13 is turned on, the signal of the second power supply terminal VGL is transmitted to the second signal output terminal IEM_OUT via the thirteenth transistor T13, and the second signal output terminal IEM_OUT outputs a low-level signal. In this stage, the first signal output terminal EM_OUT outputs a high-level signal, and the second signal output terminal IEM_OUT outputs a low-level signal.

In the third stage M3, signals of the signal input terminal IN and the second clock signal terminal CLKB are high-level signals and a signal of the first clock signal terminal CLK is a low-level signal. The low-level signal of the first clock signal terminal CLK enables the first transistor T1 and the second transistor T2 to be turned on, a high-level signal input by the signal input terminal IN is written into the first node N1 via the first transistor T1, the first node N1 is at a high level, the third transistor T3, the fifth transistor T5, the eighth transistor T8, and the tenth transistor T10 are turned off, and a signal of the second power supply terminal VGL cannot be written into the fifth node N5 via the tenth transistor T10; since the second transistor T2 is turned on, a low-level signal of the second power supply terminal VGL is written into the second node N2 via the second transistor T2, the second node N2 is at a low level, the fourth transistor T4 and the sixth transistor T6 are turned on, a signal of the first power supply terminal VGH is written into the seventh node N7 via the fourth transistor T4, the seventh node N7 is at a high level, the high level of the first node N1 enables the fifth transistor T5 to be turned off, a signal of the second clock signal terminal CLKB cannot be written into the seventh node N7 via the fifth transistor T5, a high-level signal of the second clock signal terminal CLKB is written into the third node N3 via the sixth transistor T6, the third node N3 is at a high level, since the signal of the second clock signal terminal CLKB is a high-level signal, the seventh transistor T7 is turned off, a high-level signal of the third node N3 cannot be written into the fourth node N4 via the seventh transistor T7, the fourth node N4 maintains a low level of a previous frame, the ninth transistor T9 and the eleventh transistor T11 are turned on, the signal of the first power supply terminal VGH is written into the fifth node N5 via the ninth transistor T9, the fifth node N5 is at a high level, and the first signal output terminal EM_OUT outputs a high-level signal; since the fifth node N5 is at a high level, the twelfth transistor T12 and the fourteenth transistor T14 are turned off, the signal of the first power supply terminal VGH cannot be transmitted to the second signal output terminal IEM_OUT via the fourteenth transistor T14, the signal of the first power supply terminal VGH cannot be written into the sixth node N6 via the twelfth transistor T12, since the eleventh transistor T11 is turned on, the low-level signal of the second power supply terminal VGL is written into the sixth node N6 via the eleventh transistor T11, the sixth node N6 is at a low level, the thirteenth transistor T13 is turned on, the signal of the second power supply terminal VGL is transmitted to the second signal output terminal IEM_OUT via the thirteenth transistor T13, and the second signal output terminal IEM_OUT outputs a low-level signal. In this stage, the first signal output terminal EM_OUT outputs a high-level signal, and the second signal output terminal IEM_OUT outputs a low-level signal.

In a fourth stage M4, a signal of the first clock signal terminal CLK is a high-level signal, and signals of the signal input terminal IN and the second clock signal terminal CLKB are low-level signals. The high-level signal of the first clock signal terminal CLK enables the first transistor T1 and the second transistor T2 to be turned off, a high-level signal input by the signal input terminal IN cannot be written into the first node N1 via the first transistor T1, the first node N1 maintains a high level of a previous frame, the third transistor T3, the fifth transistor T5, the eighth transistor T8, and the tenth transistor T10 are turned off, and a signal of the second power supply terminal VGL cannot be written into the fifth node N5 via the tenth transistor T10; since the second transistor T2 is turned off, a low-level signal of the second power supply terminal VGL cannot be written into the second node N2 via the second transistor T2, the second node N2 maintains a low level of the previous frame, the fourth transistor T4 and the sixth transistor T6 are turned on, a signal of the first power supply terminal VGH is written into the seventh node N7 via the fourth transistor T4, the seventh node N7 is at a high level, the high level of the first node N1 enables the fifth transistor T5 to be turned off, a signal of the second clock signal terminal CLKB cannot be written into the seventh node N7 via the fifth transistor T5, since the sixth transistor T6 is turned on, a low-level signal of the second clock signal terminal CLKB is written into the third node N3 via the sixth transistor T6, the third node N3 is at a low level, since the signal of the second clock signal terminal CLKB is a low-level signal, the seventh transistor T7 is turned on, a low-level signal of the third node N3 is written into the fourth node N4 via the seventh transistor T7, the fourth node N4 is at a low level, the eleventh transistor T11 and the ninth transistor T9 are turned on, the signal of the first power supply terminal VGH is written into the fifth node N5 via the ninth transistor T9, the fifth node N5 is at a high level, and the first signal output terminal EM_OUT outputs a high-level signal; since the fifth node N5 is at a high level, the twelfth transistor T12 and the fourteenth transistor T14 are turned off, the signal of the first power supply terminal VGH cannot be transmitted to the second signal output terminal IEM_OUT via the fourteenth transistor T14, and the signal of the first power supply terminal VGH cannot be written into the sixth node N6 via the twelfth transistor T12. Since the eleventh transistor T11 is turned on, the low-level signal of the second power supply terminal VGL is written into the sixth node N6 via the eleventh transistor T11, the sixth node N6 is at a low level, the thirteenth transistor T13 is turned on, the signal of the second power supply terminal VGL is transmitted to the second signal output terminal IEM_OUT via the thirteenth transistor T13, and the second signal output terminal IEM_OUT outputs a low-level signal. In this stage, the first signal output terminal EM_OUT outputs a high-level signal, and the second signal output terminal IEM_OUT outputs a low-level signal.

In the fifth stage M5, a signal of the second clock signal terminal CLKB is a high-level signal, and signals of the signal input terminal IN and the first clock signal terminal CLK are low-level signals. A low-level signal of the first clock signal terminal CLK enables the first transistor T1 and the second transistor T2 to be turned on, a low-level signal input by the signal input terminal IN is written into the first node N1, the first node N1 is at a low level, the third transistor T3, the fifth transistor T5, the eighth transistor T8, and the tenth transistor T10 are turned on, a signal of the second power supply terminal VGL is written into the fifth node N5 via the tenth transistor T10, the fifth node N5 is at a low level, and the first signal output terminal EM_OUT outputs a low-level signal; since the second transistor T2 is turned on, the low-level signal of the second power supply terminal VGL is written into the second node N2 via the second transistor T2, the second node N2 is at a low level, the fourth transistor T4 and the sixth transistor T6 are turned on, a signal of the first power supply terminal VGH is written into the seventh node N7 via the fourth transistor T4, the seventh node N7 is at a high level, the high-level signal of the second clock signal terminal CLKB is written into the third node N3 via the sixth transistor T6, the third node N3 is at a high level, since the signal of the second clock signal terminal CLKB is the high-level signal, the seventh transistor T7 is turned off, a high-level signal of the third node N3 cannot be written into the fourth node N4 via the seventh transistor T7, since the eighth transistor T8 is turned on, the signal of the first power supply terminal VGH is written into the fourth node N4 via the eighth transistor T8, the fourth node N4 is at a high level, the ninth transistor T9 and the eleventh transistor T11 are turned off, the signal of the first power supply terminal VGH cannot be written into the fifth node N5 via the ninth transistor T9; since the fifth node N5 is at a low level, the twelfth transistor T12 and the fourteenth transistor T14 are turned on, the signal of the first power supply terminal VGH is transmitted to the second signal output terminal IEM_OUT via the fourteenth transistor T14, the second signal output terminal IEM_OUT outputs a high-level signal, the signal of the first power supply terminal VGH is written into the sixth node N6 via the twelfth transistor T12, the sixth node N6 is at a high level, and the thirteenth transistor T13 is turned off. In this stage, the first signal output terminal EM_OUT outputs a low-level signal, and the second signal output terminal IEM_OUT outputs a high-level signal.

In the sixth stage M6, in this stage, an input signal of the signal input terminal IN remains unchanged as a low-level signal, signals of the first clock signal terminal CLK and the second clock signal terminal CLKB periodically change, and signals output by the first signal output terminal EM_OUT and the second signal output terminal IEM_OUT remain unchanged, i.e., the first signal output terminal EM_OUT outputs a low-level signal and the second signal output terminal IEM_OUT outputs a high-level signal. Description is given below by taking a first sub-stage M61 and a second sub-stage M62 as an example.

In the first sub-stage M61, a signal of the first clock signal terminal CLK is a high-level signal, and a signal of the second clock signal terminal CLKB is a low-level signal. The high-level signal of the first clock signal terminal CLK enables the first transistor T1 and the second transistor T2 to be turned off, a low-level signal input by the signal input terminal IN cannot be written into the first node N1 via the first transistor T1, a low-level signal of the second power supply terminal VGL cannot be written into the second node N2 via the second transistor T2, the first node N1 maintains a low level of a previous frame, the third transistor T3, the fifth transistor T5, the eighth transistor T8, and the tenth transistor T10 are turned on, the high-level signal of the first clock signal terminal CLK is written into the second node N2 via the third transistor T3, the second node N2 is at a high level, the fourth transistor T4 and the sixth transistor T6 are turned off, the low-level signal of the second clock signal terminal CLKB cannot be written into the third node N3 via the sixth transistor T6, the third node N3 maintains a high level of the previous frame, a high-level signal of the first power supply terminal VGH is written into the fourth node N4 via the eighth transistor T8, the fourth node N4 is at a high level, the ninth transistor T9 and the eleventh transistor T11 are turned off, the high-level signal of the first power supply terminal VGH cannot be written into the fifth node N5 via the ninth transistor T9, since the tenth transistor T10 is turned on, the low-level signal of the second power supply terminal VGL is written into the fifth node N5 via the tenth transistor T10, the fifth node N5 is at a low level, and the first signal output terminal EM_OUT outputs a low-level signal; since the eleventh transistor T11 is turned off, the low-level signal of the second power supply terminal VGL cannot be written into the sixth node N6 via the eleventh transistor T11. Since the fifth node N5 is at a low level, the twelfth transistor T12 and the fourteenth transistor T14 are turned on, and the high-level signal of the first power supply terminal VGH is transmitted to the second signal output terminal IEM_OUT via the fourteenth transistor T14. A signal output by the second signal output terminal IEM_OUT is a high-level signal. The high-level signal of the first power supply terminal VGH is written into the sixth node N6 via the twelfth transistor T12, the sixth node N6 is at a high level, the thirteenth transistor T13 is turned off, and the low-level signal of the second power supply terminal VGL cannot be transmitted to the second signal output terminal IEM_OUT.

In the second sub-stage M62, a signal of the first clock signal terminal CLK is a low-level signal, and a signal of the second clock signal terminal CLKB is a high-level signal. The low-level signal of the first clock signal terminal CLK enables the first transistor T1 and the second transistor T2 to be turned on, a low-level signal input by the signal input terminal IN is written into the first node N1 via the first transistor T1, a low-level signal of the second power supply terminal VGL is written into the second node N2 via the second transistor T2, the first node N1 and the second node N2 are both at low-levels, the third transistor T3, the fifth transistor T5, the eighth transistor T8, the tenth transistor T10, and the sixth transistor T6 are turned on, the high-level signal of the second clock signal terminal CLKB is written into the third node N3 via the sixth transistor T6, the third node N3 is at a high level, a high-level signal of the first power supply terminal VGH is written into the fourth node N4 via the eighth transistor T8, the fourth node N4 is at a high level, the ninth transistor T9 and the eleventh transistor T11 are turned off, the high-level signal of the first power supply terminal VGH cannot be written into the fifth node N5 via the ninth transistor T9, since the tenth transistor T10 is turned on, the low-level signal of the second power supply terminal VGL is written into the fifth node N5 via the tenth transistor T10, the fifth node N5 is at a low level, and a signal output by the first signal output terminal EM_OUT is a low-level signal; since the eleventh transistor T11 is turned off, the low-level signal of the second power supply terminal VGL cannot be written into the sixth node N6 via the eleventh transistor T11. Since the fifth node N5 is at a low level, the twelfth transistor T12 and the fourteenth transistor T14 are turned on, and the high-level signal of the first power supply terminal VGH is transmitted to the second signal output terminal IEM_OUT via the fourteenth transistor T14. A signal output by the second signal output terminal IEM_OUT is a high-level signal. The high-level signal of the first power supply terminal VGH is written into the sixth node N6 via the twelfth transistor T12, the sixth node N6 is at a high level, the thirteenth transistor T13 is turned off, and the low-level signal of the second power supply terminal VGL cannot be transmitted to the second signal output terminal IEM_OUT.

In an embodiment of the present disclosure, a light emitting signal EM and its inverted signal IEM may be provided through shift registers shown in FIGS. 7 and 9a-9c above, the light emitting signal EM and the inverted signal IEM have a same period and opposite voltages. As may be seen from the timing diagram of FIG. 8, pulse widths of the light emitting signal EM and its inverted signal IEM may be adjusted according to an input signal IN, that is, the EM signal and its inverted signal IEM with adjustable pulse widths may be provided through one Gate Driver on Array (GOA) circuit shown in FIGS. 7 and 9a-9c. There is no need to set two GOA circuits for the IEM signal and the EM signal, which has a high integration degree and an adjustable pulse width, and may be suitable for different pulse width requirements and different types of signal requirements, and has a wide application range.

Figure 10A:
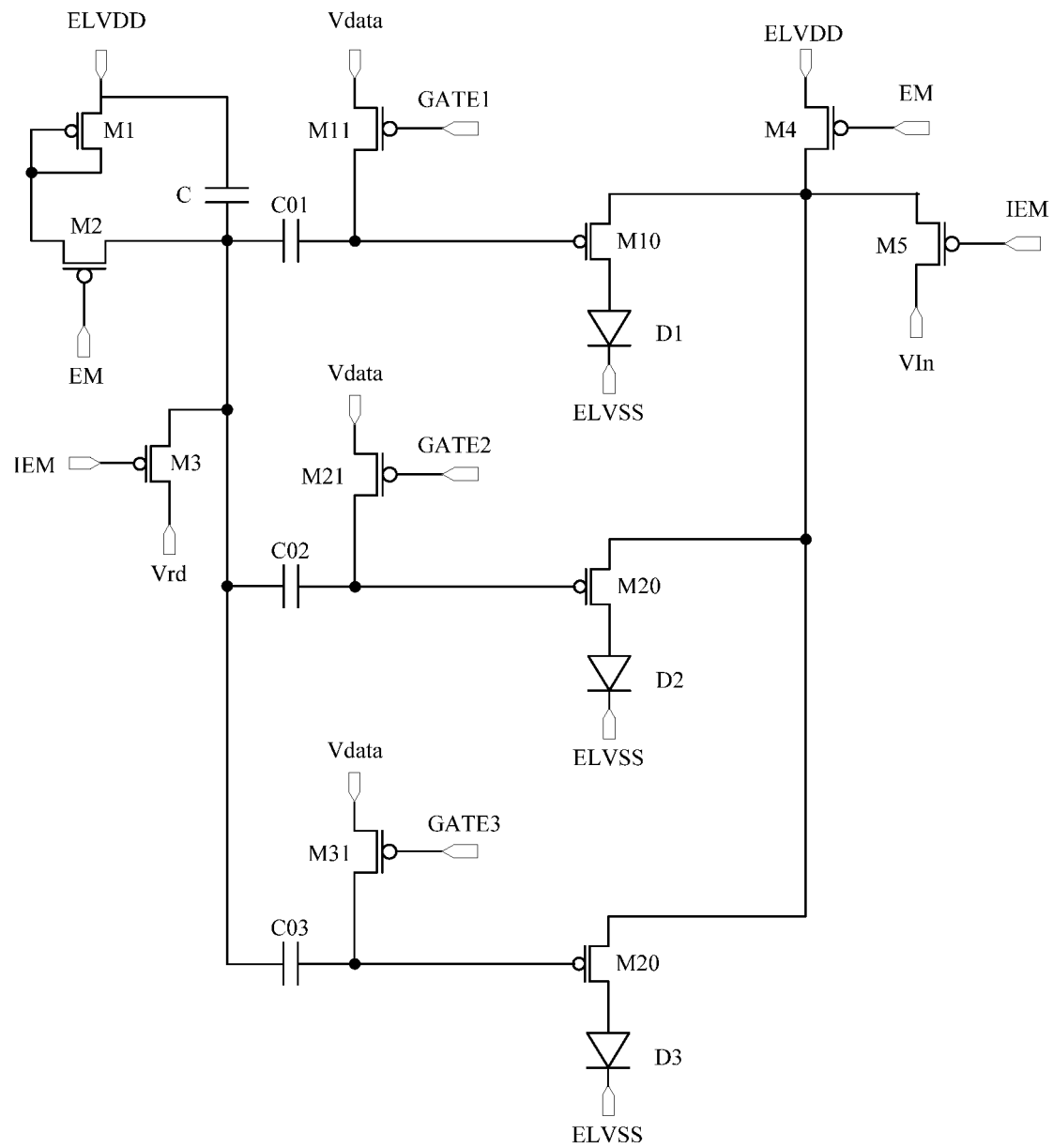
FIG. 10a is an equivalent circuit diagram of a pixel drive circuit.
Figure 10B:
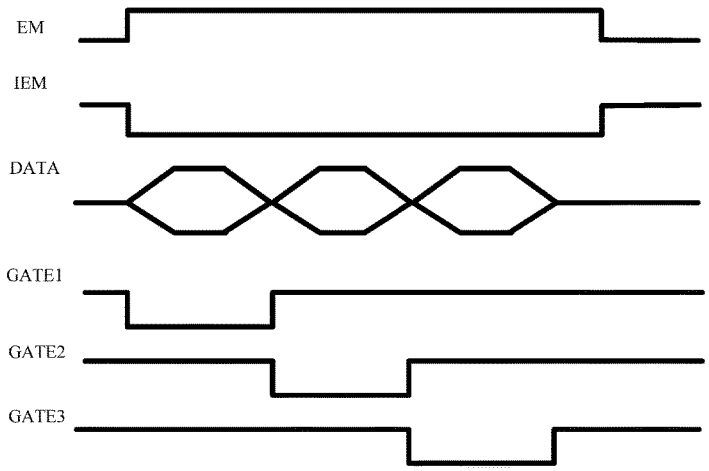
FIG. 10b is a working timing diagram of a pixel drive circuit.

The shift registers shown in FIGS. 7 and 9a-9c in embodiments of the present disclosure may be applied to a pixel circuit shown in FIG. 10a, a signal output by the first signal output terminal EM_OUT is used as an input of the light emitting signal terminal EM in the pixel circuit shown in FIG. 10a, and a signal output by the second signal output terminal IEM_OUT is used as an input of the light emitting signal terminal IEM in the pixel circuit shown in FIG. 10a. FIG. 10b is a working timing diagram of the pixel circuit in FIG. 10a.

Figure 21:
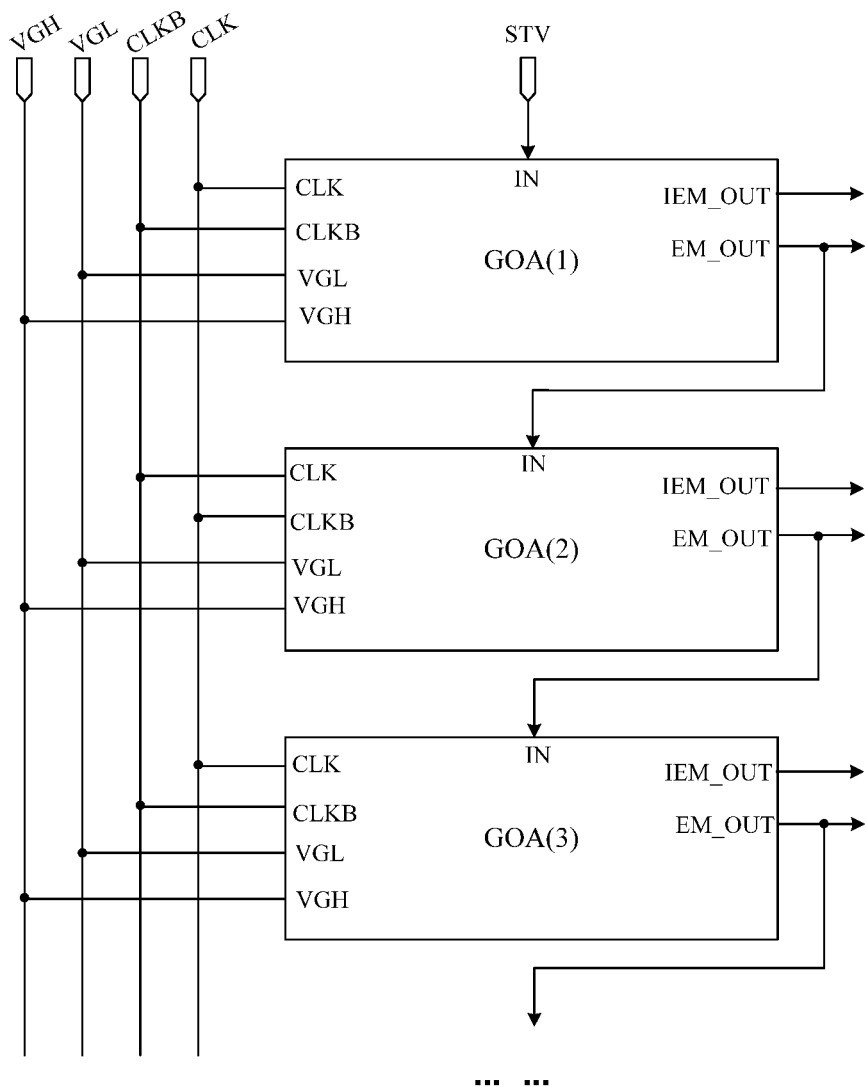
FIG. 21 is a schematic diagram of a cascade relationship of a plurality of shift registers in a display substrate according to an exemplary embodiment of the present disclosure.

An embodiment of the present disclosure also provides a display substrate, the display substrate may include a base substrate and a circuit structure layer disposed on the base substrate, the circuit structure layer includes a light emitting drive circuit, and the light emitting drive circuit includes a plurality of cascaded shift registers, as shown in FIG. 21.

In an exemplary implementation mode, as shown in FIG. 21, a first signal output terminal EM_OUT of a shift register in an i-th stage is electrically connected with a signal input terminal IN of a shift register in an (i+1)-th stage, wherein 1≤i≤M−1 and M is a total number of stages of shift registers, and M may be a positive integer greater than or equal to 2. In an exemplary implementation mode, a signal input terminal IN of a shift register in a first stage may be connected with an initial signal line STV.

In an exemplary implementation mode, at least one shift register in FIG. 21 may be as shown in FIG. 6 and may include: a first control sub-circuit, a second control sub-circuit, a third control sub-circuit, a first output sub-circuit, and a second output sub-circuit.

The first control sub-circuit is respectively connected with a signal input terminal IN, a first node N1, a second node N2, a first clock signal terminal CLK, a second clock signal terminal CLKB, and a first power supply terminal VGH, and is configured to provide a signal of the signal input terminal IN to the first node N1 under control of the first clock signal terminal CLK, the second clock signal terminal CLKB, the second node N2, and the first power supply terminal VGH, and maintain a potential of the first node N1.

The second control sub-circuit is respectively connected with a second power supply terminal VGL, the first clock signal terminal CLK, the first node N1, and the second node N2, and is configured to provide a signal of the second power supply terminal VGL or the first clock signal terminal CLK to the second node N2 under control of the first clock signal terminal CLK and the first node N1.

The third control sub-circuit is respectively connected with the first node N1, the second node N2, a fourth node N4, the second clock signal terminal CLKB, and the first power supply terminal VGH, and is configured to provide a signal of the second clock signal terminal CLKB or the first power supply terminal VGH to the fourth node N4 under control of the second clock signal terminal CLKB, the first node N1, and the second node N2, and maintain a potential of the fourth node N4.

The first output sub-circuit is respectively connected with the first power supply terminal VGH, the second power supply terminal VGL, the first node N1, the fourth node N4, and a first signal output terminal EM_OUT, and is configured to provide a signal of the first power supply terminal VGH or the second power supply terminal VGL to the first signal output terminal EM_OUT under control of the first node N1 and the fourth node N4.

The second output sub-circuit is connected with the first signal output terminal EM_OUT, the third control sub-circuit, the first power supply terminal VGH, the second power supply terminal VGL, and a second signal output terminal IEM_OUT, respectively, and is configured to provide a signal of the first power supply terminal VGH or the second power supply terminal VGL to the second signal output terminal IEM_OUT under control of the third control sub-circuit and the first signal output terminal EM_OUT.

In an embodiment of the present disclosure, the first signal output terminal EM_OUT and the second signal output terminal IEM_OUT may be electrically connected with a pixel circuit of a display region in the display substrate. In an exemplary implementation mode, a signal output by the first signal output terminal EM_OUT and a signal output by the second signal output terminal IEM_OUT may be mutually inverted signals.

In an exemplary implementation mode, the shift register may be the shift register provided in any of the foregoing embodiments and has a similar implementation principle and an implementation effect, which will not be repeated here.

For different display products, cascade relationships of multiple shift registers in a light emitting drive circuit may be different. Regardless of the cascade relationships of the plurality of shift registers and no matter how many rows of sub-pixels are driven by each of the shift registers, as long as such a large-area device is changed and such a change generates additional space, both possible simple translation and stretching of a small device are within protection scope of the present disclosure.

In an exemplary implementation mode, a circuit schematic diagram of the shift register in the display substrate of the embodiment of the present disclosure may be as shown in any of circuit schematic diagrams shown in FIG. 7 and FIGS. 9a to 9c and will not be repeated here.

In an exemplary embodiment, the display substrate of the embodiment of the present disclosure may be applied to a display apparatus with a light emitting drive circuit, such as an OLED, a quantum dot display (QLED), a light emitting diode display (Micro LED or Mini LED), or a Quantum Dot Light Emitting Diode display (QDLED), which is not limited here in the embodiment of the present disclosure.

In an exemplary embodiment, the display substrate may further include a light emitting structure layer disposed on a side of a circuit structure layer away from a base substrate.

The light emitting structure layer includes light emitting elements arranged in an array and located in the display region.

In an exemplary embodiment, a light emitting element may be an Organic Light Emitting Diode (OLED) or a Quantum dot Light Emitting Diode (QLED). Among them, the OLED may include a first electrode (anode), an organic emitting layer, and a second electrode (cathode) that are stacked. In an exemplary implementation mode, a layout structure corresponding to the circuit schematic diagram shown in FIG. 9a may be as shown in FIGS. 11 to 15b or as shown in FIGS. 16 to 20b.

In an exemplary implementation mode, as shown in FIGS. 15a-15b and 20a-20b, the display substrate may further include an initial signal line STV, a first clock signal line CLK, a second clock signal line CLKB, a second power supply line VGL, and a third power supply line VGH2 extending along a second direction Y, the initial signal line STV, the first clock signal line CLK, the second clock signal line CLKB, the third power supply line VGH2, and the second power supply line VGL are arranged along a first direction X, and the first direction X intersects with the second direction Y.

A signal input terminal IN of a shift register in a first stage is electrically connected with the initial signal line STV, first power supply terminals VGH of all shift registers are electrically connected with the third power supply line VGH2, second power supply terminals VGL of all shift registers are electrically connected with the second power supply line VGL, a clock signal terminal of a shift register in an i-th stage is electrically connected with one clock signal line of the first clock signal line CLK and the second clock signal line CLKB, first clock signal terminals CLK of shift registers in odd-numbered stages are connected with the first clock signal line CLK, second clock signal terminals CLKB of shift registers in odd-numbered stages are connected with the second clock signal line CLKB, first clock signal terminals CLK of shift registers in even-numbered stages are connected with the second clock signal line CLKB, and second clock signal terminals CLKB of shift registers in even-numbered stages are connected with the first clock signal line CLK.

In an exemplary implementation mode, as shown in FIGS. 15a-15b and 20a-20b, the circuit structure layer may include a semiconductor layer, a first insulation layer, a first conductive layer, a second insulation layer, a second conductive layer, a third insulation layer, and a third conductive layer which are sequentially stacked on the base substrate.

The semiconductor layer may include: active layers of all transistors located in the light emitting drive circuit.

The first conductive layer may include control electrodes of all transistors and a first electrode plate of a first capacitor C1 to a first electrode plate of a third capacitor C3 located in the light emitting drive circuit.

The second conductive layer may include a second electrode plate of the first capacitor C1 to a second electrode plate of the third capacitor C3 located in the light emitting drive circuit.

The third conductive layer may include the initial signal line STV, the first clock signal line CLK, the second clock signal line CLKB, a first power supply line VGH1, and the second power supply line VGL.

In an exemplary implementation mode, the third conductive layer may further include first electrodes and second electrodes of all transistors located in the light emitting drive circuit.

Figure 15A:
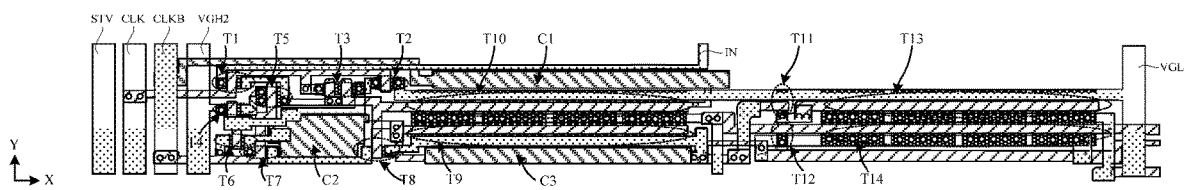
FIG. 15a is a schematic diagram of a display substrate according to an exemplary embodiment of the present disclosure after a pattern of a third conductive layer is formed.

In an exemplary implementation mode, as shown in FIG. 15a, a shift register may include a first transistor T1 to a fourteenth transistor T14.

In a plane where the display substrate is located, in the first direction X, all transistors and capacitors are located between the third power supply line VGH2 and the second power supply line VGL, the second capacitor C2 is located between the third power supply line VGH2 and the eighth transistor T8, the eighth transistor T8 is located between the second capacitor C2, and the ninth transistor T9 and the tenth transistor T10, the ninth transistor T9 and the tenth transistor T10 are located between the eighth transistor T8, and the eleventh transistor T11 and the twelfth transistor T12, the eleventh transistor T11 and the twelfth transistor T12 are located between the ninth transistor T9 and the tenth transistor T10 and the tenth transistor T13 and the fourteenth transistor T14, the thirteenth transistor T13 and the fourteenth transistor T14 are located between the eleventh transistor T11 and the twelfth transistor T12 and the second power supply line VGL; in the second direction Y, the third capacitor C3, the ninth transistor T9, the tenth transistor T10, and the first capacitor C1 are sequentially arranged along the second direction Y, the twelfth transistor T12 and the eleventh transistor T11 are sequentially arranged along the second direction Y, and the fourteenth transistor T14 and the thirteenth transistor T13 are sequentially arranged along the second direction Y.

Figure 12A:
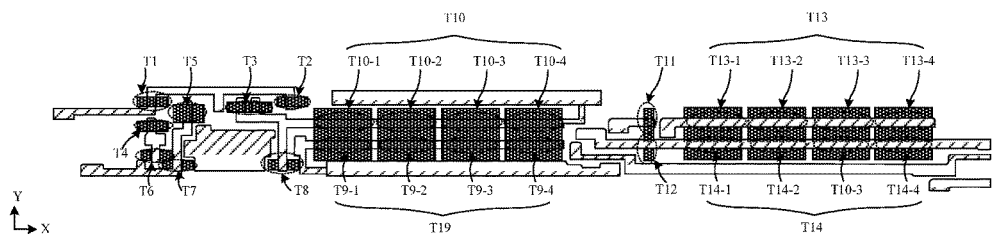
FIG. 12a is a schematic diagram of a display substrate according to an exemplary embodiment of the present disclosure after a pattern of a first conductive layer is formed.
Figure 12B:
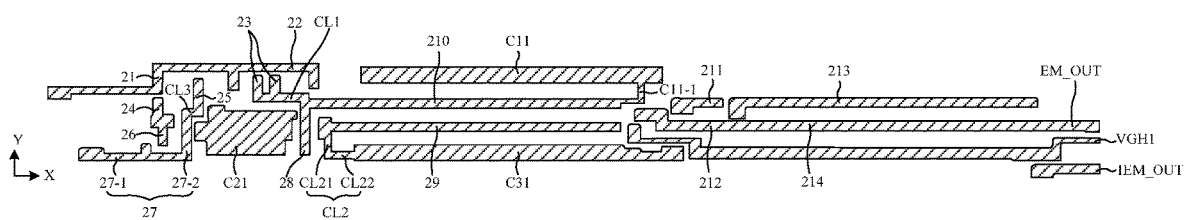
FIG. 12b is a schematic diagram of a first conductive layer in a display substrate according to an exemplary embodiment of the present disclosure.

In an exemplary implementation mode, as shown in FIG. 12b, the first conductive layer may further include the first power supply line VGH1 which may be connected with a first power supply terminal VGH; the first power supply line VGH1 may have a shape of a broken line and extend along the first direction X.

On a plane parallel to the display substrate, in the first direction X, the first power supply line VGH1 may be located on a side of the third capacitor C3 away from a control electrode of the eighth transistor T8; in the second direction Y, the first power supply line VGH1 may be located on a side of a control electrode of the fourteenth transistor T14 away from a control electrode of the thirteenth transistor T13.

In an exemplary implementation mode, an orthographic projection of the first power supply line VGH1 on the base substrate may be at least partially overlapped with orthographic projections of a first electrode of the ninth transistor T9, a first electrode of the twelfth transistor T12, and a first electrode of the fourteenth transistor T14 on the base substrate, respectively.

Figure 15B:
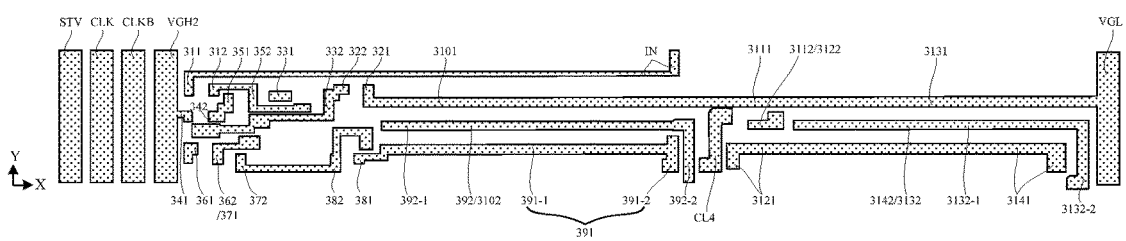
FIG. 15b is a schematic diagram of a third conductive layer in a display substrate according to an exemplary embodiment of the present disclosure.

As shown in FIG. 15b, a first electrode of the eighth transistor T8 and the first electrode of the ninth transistor T9 in the third conductive layer may be of an integrally formed structure.

In an exemplary implementation mode, as shown in FIG. 12b, the first conductive layer may further include a first signal output line EM_OUT and a second signal output line IEM_OUT; the first signal output line EM_OUT may have a shape of a strip and extend along the first direction X, and the second signal output line IEM_OUT is in an "L" shape.

In a plane where the first conductive layer is located, in the second direction Y, the first signal output line EM_OUT is located between a control electrode of the thirteenth transistor T13 and the first power supply line VGH1, the first signal output line EM_OUT and a control electrode of the fourteenth transistor T14 may be of an integrally formed structure, and the second signal output line IEM_OUT may be located on a side of the first power supply line VGH1 away from the first signal output line EM_OUT; in the first direction X, the first signal output line EM_OUT is located on a side of the control electrode of the fourteenth transistor T14 away from a control electrode of the twelfth transistor T12, and the second signal output line IEM_OUT is located on a side of the first electrode plate C31 of the third capacitor C3 away from a control electrode of the eighth transistor T8.

In an exemplary implementation mode, as shown in FIG. 12b, the first conductive layer may further include a second connection line CL2, the second connection line CL2, the first electrode plate C31 of the third capacitor C3, a control electrode of the ninth transistor T9 may be of an integrally formed structure, and a control electrode of the eleventh transistor T11 may be in an "L" shape.

In an exemplary implementation mode, as shown in FIG. 15b, the third conductive layer may further include a fourth connection line CL4, a shape of the fourth connection line CL4 may be a shape of a broken line and may extend along the second direction Y, an orthographic projection of the fourth connection line CL4 on the base substrate is at least partially overlapped with overlapped with orthographic projections of the control electrode of the eleventh transistor T11 and the first electrode plate C31 of the third capacitor C3 on the base substrate, respectively.

In an exemplary implementation mode, as shown in FIG. 15b, a second electrode 392 of the ninth transistor T9 may include a third structure 392-1 and a fourth structure 392-2 connected with each other, the third structure 392-1 may have a shape of a strip and extend along the first direction X, is located between a second electrode of the eighth transistor T8 and the fourth connection line CL4, and is connected with the fourth structure 392-2 at an end close to the fourth connection line CL4; the fourth structure 392-2 may have a shape of a strip and extend along the second direction Y, and one end close to the third structure 392-1 is connected with the third structure 392-1.

In an exemplary implementation mode, as shown in FIG. 15b, a second electrode 3132 of the thirteenth transistor T13 may include a fifth structure 3132-1 and a sixth structure 3132-2 connected with each other, the fifth structure 3132-1 may have a shape of a strip, extend along the first direction X and is located between a first electrode 3131 of the thirteenth transistor T13 and a first electrode 3141 of the fourteenth transistor T14; the sixth structure 3132-2 may be in an "L" shape, is located between the first electrode 3141 of the fourteenth transistor T14 and the second power supply line VGL in the first direction X, and is connected with the fifth structure 3132-1 on a side close to the first electrode 3131 of the thirteenth transistor T13 in the second direction Y. An orthographic projection of the sixth structure 3132-2 on the base substrate is at least partially overlapped with an orthographic projection of the second signal output line IEM_OUT on the base substrate.

In an exemplary implementation mode, as shown in FIG. 15b, a first electrode 3121 of the twelfth transistor T12 and the first electrode 3141 of the fourteenth transistor T14 are both in an "L" shape and are located on a side of the fourth connection line CL4 away from the third power supply line VGH2.

Figure 20A:
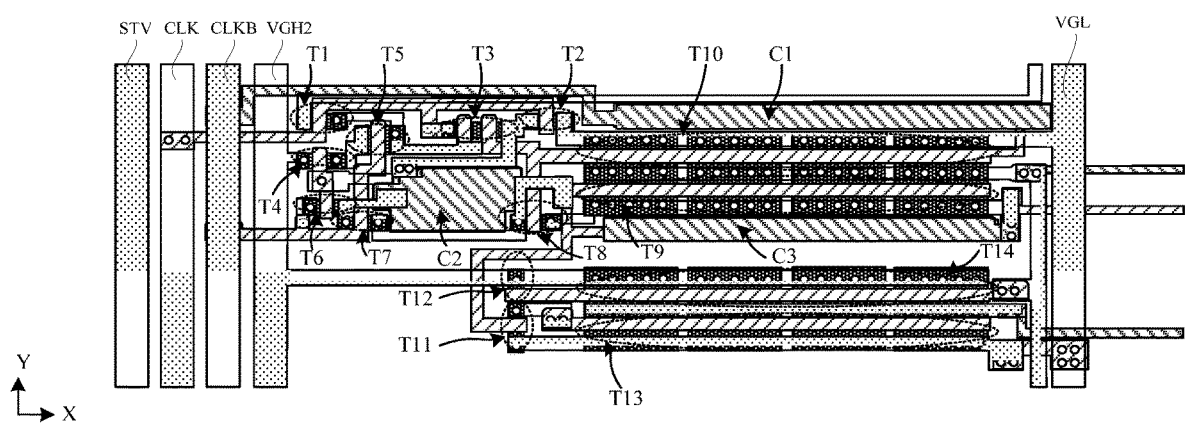
FIG. 20a is a schematic diagram of a display substrate according to an exemplary embodiment of the present disclosure after a pattern of a third conductive layer is formed.

In an exemplary implementation mode, as shown in FIG. 20a, the shift register may include a first transistor T1 to a fourteenth transistor T14.

In a plane where the display substrate is located, in the first direction X, all transistors and capacitors are located between the third power supply line VGH2 and the second power supply line VGL, the second capacitor C2 is located between the third power supply line VGH2 and the eighth transistor T8, the eighth transistor T8 is located between the second capacitor C2, and the ninth transistor T9 and the tenth transistor T10, the ninth transistor T9 and the tenth transistor T10 are located between the eighth transistor T8 and the second power supply line VGL, the eleventh transistor T11 and the twelfth transistor T12 are located between the third power supply line VGH2, and the thirteenth transistor T13 and the fourteenth transistor T14, and the thirteenth transistor T13 and the fourteenth transistor T14 are located between the eleventh transistor T11 and the twelfth transistor T12 and the second power supply line VGL; in the second direction Y, the thirteenth transistor T13, the fourteenth transistor T14, the third capacitor C3, the ninth transistor T9, the tenth transistor T10, and the first capacitor C1 are sequentially arranged along the second direction Y.

Figure 17A:
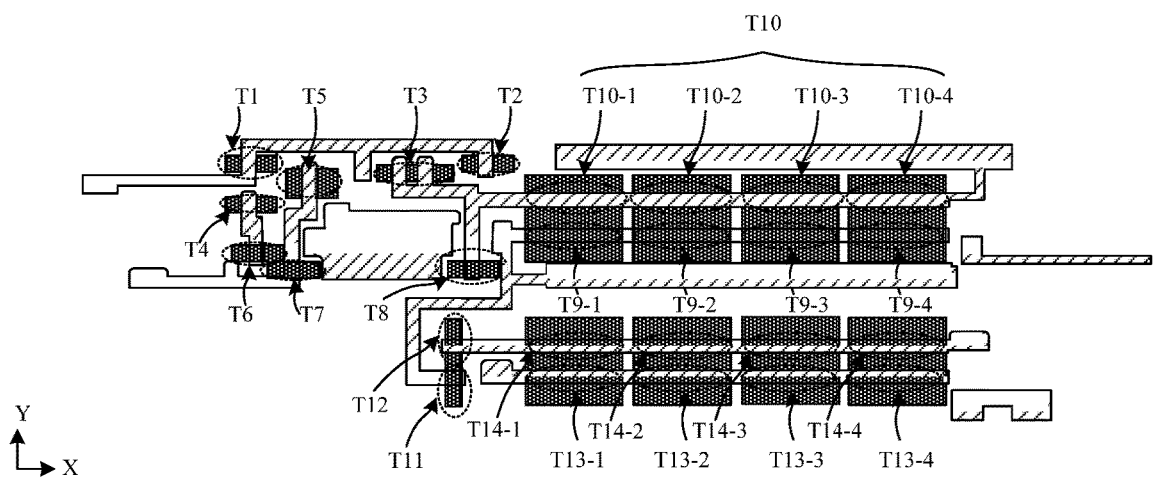
FIG. 17a is a schematic diagram of a display substrate according to an exemplary embodiment of the present disclosure after a pattern of a first conductive layer is formed.
Figure 17B:
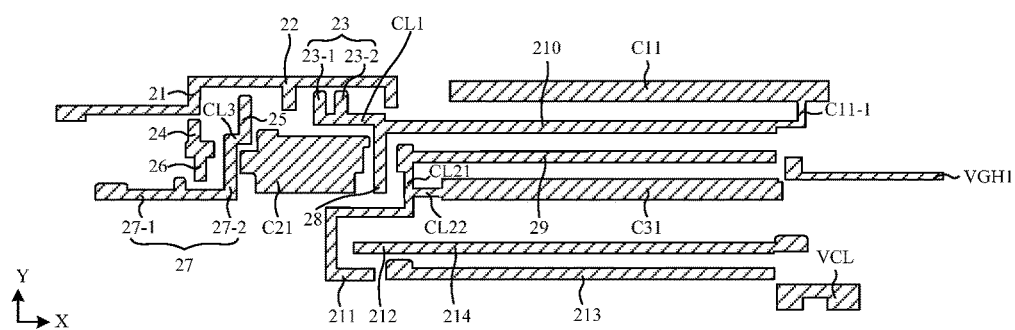
FIG. 17b is a schematic diagram of a first conductive layer in a display substrate according to an exemplary embodiment of the present disclosure.

In an exemplary implementation mode, as shown in FIG. 17b, the first conductive layer may further include a first power supply line VGH1 which may be connected with the first power supply terminal VGH; the first power supply line VGH1 may be in an "L" shape.

In a plane where the first conductive layer is located, in the first direction X, the first power supply line VGH1 may be located on a side of the first electrode plate C31 of the third capacitor C3 away from the first electrode plate C21 of the second capacitor C2; in the second direction Y, the first power supply line VGH1 may be located between the control electrode of the fourteenth transistor T14 and the first electrode plate C11 of the first capacitor C1.

Figure 20B:
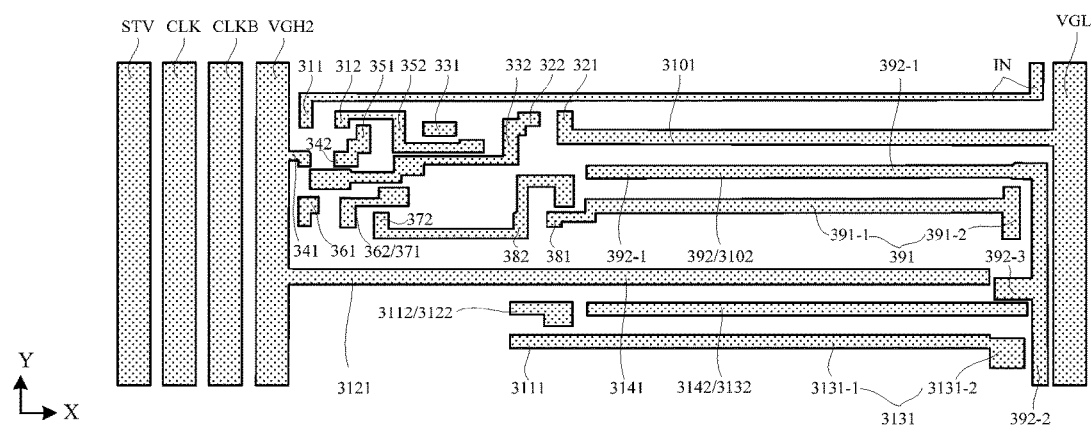
FIG. 20b is a schematic diagram of a third conductive layer in a display substrate according to an exemplary embodiment of the present disclosure.

In an exemplary implementation mode, as shown in FIGS. 17b and 20a-20b, an orthographic projection of the first power supply line VGH1 on the base substrate is at least partially overlapped with an orthographic projection of a first electrode 391 of the ninth transistor T9 on the base substrate.

In an exemplary implementation mode, as shown in FIGS. 20a-20b, a first electrode 381 of the eighth transistor T8 and the first electrode 391 of the ninth transistor T9 in the third conductive layer may be of an integrally formed structure.

Figure 18A:
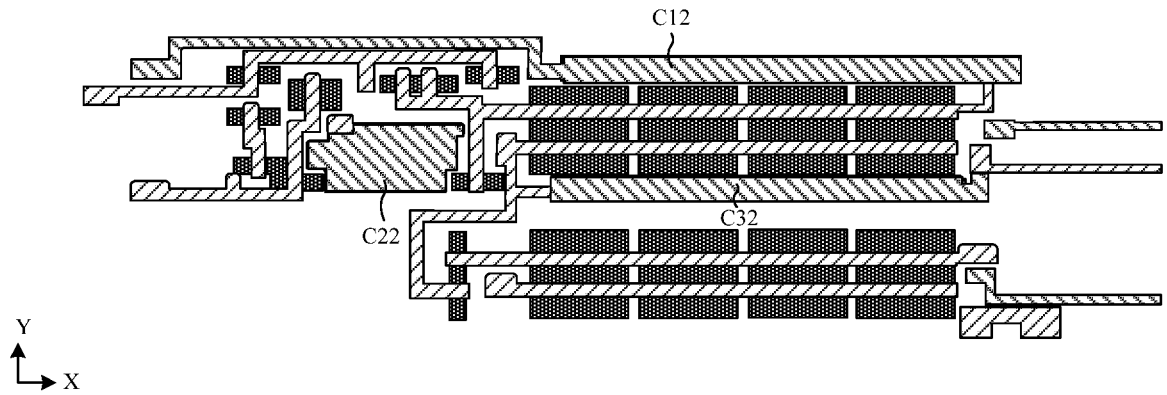
FIG. 18a is a schematic diagram of a display substrate according to an exemplary embodiment of the present disclosure after a pattern of a second conductive layer is formed.
Figure 18B:
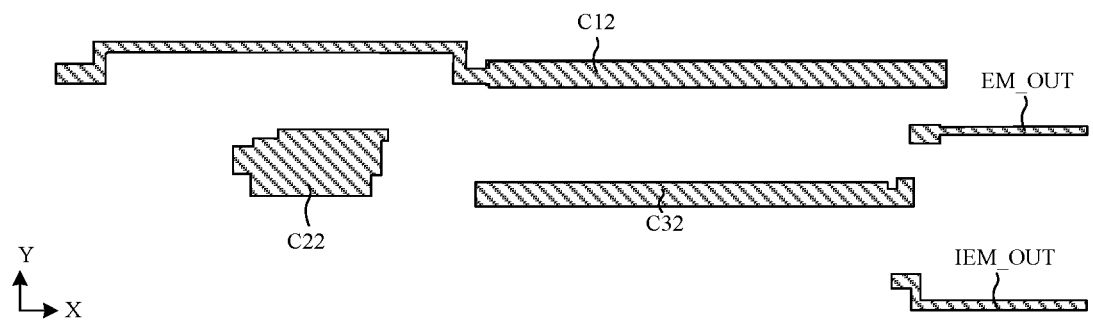
FIG. 18b is a schematic diagram of a second conductive layer in a display substrate according to an exemplary embodiment of the present disclosure.

In an exemplary implementation mode, as shown in FIGS. 17b and 18b, the first conductive layer may further include a power supply connection line VCL, and the second conductive layer may further include a first signal output line EM_OUT, a second signal output line IEM_OUT; the first signal output line EM_OUT and the second signal output line IEM_OUT may both have a shape of a broken line extending along the first direction X.

In a plane where the second conductive layer is located, in the second direction Y, the first signal output line EM_OUT may be located between the second electrode plate C12 of the first capacitor C1 and the second electrode plate C32 of the third capacitor C3, and the second signal output line IEM_OUT may be located on a side of the second electrode plate C32 of the third capacitor C3 away from the second electrode plate C12 of the first capacitor C1; in the first direction X, both the first signal output line EM_OUT and the second signal output line IEM_OUT are located on a side of the second electrode plate C32 of the third capacitor C3 away from the second electrode plate C22 of the second capacitor C2.

In an exemplary implementation mode, as shown in FIG. 17b, the power supply connection line VCL may be in an "n" shape, may be located on a side of a control electrode of the thirteenth transistor T13 away from a control electrode of the fourteenth transistor T14 in the second direction Y, and is provided with an opening facing away from a side of the thirteenth transistor T13; in an exemplary implementation mode, as shown in FIGS. 17b and 20a-20b, an orthographic projection of the power supply connection line VCL on the base substrate may be at least partially overlapped with orthographic projections of the second power supply line VGL and a first electrode of the thirteenth transistor T13 on the base substrate, respectively.

In an exemplary implementation mode, as shown in FIGS. 17b and 20a-20b, the first conductive layer may further include a second connection line CL2, the second connection line CL2 may be integrally formed with a first electrode plate C31 of the third capacitor C3, a control electrode 29 of the ninth transistor T9, and a control electrode 211 of the eleventh transistor T11, the control electrode 211 of the eleventh transistor T11 may be in an "n" shape and be provided with an opening facing a side of the twelfth transistor T12.

In an exemplary implementation mode, as shown in FIGS. 20a-20b, the second electrode 392 of the ninth transistor T9 may include a third structure 392-1, a fourth structure 392-2, and a ninth structure 392-3 connected with each other, the third structure 392-1 may be in a shape of a strip and extend along the first direction X, be located between a second electrode 382 of the eighth transistor T8 and the second power supply line VGL, and connected with the fourth structure 392-2 at an end close to the second power supply line VGL; the fourth structure 392-2 may have a shape of a strip, may be located on a side of the second power supply line VGL close to the third power supply line VGH2, and extend along the second direction Y, and one end close to the third structure 392-1 is connected with the third structure 392-1; the ninth structure 392-3 has a shape of a strip and is located on a side of the fourth structure 392-2 away from the second power supply line VGL, an orthographic projection of the fourth structure 392-3 on the base substrate is at least partially overlapped with an orthographic projection of a control electrode 24 of the fourth transistor T4 on the base substrate.

In an exemplary implementation mode, as shown in FIGS. 20a-20b, the second electrode 3132 of the thirteenth transistor T13 may be of a strip structure and extend along the first direction X, the first electrode 3131 of the thirteenth transistor T13 may include a seventh structure 3131-1 and an eighth structure 3131-2 connected with each other, the seventh structure 3131-1 may have a shape of a strip and extend along the first direction X, with one end connected with a first electrode 3111 of the eleventh transistor T11 and the other end connected with the eighth structure 3131-2; the eighth structure 3131-2 may be of a square structure and may be integrally formed with the seventh structure 3131-1, and an orthographic projection of the eighth structure 3131-2 on the base substrate is at least partially overlapped with an orthographic projection of the power supply connection line VCL on the base substrate.

In an exemplary implementation mode, as shown in FIGS. 20a-20b, first electrodes of the twelfth transistor T12 and the fourteenth transistor T14 may have a shape of a strip structure extending along the first direction X and connected with each other, one end of the first electrode 3121 of the twelfth transistor T12 is connected with the third power supply line VGH2, the other end is connected with the first electrode 3141 of the fourteenth transistor T14, the first electrode 3141 of the fourteenth transistor T14 may be located on a side of the first electrode 3121 of the twelfth transistor T12 away from the third power supply line VGH2, and the first electrode 3121 of the twelfth transistor T12 may be of an integrally formed structure with the first electrode 3141 of the fourteenth transistor T14 and the third power supply line VGH2.

In an exemplary implementation mode, as shown in FIGS. 15a-15b and 20a-20b, the third conductive layer may further include a signal input line IN, the signal input line IN may have a shape of a broken line and extend along the first direction X, in a plane where the third conductive layer is located, in the first direction X, the signal input line IN may be located between the third power supply line VGH2 and the second power supply line VGL; in the second direction Y, the signal input line IN may be located on a side of the tenth transistor T10 away from the ninth transistor T9.

In an exemplary implementation mode, the signal input line IN may be of an integrally formed structure with the first electrode 311 of the first transistor T1.

In an exemplary implementation mode, as shown in FIGS. 15a-15b and 20a-20b, in a plane where the second conductive layer is located, the second electrode plate C22 of the second capacitor C2 and the first electrode plate C31 of the third capacitor C3 may be arranged along the first direction X, and in the second direction Y, the second electrode plate C22 of the second capacitor C2 and the second electrode plate C32 of the third capacitor C3 are located on a same side of the second electrode plate C12 of the first capacitor C1.

The second electrode plate C12 of the first capacitor C1 may have a shape of a broken line and extends along the first direction X, and an orthographic projection of the second electrode plate C12 of the first capacitor C1 on the base substrate and an orthographic projection of the first electrode plate C11 of the first capacitor C1 on the base substrate have an overlapping region; the second electrode plate C22 of the second capacitor C2 may have a square shape, and an orthographic projection of the second electrode plate C22 of the second capacitor C2 on the base substrate and an orthographic projection of the first electrode plate C21 of the second capacitor C2 on the base substrate have an overlapping region; the second electrode plate C32 of the third capacitor C3 may have a shape of a strip and extend along the first direction X, and an orthographic projection of the second electrode plate C32 of the third capacitor C3 on the base substrate and an orthographic projection of the first electrode plate C31 of the third capacitor C3 on the base substrate have an overlapping region.

In an exemplary implementation mode, as shown in FIGS. 13b, 15a, 17b, and 20a, a power supply line connected with the first power supply terminal VGH may include the first power supply line VGH1 and the third power supply line VGH2, and the first power supply terminal VGH may include one power supply terminal or a plurality of power supply terminals. For example, the first power supply terminal VGH may include a first sub-power supply terminal and a second sub-power supply terminal, the first power supply line VGH1 may be connected with the first sub-power supply terminal, and the third power supply line VGH2 may be connected with the second sub-power supply terminal.

In an exemplary implementation mode, as shown in FIGS. 12a, 15a, 17a, and 20a, any one of the ninth transistor T9, the tenth transistor T10, the thirteenth transistor T13, and the fourteenth transistor T14 may include a plurality of sub-transistors that are connected in parallel with each other, and active layers of the plurality of sub-transistors are disposed independently of each other, control electrodes of the plurality of sub-transistors are of an integrally formed structure, first electrodes of the plurality of sub-transistors are of an integrally formed structure, and second electrodes of the plurality of sub-transistors are of an integrally formed structure. For example, any one of the ninth transistor T9, the tenth transistor T10, the thirteenth transistor T13, and the fourteenth transistor T14 may include four sub-transistors connected in parallel with each other, and active layers of the four sub-transistors are independent of each other, control electrodes of the four sub-transistors are of an integrally formed structure, first electrodes of the four sub-transistors are of an integrally formed structure, and second electrodes of the four sub-transistors are of an integrally formed structure.

For example, as shown in FIGS. 11-12b, 15a-15b, 16-17b, and 20a-20b, the ninth transistor T9 may include a first sub-transistor T9-1, a second sub-transistor T9-2, a third sub-transistor T9-3, and a fourth sub-transistor T9-4 connected in parallel with each other. Active layers of the first sub-transistor T9-1, the second sub-transistor T9-2, the third sub-transistor T9-3, and the fourth sub-transistor T9-4 are respectively a first sub-active layer 19-1, a second sub-active layer 19-2, a third sub-active layer 19-3, a fourth sub-active layer 19-4, control electrodes of the first sub-transistor T9-1, the second sub-transistor T9-2, the third sub-transistor T9-3, and the fourth sub-transistor T9-4 are of an integrally formed structure and form a control electrode 29 of the ninth transistor T9, first electrodes of the first sub-transistor T9-1, the second sub-transistor T9-2, the third sub-transistor T9-3, and the fourth sub-transistor T9-4 are of an integrally formed structure and form the first electrode 391 of the ninth transistor T9, and second electrodes of the first sub-transistor T9-1, the second sub-transistor T9-2, the third sub-transistor T9-3, and the fourth sub-transistor T9-4 are of an integrally formed structure and form the second electrode 392 of the ninth transistor T9.

The tenth transistor T10 may include a fifth sub-transistor T10-1, a sixth sub-transistor T10-2, a seventh sub-transistor T10-3, and an eighth sub-transistor T10-4 connected in parallel with each other. Active layers of the fifth sub-transistor T10-1, the sixth sub-transistor T10-2, the seventh sub-transistor T10-3, and the eighth sub-transistor T10-4 are a fifth sub-active layer 110-1, a sixth sub-active layer 110-2, a seventh sub-active layer 110-3, an eighth sub-active layer 110-4, respectively, control electrodes of the fifth sub-transistor T10-1, the sixth sub-transistor T10-2, the seventh sub-transistor T10-3, and the eighth sub-transistor T10-4 are of an integrally formed structure and form a control electrode 210 of the tenth transistor T10, first electrodes of the fifth sub-transistor T10-1, the sixth sub-transistor T10-2, the seventh sub-transistor T10-3, and the eighth sub-transistor T10-4 are of an integrally formed structure and form a first electrode 3101 of the tenth transistor T10, and second electrodes of the fifth sub-transistor T10-1, the sixth sub-transistor T10-2, the seventh sub-transistor T10-3, and the eighth sub-transistor T10-4 are of an integrally formed structure and form a second electrode 3102 of the tenth transistor T10.

The thirteenth transistor T13 may include a ninth sub-transistor T13-1, a tenth sub-transistor T13-2, an eleventh sub-transistor T13-3, and a twelfth sub-transistor T13-4 connected in parallel with each other, active layers of the ninth sub-transistor T13-1, the tenth sub-transistor T13-2, the eleventh sub-transistor T13-3, and the twelfth sub-transistor T13-4 are a ninth sub-active layer 113-1, the tenth sub-active layer 113-2, a eleventh sub-active layer 113-3, and a twelfth sub-active layer 113-4, respectively, control electrodes of the ninth sub-transistor T13-1, the tenth sub-transistor T13-2, the eleventh sub-transistor T13-3, and the twelfth sub-transistor T13-4 are of an integrally formed structure and form a control electrode 213 of the thirteenth transistor T13, first electrodes of the ninth sub-transistor T13-1, the tenth sub-transistor T13-2, the eleventh sub-transistor T13-3, and the twelfth sub-transistor T13-4 are of an integrally formed structure and form a first electrode 3131 of the thirteenth transistor T13, second electrodes of the ninth sub-transistor T13-1, the tenth sub-transistor T13-2, the eleventh sub-transistor T13-3, and the twelfth sub-transistor T13-4 are of an integrally formed structure and form a second electrode 3132 of the thirteenth transistor T13.

The fourteenth transistor T14 may include a thirteenth sub-transistor T14-1, a fourteenth sub-transistor T14-2, a fifteenth sub-transistor T14-3, and a sixteenth sub-transistor T14-4 that are connected in parallel with each other, active layers of the thirteenth sub-transistor T14-1, the fourteenth sub-transistor T14-2, the fifteenth sub-transistor T14-3, and the sixteenth sub-transistor T14-4 are a thirteenth sub-active layer 114-1, a fourteenth sub-active layer 114-2, a fifteenth sub-active layer 114-3, and a sixteenth sub-active layer 114-4, respectively, control electrodes of the thirteenth sub-transistor T14-1, the fourteenth sub-transistor T14-2, the fifteenth sub-transistor T14-3, and the sixteenth sub-transistor T14-4 may be of an integrally formed structure and form a control electrode 214 of the fourteenth transistor T14, first electrodes of the thirteenth sub-transistor T14-1, the fourteenth sub-transistor T14-2, the fifteenth sub-transistor T14-3, and the sixteenth sub-transistor T14-4 may be of an integrally formed structure and form a first electrode 3141 of the fourteenth transistor T14, second electrodes of the thirteenth sub-transistor T14-1, the fourteenth sub-transistor T14-2, the fifteenth sub-transistor T14-3, and the sixteenth sub-transistor T14-4 may be of an integrally formed structure and form a second electrode 3142 of the fourteenth transistor T14. In an embodiment of the present disclosure, the ninth transistor T9 and the tenth transistor T10 connected with the first output signal line EM_OUT are both connected in parallel with each other by a plurality of sub-transistors, active layers of a plurality of sub-transistors in any one transistor are disposed independently of each other, control electrodes of the plurality of sub-transistors are integrally formed, first electrodes of the plurality of sub-transistors are integrally formed, and second electrodes of the plurality of sub-transistors are integrally formed, which may improve reliability of an output of the first output signal terminal EM_OUT of the shift register. In addition, dividing a large transistor into a plurality of small transistors may facilitate heat dissipation.

In an embodiment of the present disclosure, the thirteenth transistor T13 and the fourteenth transistor T14 connected with the second output signal line IEM_OUT are both connected in parallel with each other by a plurality of sub-transistors, active layers of a plurality of sub-transistors in any one transistor are disposed independently of each other, control electrodes of the plurality of sub-transistors are integrally formed, first electrodes of the plurality of sub-transistors are integrally formed, and second electrodes of the plurality of sub-transistors are integrally formed, which may improve reliability of an output of the first output signal terminal EM_OUT of the shift register. In addition, dividing a large transistor into a plurality of small transistors may facilitate heat dissipation.

In an exemplary implementation mode, as shown in FIGS. 15a and 20a, in a plane where the display substrate is located, in the first direction X, the first transistor T1 and the fourth transistor T4 to the seventh transistor T7 are located between the third power supply line VGH2 and the second capacitor C2, and the second transistor T2 and the third transistor T3 are located between the fifth transistor T5 and the first capacitor C1.

In an exemplary implementation mode, as shown in FIGS. 15a-15b and 20a-20b, a second electrode 362 of the sixth transistor T6 and a first electrode 71 of the seventh transistor T7 may share one electrode, the second electrode 392 of the ninth transistor T9 and the second electrode 3102 of the tenth transistor T10 may share one electrode, and the second electrode 3132 of the thirteenth transistor T13 and the second electrode 3142 of the fourteenth transistor T14 may share one electrode. In the embodiments of the present disclosure, two transistors share one electrode, which may save wiring space to a great extent.

In an embodiment of the present disclosure, structures shown in FIGS. 15a and 20a may be selected according to actual situations, wherein a structure shown in FIG. 20a may be applied to a display substrate with a relatively high Pixel Per Inch (PPI) and may be applied to a narrow bezel. For example, a structure shown in FIG. 15a may be applied to a 1000 PPI display substrate and the structure shown in FIG. 20a may be applied to a 1200 PPI display substrate. In an exemplary implementation mode, the first power supply line VGH1 and the third power supply line VGH2 may provide a same power supply signal. The above first power supply terminal VGH may be electrically connected with the first power supply line VGH1 and the third power supply line VGH2.

In an embodiment of the present disclosure, the first direction X intersects with the second direction Y on a plane parallel to where the display substrate is located.

Exemplary description is made below through a preparation process of the display substrate. A "patterning process" mentioned in the present disclosure includes photoresist coating, mask exposure, development, etching, photoresist stripping, etc., for a metal material, an inorganic material, or a transparent conductive material, and includes organic material coating, mask exposure, development, etc., for an organic material. Deposition may be any one or more of sputtering, evaporation, and chemical vapor deposition, coating may be any one or more of spray coating, spin coating, and inkjet printing, and etching may be any one or more of dry etching and wet etching, the present disclosure is not limited thereto. A "thin film" refers to a layer of thin film made of a material on a base substrate (or underlayment substrate) using deposition, coating, or other processes. If the "thin film" does not need a patterning process in an entire manufacturing process, the "thin film" may also be called a "layer". If the "thin film" needs the patterning process in the entire manufacturing process, the "thin film" is called a "thin film" before the patterning process and is called a "layer" after the patterning process. The "layer" after the patterning process contains at least one "pattern". "A and B are disposed in a same layer" in the present disclosure means that A and B are formed simultaneously through a same patterning process, and a "thickness" of a film layer is a size of the film layer in a direction perpendicular to a display substrate. In an exemplary embodiment of the present disclosure, "an orthographic projection of B being within a range of an orthographic projection of A" or "an orthographic projection of A containing an orthographic projection of B" means that a boundary of the orthographic projection of B falls within a range of a boundary of the orthographic projection of A, or the boundary of the orthographic projection of A is overlapped with the boundary of the orthographic projection of B.

In an exemplary implementation mode, the preparation process of the display substrate may include following operations.

(101) A pattern of a semiconductor layer is formed on the base substrate. In an exemplary implementation mode, forming a pattern of an active layer on the base substrate may include: depositing a semiconductor thin film on the base substrate, patterning the semiconductor thin film through a patterning process to form a pattern of a semiconductor layer, as shown in FIG. 11, which is a schematic diagram after the pattern of the semiconductor layer is formed on the base substrate.

Figure 11:
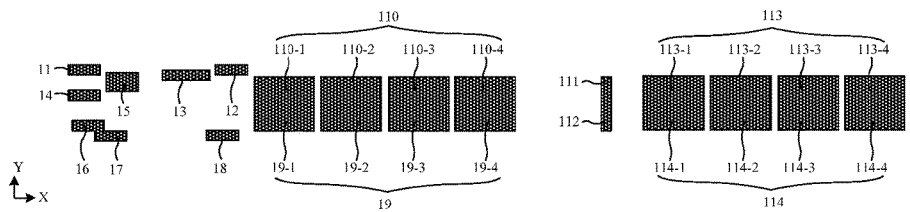
FIG. 11 is a schematic diagram of a display substrate according to an exemplary embodiment of the present disclosure after a pattern of an active layer is formed.

In an exemplary implementation mode, as shown in FIG. 11, the pattern of the semiconductor layer may include an active layer 11 of the first transistor T1, an active layer 12 of the second transistor T2, an active layer 13 of the third transistor T3, an active layer 14 of the fourth transistor T4, an active layer 15 of the fifth transistor T5, an active layer 16 of the sixth transistor T6, an active layer 17 of the seventh transistor T7, an active layer 18 of the eighth transistor T8, an active layer 19 of the ninth transistor T9, an active layer 110 of the tenth transistor T10, an active layer 111 of the eleventh transistor T11, an active layer 112 of the twelfth transistor T12, an active layer 113 of the thirteenth transistor T13, and an active layer 114 of the fourteenth transistor T14.

In an exemplary implementation mode, in a plane where the semiconductor layer is located, in the first direction X, the active layer of the first transistor T1 to the active layer 18 of the eighth transistor T8 are located on a side of the active layer 19 of the ninth transistor T9 and the active layer 110 of the tenth transistor T10 away from the active layer 113 of the thirteenth transistor T13 and the active layer 114 of the fourteenth transistor T14, the active layer 111 of the eleventh transistor T11 and the active layer 112 of the twelfth transistor T12 are located between the active layer 19 of the ninth transistor T9 and the active layer 113 of the thirteenth transistor T13, the active layer 19 of the ninth transistor T9 and the active layer 110 of the tenth transistor T10, the active layer 11 of the eleventh transistor T11 and the active layer 112 of the twelfth transistor T12, the active layer 113 of the thirteenth transistor T13 and the active layer 114 of the fourteenth transistor T14 are sequentially arranged along the first direction X.

In an exemplary implementation mode, the active layer 11 of the first transistor T1 to the active layer 18 of the eighth transistor T8 extend along the first direction X. In an exemplary implementation mode, in the second direction Y, the active layer 14 of the fourth transistor T4 is located between the active layer 11 of the first transistor T1 and the active layer 16 of the sixth transistor T6, for example, the active layer 16 of the sixth transistor T6, the active layer 14 of the fourth transistor T4, and the active layer 11 of the first transistor T1 are sequentially arranged along the second direction Y.

In an exemplary implementation mode, the active layer 14 of the fourth transistor T4, the active layer 15 of the fifth transistor T5, the active layer 13 of the third transistor T3, and the active layer 12 of the second transistor T2 are sequentially arranged along the first direction X, and in the second direction Y, the active layer 11 of the first transistor T1, the active layer 12 of the second transistor T2, the active layer 13 of the third transistor T3, and the active layer 15 of the fifth transistor T5 are located on a side of the active layer 14 of the fourth transistor T4 away from the active layer 16 of the sixth transistor T6.

In an exemplary implementation mode, the active layer 16 of the sixth transistor T6, the active layer 17 of the seventh transistor T7, and the active layer 18 of the eighth transistor T8 are sequentially arranged along the first direction X, and the active layer 16 of the sixth transistor T6 and the active layer 17 of the seventh transistor T7 may be of an integrally formed structure. In the second direction Y, the active layer 17 of the seventh transistor T7 and the active layer 18 of the eighth transistor T8 are located on a side of the active layer 16 of the sixth transistor T6 away from the active layer 11 of the first transistor T1.

In an exemplary implementation mode, in the second direction Y, the active layer 19 of the ninth transistor T9 is located on one side of the active layer 110 of the tenth transistor T10, for example, the active layer 19 of the ninth transistor T9 and the active layer 110 of the tenth transistor T10 are arranged along the second direction Y. In an exemplary implementation mode, the active layer 19 of the ninth transistor T9 and the active layer 110 of the tenth transistor T10 are of an integrally formed structure.

In an exemplary implementation mode, in the second direction Y, the active layer 11 of the eleventh transistor T11 is located on one side of the active layer 112 of the twelfth transistor T12, for example, the active layer 112 of the twelfth transistor T12 and the active layer 11 of the eleventh transistor T11 are arranged along the second direction Y. In an exemplary implementation mode, the active layer 11 of the eleventh transistor T11 and the twelfth transistor T12 may be of an integrally formed structure.

In an exemplary implementation mode, in the second direction Y, the active layer 113 of the thirteenth transistor T13 is located on one side of the active layer 114 of the fourteenth transistor T14, for example, the active layer 114 of the fourteenth transistor T14 and the active layer 113 of the thirteenth transistor T13 are arranged along the second direction Y. In an exemplary implementation mode, the active layer 113 of the thirteenth transistor T13 and the active layer 114 of the fourteenth transistor T14 may be of an integrally formed structure.

In an exemplary implementation mode, active layers of the first transistor T1 to the fourteenth transistor T14 may be of a rectangular structure.

In an exemplary implementation mode, the active layers of the first transistor T1 to the fourteenth transistor T14 are semiconductor layers formed based on a silicon technology.

In an exemplary implementation mode, widths of active layers of the ninth transistor T9, the tenth transistor T10, the thirteenth transistor T13, and the fourteenth transistor T14 is larger than widths of active layers of other transistors, so that aspect ratios (W/L) of the ninth transistor T9, the tenth transistor T10, the thirteenth transistor T13, and the fourteenth transistor T14 is are relatively large. For example, sizes of the active layers of the ninth transistor T9, the tenth transistor T10, the thirteenth transistor T13, and the fourteenth transistor T14 along the first direction X are larger than a size of the active layer 111 of the eleventh transistor T11 along the first direction X.

In an exemplary implementation mode, the active layers of the ninth transistor T9, the tenth transistor T10, the thirteenth transistor T13, and the fourteenth transistor T14 may each be disposed to include a plurality of mutually separated active layer structures. For example, the active layer 19 of the ninth transistor T9 may include four mutually separated active layers, the four mutually separated active layers of the ninth transistor T9 may include a first sub-active layer 19-1, a second sub-active layer 19-2, a third sub-active layer 19-3, and a fourth sub-active layer 19-4, the active layer 110 of the tenth transistor T10 may include four mutually separated active layers, the four mutually separated active layers of the tenth transistor T10 may include a fifth sub-active layer 110-1, a sixth sub-active layer 110-2, a seventh sub-active layer 110-3, and an eighth sub-active layer 110-4, the fifth sub-active layer 110-1 and the first sub-active layer 19-1 may be of an integrally formed structure, the sixth sub-active layer 110-2 and the second sub-active layer 19-2 may be of an integrally formed rectangular structure, the seventh sub-active layer 110-3 and the third sub-active layer 19-3 may be of an integrally formed rectangular structure, and the eighth sub-active layer 110-4 and the fourth sub-active layer 19-4 may be of an integrally formed rectangular structure.

In an exemplary implementation mode, the active layer 113 of the thirteenth transistor T13 may include four mutually separated active layers, the four mutually separated active layers of the thirteenth transistor T13 may include a ninth sub-active layer 113-1, a tenth sub-active layer 113-2, an eleventh sub-active layer 113-3, and a twelfth sub-active layer 113-4, the active layer 114 of the fourteenth transistor T14 may include four mutually separated active layers, the four mutually separated active layers of the fourteenth transistor T14 may include a thirteenth sub-active layer 114-1, a fourteenth sub-active layer 114-2, a fifteenth sub-active layer 114-3, and a sixteenth sub-active layer 114-4, the thirteenth sub-active layer 114-1 and the ninth sub-active layer 113-1 may be of an integrally formed structure, the fourteenth sub-active layer 114-2 and the tenth sub-active layer 113-2 may be of an integrally formed rectangular structure, the fifteenth sub-active layer 114-3 and the eleventh sub-active layer 113-3 may be of an integrally formed rectangular structure, and the sixteenth sub-active layer 114-4 and the twelfth sub-active layer 113-4 may be of an integrally formed rectangular structure.

In an exemplary implementation mode, the base substrate may be a rigid base substrate or a flexible base substrate, wherein the rigid base substrate may be, but is not limited to, one or more of glass and a metal foil; the flexible base substrate may be, but is not limited to, one or more of polyethylene terephthalate, ethylene terephthalate, polyether ether ketone, polystyrene, polycarbonate, polyarylate, polyarylester, polyimide, polyvinyl chloride, polyethylene, and textile fiber.

In an exemplary implementation mode, the flexible base substrate may include a first flexible material layer, a first inorganic material layer, a semiconductor layer, a second flexible material layer, and a second inorganic material layer which are stacked. Materials of the first flexible material layer and the second flexible material layer may be Polyimide (PI), Polyethylene Terephthalate (PET), or a surface treated polymer soft film, etc., and materials of the first inorganic material layer and the second inorganic material layer may be Silicon Nitride (SiNx), Silicon Oxide (SiOx), or the like, for improving water and oxygen resistance of a base substrate. The first inorganic material layer and the second inorganic material layer may also be referred to as barrier layers, and a material of the semiconductor layer may be amorphous silicon (a-si). In an exemplary implementation mode, taking a stacked structure of PI1/Barrier1/a-si/PI2/Barrier2 as an example, its preparation process may include: first coating a layer of polyimide on a glass carrier board, after the layer of polyimide is cured to form a film, a first flexible (PI1) layer is formed; then depositing a layer of barrier thin film on the first flexible layer to form a first barrier (Barrier1) layer covering the first flexible layer; then depositing a layer of amorphous silicon thin film on the first barrier layer to form an amorphous silicon (a-si) layer covering the first barrier layer; then coating another layer of polyimide on the amorphous silicon layer, after this layer of polyimide is cured to form a film, a second flexible (PI2) layer is formed; and then depositing a layer of barrier thin film on the second flexible layer to form a second barrier (Barrier2) layer covering the second flexible layer, so as to complete preparation of the base substrate.

In an exemplary embodiment, the first semiconductor layer may be made of poly Silicon (p-Si), i.e., the first transistor T1 to the fourteenth transistor T14 are Low Temperature Poly Silicon (LTPS) thin film transistors. In an exemplary implementation mode, the patterning the first semiconductor thin film through the patterning process may include: forming an amorphous silicon (a-si) thin film on a first insulation thin film, dehydrogenating the amorphous silicon thin film, and crystallizing the dehydrogenated amorphous silicon thin film to form a poly silicon thin film. Subsequently, the poly silicon thin film is patterned to form the pattern of the first semiconductor layer.

(102) A pattern of a first conductive layer is formed. In an exemplary implementation mode, forming a pattern of a first conductive layer may include: depositing a first insulation thin film and a first conductive thin film sequentially on the base substrate on which the above-mentioned pattern is formed, patterning the first conductive thin film through a patterning process, to form a first insulation layer covering the pattern of the semiconductor layer, and the pattern of the first conductive layer disposed on the first insulation layer, as shown in FIGS. 12a and 12b, wherein FIG. 12a is a schematic diagram after the pattern of the first conductive layer is formed, and FIG. 12b is a planar schematic diagram of the first conductive layer in FIG. 12a. In an exemplary implementation mode, the first conductive layer may be referred to as a first gate metal (GATE1) layer.

In an exemplary implementation mode, the pattern of the first conductive layer may include at least the first electrode plate C11 of the first capacitor C1, the first electrode plate C21 of the second capacitor C2, the first electrode plate C31 of the third capacitor C3, a control electrode 21 of the first transistor T1, a control electrode 22 of the second transistor T2, a control electrode 23 of the third transistor T3, a control electrode 24 of the fourth transistor T4, a control electrode 25 of the fifth transistor T5, a control electrode 26 of the sixth transistor T6, a control electrode 27 of the seventh transistor T7, a control electrode 28 of the eighth transistor T8, a control electrode 29 of the ninth transistor T9, a control electrode 210 of the tenth transistor T10, a control electrode 211 of the eleventh transistor T11, a control electrode 212 of the twelfth transistor T12, a control electrode 213 of the thirteenth transistor T13, a control electrode 214 of the fourteenth transistor T14, a first connection line CL1, the second connection line CL2, a third connection line CL3, the first second signal output line EM_OUT, the second signal output line IEM_OUT, and the first power supply line VGH1.

In an exemplary implementation mode, the first electrode plate C11 of the first capacitor C1, the control electrode 210 of the tenth transistor T10, the control electrode 28 of the eighth transistor T8, the first connection line CL1, and the control electrode 23 of the third transistor T3 may be of an integrally formed structure. The first electrode plate C31 of the third capacitor C3, the second connection line CL2, and the control electrode 29 of the ninth transistor T9 may be of an integrally formed structure. The control electrode 25 of the fifth transistor T5, the third connection line CL3, and the control electrode 27 of the seventh transistor T7 may be of an integrally formed structure. The control electrode 24 of the fourth transistor T4 and the control electrode 26 of the sixth transistor T6 may be of an integrally formed structure. The control electrode 22 of the second transistor T2 and the control electrode 21 of the first transistor T2 may be of an integrally formed structure. The control electrode 212 of the twelfth transistor T12, the control electrode 214 of the fourteenth transistor T14, and the first signal output line EM_OUT may be of an integrally formed structure.

In an exemplary implementation mode, a main body portion of the first electrode plate C11 of the first capacitor C1 may be in a shape of a strip extending along the first direction X, the first electrode plate C11 of the first capacitor C1 may be located on a side of the control electrode 210 of the tenth transistor T10 away from the first electrode plate C31 of the third capacitor C3 in the second direction Y, and the first electrode plate C11 of the first capacitor C1 may be located on a side of the control electrode 28 of the eighth transistor T8 away from the first electrode plate C21 of the second capacitor C2 in the first direction X. In an exemplary implementation mode, a side of the first electrode plate C11 of the first capacitor C1 close to the control electrode 210 of the tenth transistor T10 is provided with a first connection portion C11-1, the first connection portion C11-1 extends along the second direction Y, with one end connected with the first electrode plate C11 of the first capacitor C1, and the other end connected with the control electrode 210 of the tenth transistor T10.

In an exemplary implementation mode, the first electrode plate C21 of the second capacitor C2 may have a square shape, the first electrode plate C21 of the second capacitor C2 may be located between the control electrode 27 of the seventh transistor T7 and the control electrode 28 of the eighth transistor T8 in the first direction X, the first electrode plate C21 of the second capacitor C2 may be located on a side of the control electrode 23 of the third transistor T3 away from the control electrode 22 of the second transistor T2 in the second direction Y, an edge of the first electrode plate C21 of the second capacitor C2 on a side close to the control electrode 27 of the seventh transistor T7 is provided with a protrusion, an edge of the first electrode plate C21 of the second capacitor C2 on a side close to the control electrode 28 of the eighth transistor T8 and an edge of the first electrode plate C21 of the second capacitor C2 on a side close to the control electrode 23 of the third transistor T3 are in a stepped shape.

In an exemplary implementation mode, the first electrode plate C31 of the third capacitor C3 may have a shape of a broken line and extend along the first direction X, and the first electrode plate C31 of the third capacitor C3 may be located on a side of the control electrode 29 of the ninth transistor T9 away from the first electrode plate C11 of the first capacitor C1 in the second direction Y; the first electrode plate C31 of the third capacitor C3 may be located on a side of the control electrode 28 of the eighth transistor T8 away from the first electrode plate C21 of the second capacitor C2 in the first direction X. In an exemplary implementation mode, one end of the first electrode plate C31 of the third capacitor C3 close to the control electrode 28 of the eighth transistor T8 is connected with the second connection line CL2.

In an exemplary implementation mode, the control electrode 21 of the first transistor T1 may have a shape of a broken line and extend along the first direction X. In an exemplary implementation mode, in the second direction Y, the control electrode 21 of the first transistor T1 may be located on a side of the control electrode 22 of the second transistor T2 away from the first electrode plate of the first capacitor C1 and connected with the control electrode 22 of the second transistor T2 on a side close to the first electrode plate of the first capacitor C1.

In an exemplary implementation mode, the control electrode 22 of the second transistor T2 may be in an "n" shape, and is provided an opening facing a side of the first electrode plate C21 of the second capacitor C2. In an exemplary implementation mode, in the second direction Y, the control electrode 22 of the second transistor T2 may be located on a side of the control electrode 210 of the tenth transistor T10 away from the first electrode plate C31 of the third capacitor C3, and in the first direction X, the control electrode 22 of the second transistor T2 may be located between the control electrode 21 of the first transistor T1 and the first electrode plate C11 of the first capacitor C1, and the control electrode 22 of the second transistor T2 is connected with the control electrode 21 of the first transistor T1 on a side close to the control electrode 21 of the first transistor T1.

In an exemplary implementation mode, the control electrode 23 of the third transistor T3 may be located between the control electrode 22 of the second transistor T2 and the first electrode plate C21 of the second capacitor C2 in the second direction Y, and the control electrode 23 of the third transistor T3 may be located between the control electrode 21 of the first transistor T1 and the control electrode 25 of the fifth transistor T5 in the first direction X, and a side of the control electrode 23 of the third transistor T3 away from the control electrode 21 of the first transistor T1 is connected with the control electrode 28 of the eighth transistor T8 through the first connection line CL1. Among them, a shape of the third transistor T3 may be an inverted "n" shape and the third transistor T3 is provided with an opening facing the control electrode 22 of the second transistor T2.

In an exemplary implementation mode, in the second direction Y, the control electrode 24 of the fourth transistor T4 may be located between the control electrode 21 of the first transistor T1 and the control electrode 26 of the sixth transistor T6, and a side of the control electrode 24 of the fourth transistor T4 away from the control electrode 21 of the first transistor T1 is connected with the control electrode 26 of the sixth transistor T6. Among them, a shape of the control electrode 24 of the fourth transistor T4 may be an inverted "T" shape.

In an exemplary implementation mode, in the second direction Y, the control electrode 25 of the fifth transistor T5 may be located between the control electrode 27 of the seventh transistor T7 and the control electrode 22 of the second transistor T2. Among them, the control electrode 25 of the fifth transistor T5 may have a shape of a strip and may extend along the second direction Y, and in the second direction Y, one end of the control electrode 25 of the fifth transistor T5 away from the control electrode 22 of the second transistor T2 is connected with the third connection line CL3.

In an exemplary implementation mode, the control electrode 26 of the sixth transistor T6 may be located on a side of the control electrode 24 of the fourth transistor T4 away from the control electrode 22 of the second transistor T2, and a side of the control electrode 26 of the sixth transistor T6 close to the control electrode 22 of the second transistor T2 is connected with the control electrode 24 of the fourth transistor T4. Among them, a shape of the control electrode 26 of the sixth transistor T6 may be a "T" shape.

In an exemplary implementation mode, the control electrode 27 of the seventh transistor T7 may be located on a side of the first electrode plate C21 of the second capacitor C2 away from the control electrode 28 of the eighth transistor T8, and in the second direction Y, the control electrode 27 of the seventh transistor T7 may be located on a side of the control electrode 25 of the fifth transistor T5 away from the control electrode 21 of the first transistor T1.

In an exemplary implementation mode, the control electrode 27 of the seventh transistor T7 may include a first connection structure 27-1 extending along the first direction X and a second connection structure 27-2 extending along the second direction Y, in the first direction X, the first connection structure 27-1 may be located on a side of the second connection structure 27-2 away from the first electrode plate C21 of the second capacitor C2, and the second connection structure 27-2 may be located between the control electrode 26 of the sixth transistor T6 and the first electrode plate C21 of the second capacitor C2. One end of the second connection structure 27-2 is connected with the third connection line CL3, and the other end is connected with the first connection structure 27-1.

In an exemplary implementation mode, a shape of the control electrode 28 of the eighth transistor T8 may be a shape of a strip and extend along the second direction Y. In the first direction X, the control electrode 28 of the eighth transistor T8 may be located between the first electrode plate C21 of the second capacitor C2 and the control electrode 29 of the ninth transistor T9, and in the second direction Y, the control electrode 28 of the eighth transistor T8 may be located on a side of the first connection line CL1 away from the control electrode 22 of the second transistor T2 and is connected with the third connection line CL3 and the control electrode 210 of the tenth transistor T10 at an end close to the control electrode 22 of the second transistor T2.

In an exemplary implementation mode, a shape of the control electrode 29 of the ninth transistor T9 may be a shape of a strip and extend along the first direction X. In an exemplary implementation mode, in the second direction Y, the control electrode 29 of the ninth transistor T9 may be located between the control electrode 210 of the tenth transistor T10 and the first electrode plate C31 of the third capacitor C3 and connected with the first electrode plate C31 of the third capacitor C3 through the second connection line CL2, and in the first direction X, the control electrode 29 of the ninth transistor T9 may be located between the control electrode 28 of the eighth transistor T8 and the control electrode 214 of the fourteenth transistor T14 and connected with the second connection line CL2 at an end close to the control electrode 28 of the eighth transistor T8.

In an exemplary implementation mode, an orthographic projection of the control electrode 29 of the ninth transistor T9 on the base substrate and orthographic projections of the first sub-active layer 19-1, the second sub-active layer 19-2, the third sub-active layer 19-3, and the fourth sub-active layer 19-4 on the base substrate have an overlapping region. That is, the control electrode 29 of the ninth transistor T9 is disposed across the first sub-active layer 19-1, the second sub-active layer 19-2, the third sub-active layer 19-3, and the fourth sub-active layer 19-4 to form the first sub-transistor T9-1, the second sub-transistor T9-2, the third sub-transistor T9-3, and the fourth sub-transistor T9-4 connected in parallel with each other.

In an exemplary implementation mode, the control electrode 210 of the tenth transistor T10 may be of a strip structure and extend along the first direction X, and in the second direction Y, the control electrode 210 of the tenth transistor T10 may be located between the control electrode 29 of the ninth transistor T9 and the first electrode plate C11 of the first capacitor C1, and an edge on a side away from the first electrode plate C11 of the first capacitor C1 may be in a stepped shape. In an exemplary implementation mode, in the first direction X, one end of the control electrode 210 of the tenth transistor T10 is connected with the control electrode 28 of the eighth transistor T8 and the other end is connected with the first electrode plate C11 of the first capacitor C1.

In an exemplary implementation mode, an orthographic projection of the control electrode 210 of the tenth transistor T10 on the base substrate and orthographic projections of the fifth sub-active layer 110-1, the sixth sub-active layer 110-2, the seventh sub-active layer 110-3, and the eighth sub-active layer 110-4 on the base substrate have an overlapping region. That is, the control electrode 210 of the tenth transistor T10 is disposed across the fifth sub-active layer 110-1, the sixth sub-active layer 110-2, the seventh sub-active layer 110-3, and the eighth sub-active layer 110-4 to form the fifth sub-transistor T10-1, the sixth sub-transistor T10-2, the seventh sub-transistor T10-3, and the eighth sub-transistor T10-4 connected in parallel with each other.

In an exemplary implementation mode, in the first direction X, the control electrode 211 of the eleventh transistor T11 may be located between the control electrode 210 of the tenth transistor T10 and the control electrode 213 of the thirteenth transistor T13, and in the second direction Y, the control electrode 211 of the eleventh transistor T11 may be located on a side of the control electrode 212 of the twelfth transistor T12 away from the first power supply line VGH1. In an exemplary implementation mode, the control electrode 211 of the eleventh transistor T11 may be in an "L" shape.

In an exemplary implementation mode, the control electrode 212 of the twelfth transistor T12 may be in a shape of a broken line and extend along the first direction X. In an exemplary implementation mode, in the second direction Y, a main body portion of the control electrode 212 of the twelfth transistor T12 may be located between the control electrode 213 of the thirteenth transistor T13 and the first power supply line VGH1, and in the first direction X, the control electrode 212 of the twelfth transistor T12 may be located between the control electrode 29 of the ninth transistor T9 and the control electrode 214 of the fourteenth transistor T14.

In an exemplary implementation mode, the control electrode 213 of the thirteenth transistor T13 may be in an "L" shape, in the first direction X, the control electrode 213 of the thirteenth transistor T13 may be located on a side of the control electrode 211 of the eleventh transistor T11 away from the control electrode 210 of the tenth transistor T10, and in the second direction Y, the control electrode 213 of the thirteenth transistor T13 may be located on a side of the control electrode 214 of the fourteenth transistor T14 away from the first power supply line VGH1.

In an exemplary implementation mode, an orthographic projection of the control electrode 213 of the thirteenth transistor T13 on the base substrate and orthographic projections of the ninth sub-active layer 113-1, the tenth sub-active layer 113-2, the eleventh sub-active layer 113-3, and the twelfth sub-active layer 113-4 on the base substrate have an overlapping region. That is, the control electrode 213 of the thirteenth transistor T13 is disposed across the ninth sub-active layer 113-1, the tenth sub-active layer 113-2, the eleventh sub-active layer 113-3, and the twelfth sub-active layer 113-4 to form the ninth sub-transistor T13-1, the tenth sub-transistor T13-2, the eleventh sub-transistor T13-3, and the twelfth sub-transistor T13-4 connected in parallel with each other.

In an exemplary implementation mode, the control electrode 214 of the fourteenth transistor T14 may be in a shape of a strip and extend along the first direction X. In an exemplary implementation mode, in the first direction X, the control electrode 214 of the fourteenth transistor T14 may be located between the control electrode 212 of the twelfth transistor T12 and the first signal output line EM_OUT, with one end connected with the first signal output line EM_OUT and the other end connected with the control electrode 212 of the twelfth transistor T12, and in the second direction Y, the control electrode 214 of the fourteenth transistor T14 may be located between the control electrode 213 of the thirteenth transistor T13 and the first power supply line VGH1.

In an exemplary implementation mode, an orthographic projection of the control electrode 214 of the fourteenth transistor T14 on the base substrate and orthographic projections of the thirteenth sub-active layer 114-1, the fourteenth sub-active layer 114-2, the fifteenth sub-active layer 114-3, and the sixteenth sub-active layer 114-4 on the base substrate have an overlapping region. That is, the control electrode 214 of the fourteenth transistor T14 is disposed across the thirteenth sub-active layer 114-1, the fourteenth sub-active layer 114-2, the fifteenth sub-active layer 114-3, and the sixteenth sub-active layer 114-4 to form the thirteenth sub-transistor T14-1, the fourteenth sub-transistor T14-2, the fifteenth sub-transistor T14-3, and the sixteenth sub-transistor T14-4 connected in parallel with each other.

In an exemplary implementation mode, the first connection line CL1 may have a shape of a strip and extend along the first direction X, and in the first direction X, the first connection line CL1 may be located between the control electrode 23 of the third transistor T3 and the control electrode 210 of the tenth transistor T10, with one end connected with the control electrode 23 of the third transistor T3, and the other end connected with the control electrode 210 of the tenth transistor T10 and the control electrode 28 of the eighth transistor T8; in the second direction Y, the first connection line CL1 may be located between the control electrode of the second transistor T2 and the first electrode plate C21 of the second capacitor C2.

In an exemplary implementation mode, a shape of the second connection line CL2 may include a first sub-connection structure CL21 and a second sub-connection structure CL22, the first sub-connection structure CL21 may be in an "L" shape, and the second sub-connection structure CL22 may be of a strip structure extending along the first direction X, and in the first direction X, the first sub-connection structure CL21 may be located between the control electrode 28 of the eighth transistor T8 and the control electrode 29 of the ninth transistor T9, and connected with the second sub-connection structure CL22 on a side away from the control electrode 28 of the eighth transistor T8, the second sub-connection structure CL22 may be located between the control electrode 28 of the eighth transistor T8 and the first electrode plate C31 of the third capacitor C3, one end of the second sub-connection structure CL22 close to the control electrode 28 of the eighth transistor T8 is connected with the first sub-connection structure CL21, and the other end is connected with the first electrode plate C31 of the third capacitor C3, in the second direction Y, the first sub-connection structure CL21 may be located on a side of the control electrode 210 of the tenth transistor T10 away from the first electrode plate C11 of the first capacitor C1, and the second sub-connection structure CL22 may be located on a side of the control electrode 29 of the ninth transistor T9 away from the control electrode 210 of the tenth transistor T10.

In an exemplary implementation mode, a shape of the third connection line CL3 may be a square, and in the first direction X, the third connection line CL3 may be located between the first electrode plate C31 of the third capacitor C3 and the control electrode 24 of the fourth transistor T4, with one end connected with the control electrode 27 of the seventh transistor T7, and the other end connected with the control electrode 25 of the fifth transistor T5.

In an exemplary implementation mode, the first signal output line EM_OUT may be in a shape of a strip and extend along the first direction X, and in the second direction Y, the first signal output line EM_OUT may be located between the control electrode 213 of the thirteenth transistor T13 and the first power supply line VGH1, and an edge on a side close to the first power supply line VGH1 may be in a stepped shape. In the first direction X, the first signal output line EM_OUT may be located on a side of the control electrode 214 of the fourteenth transistor T14 away from the control electrode 212 of the twelfth transistor T12, and a side of the first signal output line EM_OUT close to the control electrode 214 of the fourteenth transistor T14 is connected with the control electrode 214 of the fourteenth transistor T14.

In an exemplary implementation mode, the second signal output line IEM_OUT may be in an "L" shape, in the second direction Y, the second signal output line IEM_OUT may be located on a side of the first power supply line VGH1 away from the first signal output line EM_OUT, and in the first direction X, the second signal output line IEM_OUT may be located on a side of the first electrode plate C31 of the third capacitor C3 away from the control electrode 28 of the eighth transistor T8.

In an exemplary implementation mode, the first power supply line VGH1 may be in a shape of a broken line and extend along the first direction X, and in the second direction Y, the first power supply line VGH1 may be located between the first output signal line EM_OUT and the second signal output line IEM_OUT. In the first direction X, the first sub-power supply line VGH1 may be located on a side of the control electrode 29 of the ninth transistor T9 away from the control electrode 28 of the eighth transistor T8.

In an exemplary implementation mode, control electrodes of the first transistor T1 to the fourteenth transistor T14 are respectively disposed across active layers of the first transistor T1 to the fourteenth transistor T14, that is, orthographic projections of the control electrodes of the first transistor T1 to the fourteenth transistor T14 on the base substrate have overlapping regions with orthographic projections of the active layers of the first transistor T1 to the fourteenth transistor T14, respectively. In an exemplary implementation mode, on a plane parallel to where the display substrate is located, extension directions of control electrodes of the first transistor T1 to the eighth transistor T8 and the eleventh transistor T11 to the twelfth transistor T12 are perpendicular to extension directions of active layers of the first transistor T1 to the eighth transistor T8 and the eleventh transistor T11 to the twelfth transistor T12, respectively.

In an exemplary embodiment, this process further includes a conductorization processing. The conductorization processing is that after the pattern of the first conductive layer is formed, using the semiconductor layer in a region shielded by the control electrode 21 of the first transistor T1, the control electrode 22 of the second transistor T2, the control electrode 23 of the third transistor T3, the control electrode 24 of the fourth transistor T4, the control electrode 25 of the fifth transistor T5, the control electrode 26 of the sixth transistor T6, the control electrode 27 of the seventh transistor T7, the control electrode 28 of the eighth transistor T8, the control electrode 29 of the ninth transistor T9, the control electrode 210 of the tenth transistor T10, the control electrode 211 of the eleventh transistor T11, the control electrode 212 of the twelfth transistor T12, the control electrode 213 of the thirteenth transistor T13, and the control electrode 214 of the fourteenth transistor T14 (i.e., a region where the semiconductor layer is overlapped with each of the control electrodes) as a channel region of a transistor, the semiconductor layer in a region not shielded by the first conductive layer is processed into a conductorized layer to form a conductorized source-drain electrode connection portion.

In an exemplary embodiments, the first conductive thin film may be made of a metal material, such as any one or more of Argentum (Ag), Copper (Cu), Aluminum (Al), Titanium (T1), and Molybdenum (Mo), or an alloy material of the above metals, such as an Aluminum Neodymium alloy (AlNd) or a Molybdenum Niobium alloy (MoNb), and may be of a single-layer structure or a multi-layer composite structure, such as Ti/Al/Ti.

In an exemplary implementation mode, the first insulation thin film may be made of any one or more of Silicon Oxide (SiOx), Silicon Nitride (SiNx), and Silicon Oxynitride (SiON), and may be a single layer, a multi-layer, or a composite layer. The first insulation layer may be referred to as a first gate insulation layer.

Figure 13A:
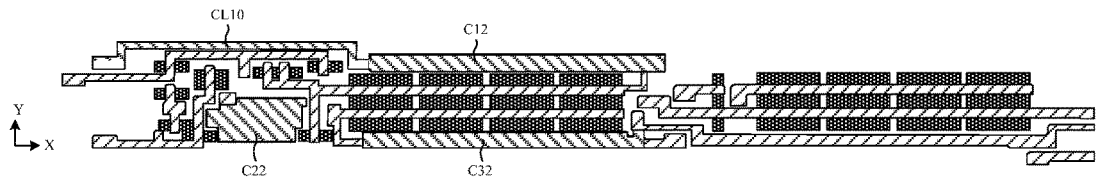
FIG. 13a is a schematic diagram of a display substrate according to an exemplary embodiment of the present disclosure after a pattern of a second conductive layer is formed.
Figure 13B:
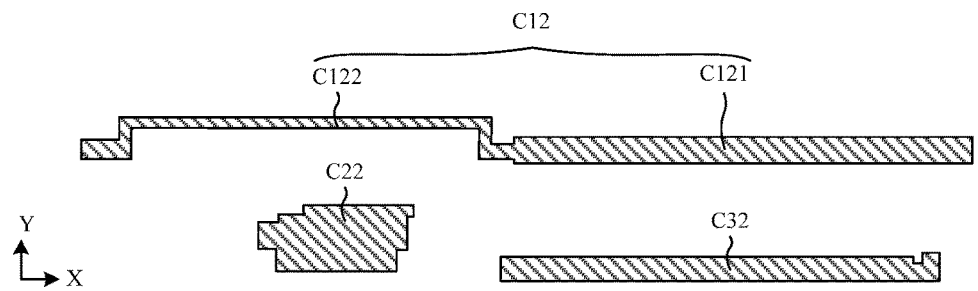
FIG. 13b is a schematic diagram of a second conductive layer in a display substrate according to an exemplary embodiment of the present disclosure.

(103) A pattern of a second conductive layer is formed. In an exemplary implementation mode, forming a pattern of a second conductive layer may include sequentially depositing a second insulation thin film and a second conductive thin film on the base substrate on which the above-mentioned patterns are formed, patterning the second conductive thin film using a patterning process to form a second insulation layer covering the first conductive layer, and the pattern of the second conductive layer disposed on the second insulation layer, as shown in FIGS. 13a to 13b, wherein FIG. 13a is a schematic diagram after the pattern of the second conductive layer is formed, and FIG. 13b is a planar schematic diagram of the second conductive layer in FIG. 13a. In an exemplary implementation mode, the second conductive layer may be referred to as a second gate metal (GATE2) layer.

In an exemplary implementation mode, as shown in FIG. 13, the pattern of the second conductive layer may include the second electrode plate C12 of the first capacitor C1, the second electrode plate C22 of the second capacitor C2, and the second electrode plate C32 of the third capacitor C3.

In an exemplary implementation mode, as shown in FIG. 13, the second electrode plate C22 of the second capacitor C2 and the second electrode plate C32 of the third capacitor C3 are arranged along the first direction X, and in the second direction Y, the second electrode plate C22 of the second capacitor C2 and the second electrode plate C32 of the third capacitor C3 may be located on a same side of the second electrode plate C12 of the first capacitor C1.

In an exemplary implementation mode, the second electrode plate C12 of the first capacitor C1 may be in a shape of a broken line and extend along the first direction X. In an exemplary implementation mode, an orthographic projection of the second electrode plate C12 of the first capacitor C1 on the base substrate and an orthographic projection of the first electrode plate C1I of the first capacitor C1 on the base substrate have an overlapping region.

In an exemplary implementation mode, as shown in FIG. 13, the first electrode plate C12 of the first capacitor C1 may include a first connection portion C121 and a second connection portion C122 connected with each other, the first connection portion C121 may be of a strip structure extending along the first direction X, the second connection portion C122 may be in a shape of a Chinese character " 儿 ", and is provided with an opening facing a side of the second electrode plate C22 of the second capacitor C2. In an exemplary implementation mode, an orthographic projection of the first connection portion C121 on the base substrate and an orthographic projection of the first electrode plate C11 of the first capacitor C1 on the base substrate have an overlapping region, the first connection portion C121 and the second connection portion C122 are arranged along the first direction X, and there is no overlapping region between an orthographic projection of the second connection portion C122 on the base substrate and an orthographic projection of the control electrode 21 of the first transistor T1 on the base substrate.

In an exemplary implementation mode, a shape of the second electrode plate C22 of the second capacitor C2 may be a square, and an edge of the second electrode plate C22 of the second capacitor C2 may be in a stepped shape. In an exemplary implementation mode, an orthographic projection of the second electrode plate C22 of the second capacitor C2 on the base substrate and an orthographic projection of the first electrode plate C21 of the second capacitor C2 on the base substrate have an overlapping region.

In an exemplary implementation mode, the second electrode plate C32 of the third capacitor C3 may be in a shape of a strip and extend along the first direction X, and an edge of the second electrode plate C32 of the third capacitor C3 close to a side of the second electrode plate C12 of the first capacitor C1 may be in a shape of a broken line. In an exemplary implementation mode, an orthographic projection of the second electrode plate C32 of the third capacitor C3 on the base substrate and an orthographic projection of the first electrode plate C31 of the third capacitor C3 on the base substrate have an overlapping region.

In an exemplary implementation mode, the second conductive thin film may be made of a metal material, such as any one or more of Argentum (Ag), Copper (Cu), Aluminum (Al), Titanium (Ti), and Molybdenum (Mo), or an alloy material of the above metals, such as an Aluminum Neodymium alloy (AlNd) or a Molybdenum Niobium alloy (MoNb), and may be of a single-layer structure or a multilayer composite structure, such as Ti/Al/Ti.

In an exemplary implementation mode, the second insulation thin film may be made of any one or more of Silicon Oxide (SiOx), Silicon Nitride (SiNx), and Silicon Oxynitride (SiON), and may be a single layer, a multi-layer, or a composite layer. The first insulation layer may be referred to as a second gate insulation layer.

Figure 14:
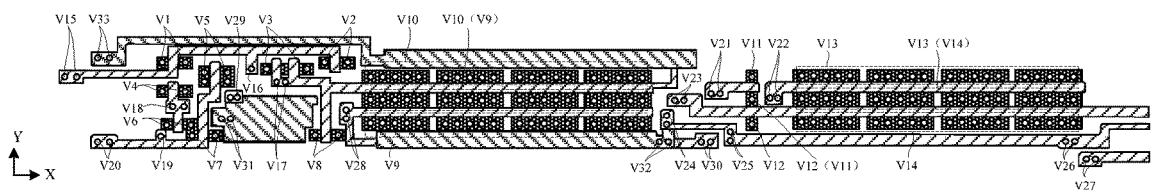
FIG. 14 is a schematic diagram of a display substrate according to an exemplary embodiment of the present disclosure after a pattern of a third insulation layer is formed.

(104) A pattern of a third insulation layer is formed. In an exemplary embodiment, forming a pattern of a third insulation layer may include depositing a third insulation thin film on the base substrate on which the above-mentioned patterns are formed, patterning the third insulation thin film using a patterning process to form a third insulation layer covering the second conductive layer, and patterns of a plurality of via are disposed on the third insulation layer, as shown in FIG. 14, and FIG. 14 is a schematic diagram of a planar structure after the pattern of the third insulation layer is formed.

In an exemplary implementation mode, the patterns of the plurality of via may include a first via V1 to a thirty-third via V33. among them, the first via V1 to the fourteenth via V14 penetrate through the first insulation layer, the second insulation layer, and the third insulation layer, the fifteenth via V15 to the thirtieth via V30 penetrate through the second insulation layer and the third insulation layer, and the thirty-first via V31 to the thirty-third via V33 penetrate through the third insulation layer.

In an exemplary implementation mode, the first via V1 exposes the active layer of the first transistor, the second via V2 exposes the active layer of the second transistor, the third via V3 exposes the active layer of the third transistor, the fourth via V4 exposes the active layer of the fourth transistor, the fifth via V5 exposes the active layer of the fifth transistor, the sixth via V6 exposes the active layer of the sixth transistor, the seventh via V7 exposes the active layer of the seventh transistor, the eighth via V8 exposes the active layer of the eighth transistor, the ninth via V9 exposes the active layer of the ninth transistor, the tenth via V10 exposes the active layer of the tenth transistor, the eleventh via V11 exposes the active layer of the eleventh transistor, the twelfth via V12 exposes the active layer of the twelfth transistor, the thirteenth via V13 exposes the active layer of the thirteenth transistor, the fourteenth via V14 exposes the active layer of the fourteenth transistor, the fifteenth via V15 and the sixteenth via V16 expose the control electrode 21 of the first transistor T1, the seventeenth via V17 exposes the control electrode 23 of the third transistor T3, the eighteenth via V18 exposes the control electrode 24 of the fourth transistor T4, the nineteenth via V19 to the twentieth via V20 expose the control electrode 27 of the seventh transistor T7, the twenty-first via V21 exposes the control electrode 211 of the eleventh transistor T11, the twenty-second via V22 exposes the control electrode 213 of the thirteenth transistor T13, the twenty-third via V23 exposes the control electrode 212 of the twelfth transistor T12, the twenty-fourth via V24 to the twenty-sixth via V26 expose the first power supply line VGH1, the twenty-seventh via V27 exposes the second signal output line IEM_OUT, the twenty-eighth via V28 exposes the second connection line CL2, the twenty-ninth via V29 exposes the first electrode plate C21 of the second capacitor C2, the thirtieth via V30 exposes the first electrode plate C31 of the third capacitor C3, the thirty-first via V31 exposes the second electrode plate C22 of the second capacitor C2, the thirty-second via V32 exposes the second electrode plate C32 of the third capacitor C3, and the thirty-third via V33 exposes the second electrode plate C12 of the first capacitor C1.

In an exemplary implementation mode, quantities of first vias V1 to fourth vias V4, sixth vias V6 to eighth vias V8, eleventh vias V11, and twelfth vias V12 are all two, which are respectively configured to expose two electrode connection portions of an active layer of a transistor, wherein one of the eleventh vias V11 and one of the twelfth vias V12 are a same via.

In an exemplary implementation mode, a quantity of fifth vias V5 is four, two of which expose a source electrode connection portion of the fifth transistor and the other two expose a drain electrode connection portion of the fifth transistor.

In an exemplary implementation mode, quantities of ninth vias V9 and tenth vias V10 are both plural, and a plurality of vias are arranged in an array; a plurality of ninth vias V9 are arranged along the first direction X to form a plurality of columns of vias and are arranged along the second direction Y to form two rows of vias; a plurality of tenth vias V10 are arranged along the first direction X to form a plurality of columns of vias and are arranged along the second direction Y to form two rows of vias; and one of the rows of ninth vias V9 and one of the rows of tenth vias V10 are a same row of vias.

In an exemplary implementation mode, quantities of thirteenth vias V13 and fourteenth vias V14 are both plural, and a plurality of vias are arranged in an array; a plurality of thirteenth vias V13 are arranged along the first direction X to form a plurality of columns of vias and are arranged along the second direction Y to form two rows of vias; a plurality of fourteenth vias V14 are arranged along the first direction X to form a plurality of columns of vias and are arranged along the second direction Y to form two rows of vias; and one of the rows of thirteenth vias V13 and one of the rows of fourteenth vias V14 are a same row of vias.

In an exemplary implementation mode, quantities of fifteenth vias V15, seventeenth vias V17, eighteenth vias V18, twentieth vias V20 to twenty-third vias V23, twenty-sixth vias V26, twenty-seventh vias V27, and twenty-ninth vias V29 to thirty-third vias V33 may be one or more. For example, quantities of the fifteenth vias V15, sixteenth vias V16, the eighteenth vias V18, and the twenty-fourth vias V24 to the thirty-third vias V33 may all be two, and two vias are arranged along the first direction X.

In an exemplary implementation mode, quantities of twenty-fourth vias V24 to twenty-fifth vias V25, and twenty-eighth vias V28 may be one or more, for example, quantities of the twenty-fourth vias V24 to the twenty-fifth vias V25, and the twenty-eighth vias V28 may all be two, and two vias are arranged along the second direction Y.

In an exemplary implementation mode, quantities of sixteenth vias V16 and nineteenth vias V19 may be one.

In an exemplary implementation mode, the third insulation thin film may be made of any one or more of Silicon Oxide (SiOx), Silicon Nitride (SiNx), and Silicon Oxynitride (SiON), and may be a single layer, a multi-layer, or a composite layer. The first insulation layer may be referred to as a second gate insulation layer.

(105) A pattern of a third conductive layer is formed. In an exemplary embodiment, forming the third conductive layer may include: depositing a third conductive thin film on the base substrate on which the above-mentioned patterns are formed, and patterning the third conductive thin film using a patterning process to form the third conductive layer disposed on the third insulation layer, as shown in FIGS. 15a to 15b, wherein FIG. 15a is a schematic diagram after the third conductive layer is formed, and FIG. 15b is a planar schematic diagram of the third conductive layer in FIG. 15a. In an exemplary implementation mode, the third conductive layer may be referred to as a source-drain metal (SD) layer.

In an exemplary implementation mode, the pattern of the third conductive layer may include an initial signal line STV, a signal input line IN, a first clock signal line CLK, a second clock signal line CLKB, a third power supply line VGH2, a second power supply line VGL, first electrodes and second electrodes of the first transistor T1 to the fourteenth transistor T14, and a fourth connection line CL4.

In an exemplary implementation mode, the first electrode 311 of the first transistor T1 and the signal input line IN may be of an integrally formed structure, and the second electrode 312 of the first transistor T1 and the second electrode of the fifth transistor T5 may be of an integrally formed structure. The first electrode 321 of the second transistor T2, the first electrode 3101 of the tenth transistor T10, the first electrode 3111 of the eleventh transistor T11, the first electrode 3131 of the thirteenth transistor T13, and the second power supply line VGL may be of an integrally formed structure; the second electrode 322 of the second transistor T2 and the second electrode 332 of the third transistor T3 may be of an integrally formed structure. The first electrode 341 of the fourth transistor T4 and the third power supply line VGH2 may be of an integrally formed structure, and the second electrode 342 of the fourth transistor T4 and the first electrode 351 of the fifth transistor T5 may be of an integrally formed structure. The second electrode 362 of the sixth transistor T6 and the first electrode 371 of the seventh transistor T7 may share one electrode. The second electrode 372 of the seventh transistor T7 and the second electrode of the eighth transistor T8 may be of an integrally formed structure, and the first electrode 381 of the eighth transistor T8 and the first electrode 391 of the ninth transistor T9 may be of an integrally formed structure. The first electrode 3121 of the twelfth transistor T12 and the first electrode 3141 of the fourteenth transistor T14 may be of an integrally formed structure.

In an exemplary implementation mode, the first electrode 311 and the second electrode 312 of the first transistor T1 are connected with the active layer 11 of the first transistor T1 through two first vias V1, respectively. The first electrode 321 and the second electrode 322 of the second transistor T2 are respectively connected with the active layer 12 of the second transistor T2 through two second vias V2. The first electrode 331 and the second electrode 332 of the third transistor T3 are respectively connected with the active layer 13 of the third transistor T3 through two third vias V3. The first electrode 341 and the second electrode 342 of the fourth transistor T4 are respectively connected with the active layer 14 of the fourth transistor T4 through two fourth vias V4. The first electrode 351 and the second electrode 352 of the fifth transistor T5 are respectively connected with the active layer 15 of the fifth transistor T5 through two fifth vias V5. The first electrode 361 and the second electrode 362 (which is also the first electrode of the seventh transistor T7) of the sixth transistor T6 are connected with the active layer 16 of the sixth transistor T6 through two sixth vias V6, respectively. The first electrode 371 (which is also the second electrode 362 of the sixth transistor T6) and the second electrode 372 of the seventh transistor T7 are connected with the active layer 17 of the seventh transistor T7 through two seventh vias V7, respectively. The first electrode 381 and the second electrode 382 of the eighth transistor T8 are respectively connected with the active layer 18 of the eighth transistor T8 through two eighth vias V8. The first electrode 391 and the second electrode 392 (which is also the second electrode 3102 of the tenth transistor T10) of the ninth transistor T9 are connected with the active layer 19 of the ninth transistor T9 through two ninth vias V9, respectively. The first electrode 3101 and the second electrode 3102 (which is also the second electrode 392 of the ninth transistor T9) of the tenth transistor T10 are connected with the active layer 110 of the tenth transistor T10 through two tenth vias V9, respectively. The first electrode 3111 and the second electrode 3112 (which is also the second electrode 3122 of the twelfth transistor T12) of the eleventh transistor T11 are connected with the active layer 111 of the eleventh transistor T11 through two eleventh vias V11, respectively. The first electrode 3121 and the second electrode 3122 (which is also the second electrode 3112 of the eleventh transistor T11) of the twelfth transistor T12 are connected with the active layer 112 of the twelfth transistor T12 through two twelfth vias V12, respectively. The first electrode 3131 and the second electrode 3132 (which is also the second electrode 3142 of the fourteenth transistor T14) of the thirteenth transistor T13 are connected with the active layer 113 of the thirteenth transistor T13 through two thirteenth vias V13, respectively. The first electrode 3141 and the second electrode 3142 (which is also the second electrode 3132 of the thirteenth transistor T13) of the fourteenth transistor T14 are connected with the active layer 114 of the fourteenth transistor T14 through two fourteenth vias V14, respectively.

In an exemplary implementation mode, an orthographic projection of the first clock signal line CLK on the base substrate and an orthographic projection of the control electrode 21 of the first transistor T1 on the base substrate have an overlapping region, and the first clock signal line CLK is connected with the control electrode 21 of the first transistor T1 through the fifteenth via V15; an orthographic projection of the first electrode 331 of the third transistor T3 on the base substrate and an orthographic projection of the control electrode 22 of the second transistor T2 on the base substrate have an overlapping region, and the first electrode 331 of the third transistor T3 may be connected with the control electrode 22 of the second transistor T2 through the sixteenth via V16; an orthographic projection of the second electrode 352 of the fifth transistor T5 on the base substrate and an orthographic projection of the control electrode 23 of the third transistor T3 on the base substrate have an overlapping region, and the second electrode 352 of the fifth transistor T5 may be connected with the control electrode 23 of the third transistor T3 through the seventeenth via V17; an orthographic projection of the second electrode 332 of the third transistor T3 on the base substrate and an orthographic projection of the control electrode 24 of the fourth transistor T4 on the base substrate have an overlapping region, and the second electrode 332 of the third transistor T3 may be connected with the control electrode 24 of the fourth transistor T4 through the eighteenth via V18; an orthographic projection of the first electrode 361 of the sixth transistor T6 on the base substrate and an orthographic projection of the control electrode 27 of the seventh transistor T7 on the base substrate have an overlapping region, and the first electrode 361 of the sixth transistor T6 may be connected with the control electrode 27 of the seventh transistor T7 through the nineteenth via V19; an orthographic projection of the second clock signal line CLKB on the base substrate and an orthographic projection of the control electrode 27 of the seventh transistor T7 on the base substrate have an overlapping region, and the second clock signal line CLKB may be connected with the control electrode 27 of the seventh transistor T7 through the twentieth via V20; an orthographic projection of the fourth connection line CL4 on the base substrate and an orthographic projection of the control electrode 211 of the eleventh transistor T11 on the base substrate have an overlapping region, and the fourth connection line CL4 may be connected with the control electrode 211 of the eleventh transistor T11 through the twenty-first via V21; an orthographic projection of the second electrode of the eleventh transistor T11 on the base substrate and an orthographic projection of the control electrode 213 of the thirteenth transistor T13 on the base substrate have an overlapping region, and the second electrode of the eleventh transistor T11 (which is also the second electrode 3122 of the twelfth transistor T12) may be connected with the control electrode 213 of the thirteenth transistor T13 through the twenty-second via V22; an orthographic projection of the second electrode 392 of the ninth transistor T9 on the base substrate and an orthographic projection of the control electrode 212 of the twelfth transistor T12 on the base substrate have an overlapping region, and the second electrode 392 of the ninth transistor T9 may be connected with the control electrode 212 of the twelfth transistor T12 through the twenty-third via V23; an orthographic projection of the first electrode 391 of the ninth transistor T9 on the base substrate and an orthographic projection of the first power supply line VGH1 on the base substrate have an overlapping region, and the first electrode 391 of the ninth transistor T9 may be connected with the first power supply line VGH1 on the second conductive layer through the twenty-fourth via V24; an orthographic projection of the first electrode 3121 of the twelfth transistor T12 on the base substrate and an orthographic projection of the first power supply line VGH1 on the base substrate have an overlapping region, and the first electrode 3121 of the twelfth transistor T12 may be connected with the first power supply line VGH1 on the second conductive layer through the twenty-fifth via V25; an orthographic projection of the first electrode 3141 of the fourteenth transistor T14 on the base substrate and an orthographic projection of the first power supply line VGH1 on the base substrate have an overlapping region, and the first electrode 3141 of the fourteenth transistor T14 may be connected with the first power supply line VGH1 on the second conductive layer through the twenty-sixth via V26; an orthographic projection of the second electrode 3142 of the fourteenth transistor T14 on the base substrate and an orthographic projection of the second signal output line IEM_OUT on the base substrate have an overlapping region, and the second electrode 3142 of the fourteenth transistor T14 (which is also the second electrode 3132 of the thirteenth transistor T13) may be connected with the second signal output line IEM_OUT through the twenty-seventh via V27; an orthographic projection of the second electrode 382 of the eighth transistor T8 on the base substrate and an orthographic projection of the second connection line CL2 on the base substrate have an overlapping region, and the second electrode 382 of the eighth transistor T8 may be connected with the second connection line CL2 through the twenty-eighth via V28; an orthographic projection of the second electrode 332 of the third transistor T3 on the base substrate and an orthographic projection of the first electrode plate C21 of the second capacitor C2 on the base substrate have an overlapping region, and the second electrode 332 of the third transistor T3 may be connected with the first electrode plate C21 of the second capacitor C2 through the twenty-ninth via V29; an orthographic projection of the fourth connection line CL4 on the base substrate and an orthographic projection of the first electrode plate C31 of the third capacitor C3 on the base substrate have an overlapping region, and the fourth connection line CL4 may be connected with the first electrode plate C31 of the third capacitor C3 through the thirtieth via V30; an orthographic projection of the second electrode 362 of the sixth transistor T6 on the base substrate and an orthographic projection of the second electrode plate C22 of the second capacitor C2 on the base substrate have an overlapping region, and the second electrode 362 of the sixth transistor T6 (which is also the first electrode 371 of the seventh transistor T7) may be connected with the second electrode plate C22 of the second capacitor C2 through the thirty-first via V31; an orthographic projection of the first electrode 391 of the ninth transistor T9 on the base substrate and an orthographic projection of the second electrode plate C32 of the third capacitor C3 on the base substrate have an overlapping region, and the first electrode 391 of the ninth transistor T9 may be connected with the second electrode plate C32 of the third capacitor C3 through the thirty-second via V32; an orthographic projection of the second clock signal line CLKB on the base substrate and an orthographic projection of the second electrode plate C12 of the first capacitor C1 on the base substrate have an overlapping region, and the second clock signal line CLKB may be connected with the second electrode plate C12 of the first capacitor C1 through the thirty-third via V33.

In an exemplary implementation mode, in the first direction X, the initial signal line STV may be located on a side of the second capacitor C2 away from the third capacitor C3, the first clock signal line CLK may be located on a side of the initial signal line STV close to the second capacitor C2, the second clock signal line CLKB may be located on a side of the first clock signal line CLK close to the second capacitor C2, the third power supply line VGH2 may be located on a side of the second clock signal line CLKB close to the second capacitor C2, and the second power supply line VGL may be located on a side of the fourteenth transistor T14 away from the third capacitor C3.

In an exemplary implementation mode, an orthographic projection of the first clock signal line CLK on the base substrate and an orthographic projection of the control electrode 21 of the first transistor T1 on the base substrate have an overlapping region, and the first clock signal line CLK is connected with the control electrode 21 of the first transistor T1 through the fifteenth via V15.

In an exemplary implementation mode, an orthographic projection of the second clock signal line CLKB on the base substrate and orthographic projections of the second electrode plate C12 of the first capacitor C1 and the control electrode 27 of the seventh transistor T7 on the base substrate have an overlapping region, and the second clock signal line CLKB is connected with the control electrode 27 of the seventh transistor T7 through the twentieth via V20 and is connected with the second electrode plate C12 of the first capacitor C1 through the thirty-third via V33.

In an exemplary implementation mode, the initial signal line STV, the signal input line IN, the first clock signal line CLK, the second clock signal line CLKB, the third power supply line VGH2, and the second power supply line VGL may be in a shape of a strip and extend along the second direction Y. The initial signal line STV, the first clock signal line CLK, the second clock signal line CLKB, the third power supply line VGH2, and the second power supply line VGL are sequentially arranged along the first direction X.

In an exemplary implementation mode, the signal input line IN may be in an "L" shape, the signal input line IN may be located on a side of the third power supply line VGH2 away from the second clock signal line CLKB, may be connected with the first electrode 311 of the first transistor T1 at an end close to the third power supply line VGH2, and may be connected with a signal output line EM_OUT in a previous row or an initial signal line STV in a first row at an end away from the third power supply line VGH2.

In an exemplary implementation mode, the first electrode 311 of the first transistor T1 may be of a strip structure extending along the second direction Y. The first electrode 311 of the first transistor T1 may be located between the third power supply line VGH2 and the second electrode 312 of the first transistor T1. The second electrode 312 of the first transistor T1 may be in an "L" shape, is located between the first electrode 311 of the first transistor T1 and the second electrode 352 of the fifth transistor T5, and is connected with the second electrode 352 of the fifth transistor T5 on a side away from the first electrode 311 of the first transistor T1.

In an exemplary implementation mode, the first electrode 321 of the second transistor T2 may be of a strip structure and extend along the second direction Y, and in the first direction X, the first electrode 321 of the second transistor T2 may be located between the second electrode 322 of the second transistor T2 and the first electrode 3101 of the tenth transistor T10, and connected with the first electrode 3101 of the tenth transistor T10 on a side away from the second electrode 322 of the second transistor T2. The second electrode 322 of the second transistor T2 may be in a shape of a broken line extending along the first direction X, and in the first direction X, the second electrode 322 of the second transistor T2 may be located between the first electrode 311 of the third transistor T1 and the first electrode 321 of the second transistor T2, and connected with the second electrode 332 of the third transistor T3 at an end away from the first electrode 321 of the second transistor T2. In the second direction Y, the first electrode 321 of the second transistor T2 and the second electrode 322 of the second transistor T2 may be located between the signal input line IN and the second electrode 382 of the eighth transistor T8.

In an exemplary implementation mode, the first electrode 331 of the third transistor T3 may be of a rectangular structure and located between the second electrode 352 of the fifth transistor T5 and the second electrode 332 of the third transistor T3. The second electrode 332 of the third transistor T3 may be in a shape of a broken line extending along the first direction X, may be located between the third power supply line VGH2 and the third capacitor C3 in the first direction X, may be located between the first capacitor C1 and the second capacitor C2 in the second direction, and connected with the second electrode 322 of the second transistor T2 at an end close to the first capacitor C1.

In an exemplary implementation mode, the first electrode 341 of the fourth transistor T4 may be in an "L" shape and be connected with the third power supply line VGH2, and the second electrode 341 of the fourth transistor T4 may be of a square structure and be connected with the first electrode 351 of the fifth transistor T5. In the second direction Y, the first electrode 341 of the fourth transistor T4 and the second electrode 341 of the fourth transistor T4 may be located between the signal input line IN and the second electrode 332 of the third transistor T3, and in the first direction X, the first electrode 341 of the fourth transistor T4 and the second electrode 342 of the fourth transistor T4 may be located between the third power supply line VGH2 and the second electrode 352 of the fifth transistor T5.

In an exemplary implementation mode, the first electrode 351 of the fifth transistor T5 may be in a "J" shape, the second electrode 352 of the fifth transistor T5 may be in an "L" shape, in the second direction Y, the first electrode 351 of the fifth transistor T5 and the second electrode 352 of the fifth transistor T5 may be located between the signal input line IN and the second electrode 332 of the third transistor T3, and in the first direction X, the first electrode 351 of the fifth transistor T5 and the second electrode 352 of the fifth transistor T5 may be located between the third power supply line VGH2 and the second electrode 332 of the third transistor T3.

In an exemplary implementation mode, the first electrode 361 of the sixth transistor T6 may be in an "L" shape and located between the third power supply line VGH2 and the second electrode 362 of the sixth transistor T6, the second electrode 362 of the sixth transistor T6 be in a shape of a broken line and located between the second electrode 382 of the eighth transistor T8 and the first electrode 361 of the sixth transistor T6.

In an exemplary implementation mode, the first electrode 371 of the seventh transistor T7 and the second electrode 362 of the sixth transistor T6 share a same electrode, which may save wiring space. The second electrode 372 of the seventh transistor T7 may be in an "L" shape, located between the first electrode 371 of the seventh transistor T7 and the second electrode 382 of the eighth transistor T8, and connected with the second electrode 382 of the eighth transistor T8.

In an exemplary implementation mode, the first electrode 381 of the eighth transistor T8 may be in a shape of a broken line extending along the first direction X and located between the second capacitor C2 and the third capacitor C3. The second electrode 382 of the eighth transistor T8 may be in an "n" shape, may be located between the second capacitor C2 and the third capacitor C3 in the first direction X, may be located on a side of the third transistor T3 away from the first capacitor C1 in the second direction Y, and is provided with an opening facing away from a side of the first capacitor C1, and is connected with the second electrode 372 of the seventh transistor T7 on a side away from the first capacitor C1.

In an exemplary implementation mode, the first electrode 391 of the ninth transistor T9 may include a first structure 391-1 and a second structure 391-2 connected with each other, the first structure 391-1 may be in a shape of a strip and extend along the first direction X, with one end connected with the first electrode 381 of the eighth transistor T8, and the other end connected with the second structure 391-2. The second structure 391-2 may be in a "J" shape, may be located between the first structure 391-1 and the fourth connection line CL4, and connected with the first structure 391-1 on a side away from the fourth connection line CL4.

In an exemplary implementation mode, the second electrode 392 of the ninth transistor T9 may include a third structure 392-1 and a fourth structure 392-2 connected with each other, the third structure 392-1 may be in a shape of a strip and extend along the first direction X, located between the second electrode 382 of the eighth transistor T8 and the fourth structure 392-2, and connected with the fourth structure 392-2 at an end close to the fourth structure 392-2; the fourth structure 392-2 may be in a shape of a strip, located between the second electrode 382 of the eighth transistor T8 and the fourth connection line CL4, and connected with the third structure 392-1 on a side close to the second electrode 382 of the eighth transistor T8.

In an exemplary implementation mode, the first electrode 3101 of the tenth transistor T10 may be of a strip structure and extend along the first direction X, be located between the first electrode 321 of the second transistor T2 and the first electrode 3111 of the eleventh transistor T11 in the first direction X, and two ends are connected with the first electrode 321 of the second transistor T2 and the first electrode 3111 of the eleventh transistor T11, respectively.

In an exemplary implementation mode, the second electrode 3102 of the tenth transistor T10 may share one electrode with the second electrode 392 of the ninth transistor T9 so as to save wiring space. In an exemplary implementation mode, in the second direction Y, the signal input line IN, the first electrode 3101 of the tenth transistor T10, the second electrode 3102 of the tenth transistor T10, and the first electrode 391 of the ninth transistor T9 may be sequentially arranged along an opposite direction of the second direction Y.

In an exemplary implementation mode, the first electrode 3111 of the eleventh transistor T11 may be in a shape of a strip and extend along the first direction X, with two ends connected with the first electrode 3101 of the tenth transistor T10 and the first electrode 3131 of the thirteenth transistor T13, respectively. The second electrode 3112 of the eleventh transistor T11 may be in an "L" shape and located on a side of the first electrode 3111 of the eleventh transistor T11 away from the signal input line IN.

In an exemplary implementation mode, the first electrode 3121 of the twelfth transistor T12 may be in an "L" shape, located between the fourth connection line CL4 and the second electrode 3142 of the fourteenth transistor T14, and connected with the second electrode 3142 of the fourteenth transistor T14. The second electrode 3122 of the twelfth transistor T12 may share one electrode with the second electrode 3112 of the eleventh transistor T11 so as to save wiring space.

In an exemplary implementation mode, the first electrode 3131 of the thirteenth transistor T13 may be of a strip structure and extend along the first direction X, with one end connected with the first electrode 3111 of the eleventh transistor T11 and the other end connected with the second power supply line VGL. The second electrode 3132 of the thirteenth transistor T13 may include a fifth structure 3132-1 and a sixth structure 3132-2 connected with each other. The fifth structure 3132-1 may be of a strip structure and extend along the first direction X, located between the first electrode 3131 of the thirteenth transistor T13 and the first electrode 3141 of the fourteenth transistor T14. The sixth structure 3132-2 may be in an "L" shape, may be located between the first electrode 3141 of the fourteenth transistor T14 and the second power supply line VGL in the first direction X, may be located on a side of the first electrode 3131 of the thirteenth transistor T13 away from the signal input line IN in the second direction Y, and connected with the fifth structure 3132-1 on a side close to the first electrode 3131 of the thirteenth transistor T13.

In an exemplary implementation mode, the first electrode 3141 of the fourteenth transistor T14 may be in an "L" shape, may be located between the first electrode 3121 of the twelfth transistor T12 and the second power supply line VGL in the first direction X, and connected with the first electrode 3121 of the twelfth transistor T12 on a side away from the second power supply line VGL. In an exemplary implementation mode, the second electrode 3142 of the fourteenth transistor T14 and the second electrode 3132 of the thirteenth transistor T13 may share one electrode so as to save wiring space.

In an exemplary implementation mode, the fourth connection line CL4 may be of a broken line structure and extend along the second direction Y, may be located between the second electrode 392 of the ninth transistor T9 and the second electrode 3112 of the eleventh transistor T11 in the first direction X, may be located on a side of the first electrode 3111 of the eleventh transistor T11 away from the signal input line IN in the second direction Y, may be connected with the control electrode 211 of the eleventh transistor T11 at an end close to the first electrode 3111 of the eleventh transistor T11 through the twenty-first via V21, and may be connected with the first electrode plate C31 of the third capacitor C3 at an end away from the first electrode 3111 of the eleventh transistor T11 through the thirtieth via V30.

In an exemplary embodiment, the third conductive thin film may be made of a metal material, such as any one or more of Argentum (Ag), Copper (Cu), Aluminum (Al), Titanium (Ti), and Molybdenum (Mo), or an alloy material of the above metals, such as an Aluminum Neodymium alloy (AlNd) or a Molybdenum Niobium alloy (MoNb), and may be of a single-layer structure or a multi-layer composite structure, such as Ti/Al/Ti.

In an exemplary implementation mode, another preparation process of the display substrate may include following operations.

(201) A pattern of a semiconductor layer is formed on the base substrate. A preparation manner is the same as that in above (101), which will not be repeated here.

Figure 16:
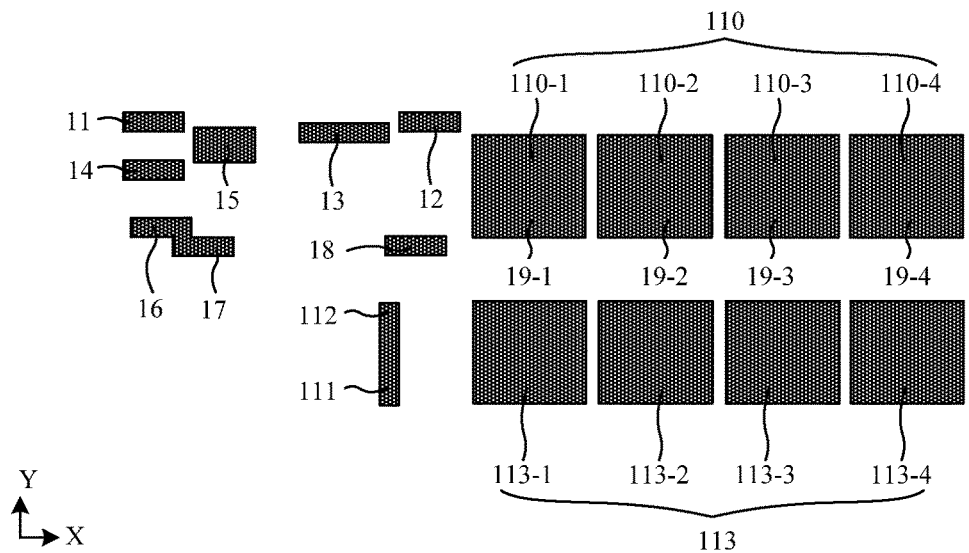
FIG. 16 is a schematic diagram of a display substrate according to an exemplary embodiment of the present disclosure after a pattern of an active layer is formed.

In an exemplary implementation mode, as shown in FIG. 16, the pattern of the semiconductor layer may include active layers of the first transistor T1 to the fourteenth transistor T14. Shapes of the active layers of the first transistor T1 to the fourteenth transistor T14 are the same as shapes of the active layers of the first transistor T1 to the fourteenth transistor T14 in above (101), respectively, a relative positional relationship of active layers of the first transistor T1 to the tenth transistor T10 is the same as that in above (101), and a relative positional relationship of active layers of the eleventh transistor T11 to the fourteenth transistor T14 is the same as that in above (101), which will not be repeated here.

The pattern of the semiconductor layer differs from the pattern of the semiconductor layer formed in above (101) in that in the second direction Y, the active layers of the eleventh transistor T11 to the fourteenth transistor T14 are located on a side of the ninth transistor T9 and the tenth transistor T10, and in the first direction X, active layers of the eleventh transistor T11 and the twelfth transistor T12 are located on a side of active layers of the thirteenth transistor T13 and the fourteenth transistor T14. For example, the active layers of the thirteenth transistor T13 and the fourteenth transistor T14, the ninth transistor T9 and the tenth transistor T10 are arranged along the second direction Y, and the active layers of the eleventh transistor T11 and the twelfth transistor T12 and the active layers of the thirteenth transistor T13 and the fourteenth transistor T14 are arranged along the first direction X. In the second direction Y, the active layer 111 of the eleventh transistor T11 and the active layer 112 of the twelfth transistor T12 are arranged along the second direction Y, and the active layer 113 of the thirteenth transistor T13 and the active layer 114 of the fourteenth transistor T14 are arranged along the second direction Y.

(202) A pattern of a first conductive layer is formed. A preparation manner is the same as that in above (102), which will not be repeated here.

In an exemplary implementation mode, as shown in FIG. 17, FIG. 17a is a schematic diagram after the pattern of the first conductive layer is formed and FIG. 17b is a planar schematic diagram of the first conductive layer in FIG. 17a. The pattern of the first conductive layer differs from the pattern of the first conductive layer formed in above (102) in that control electrodes of the eleventh transistor T11 to the fourteenth transistor T14 are located on a side of the third capacitor C3 away from the first capacitor C1; the control electrode 211 of the eleventh transistor T11 is in an "n" shape and is provided with an opening facing a side of the twelfth transistor T12, a side close to the third capacitor C3 is connected with the second connection line CL2, an orthographic projection of a side away from the third capacitor C3 on the base substrate and the active layer of the eleventh transistor T11 have an overlapping region, and the control electrode 211 of the eleventh transistor T11 is of an integrally formed structure with the second connection line CL2, the control electrode 29 of the ninth transistor T9, and the first electrode plate C31 of the third capacitor C3; control electrodes of the twelfth transistor T12 and the fourteenth transistor T14 are located between the control electrode of the thirteenth transistor T13 and the third capacitor C3. The first power supply line VGH1 is in an "L" shape and located on a side of the third capacitor C3 away from the second capacitor C2. A power supply connection line VCL is added. The power supply connection line VCL is located on a side of the control electrode 23 of the thirteenth transistor T13 away from the control electrode 24 of the fourteenth transistor T14. The power supply connection line VCL may be in an "n" shape and is provided with an opening facing away from a side of the third capacitor C3. The first power supply signal output line EM_OUT and the second power supply signal output line IEM_OUT are not disposed.

(203) A pattern of a second conductive layer is formed. A preparation manner is the same as that in above (102), which will not be repeated here.

In an exemplary implementation mode, as shown in FIGS. 18a and 18b, FIG. 18a is a schematic diagram after the pattern of the second conductive layer is formed and FIG. 18b is a planar schematic diagram of the second conductive layer in FIG. 18a. The pattern of the second conductive layer differs from the pattern of the second conductive layer formed in above (103) in that the first signal output line EM_OUT and the second signal output line IEM_OUT are disposed, in the second direction Y, the first signal output line EM_OUT may be located between the second electrode plate C12 of the first capacitor C1 and the second electrode plate C32 of the third capacitor C3, the second signal output line IEM_OUT may be located on a side of the second electrode plate C32 of the third capacitor C3 away from the second electrode plate C12 of the first capacitor C1, and in the first direction X, the first signal output line EM_OUT and the second signal output line IEM_OUT may be located on a side of the third capacitor C32 away from the second capacitor C2. Both the first signal output line EM_OUT and the second signal output line IEM_OUT may be of a broken line structure extending along the first direction X.

(204) A pattern of a third insulation layer is formed. A preparation manner is the same as that in above (104), which will not be repeated here.

Figure 19:
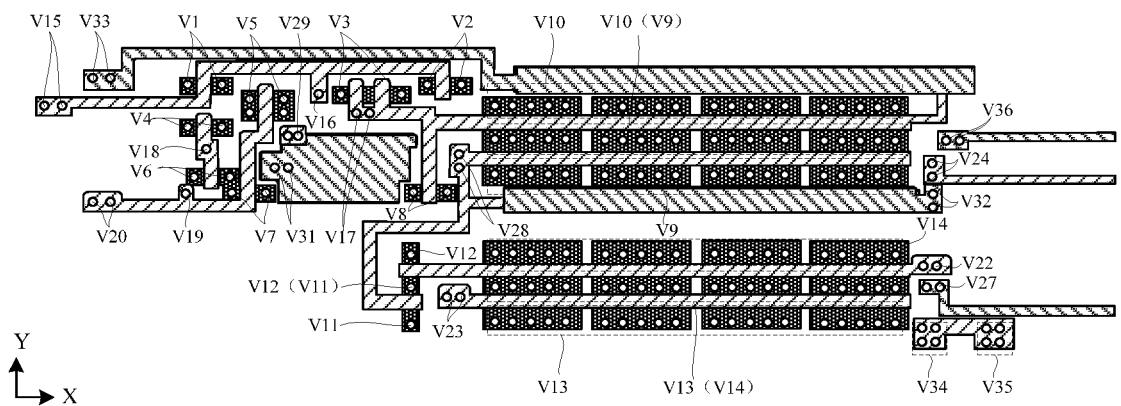
FIG. 19 is a schematic diagram of a display substrate according to the present disclosure after a pattern of a third insulation layer is formed.

In an exemplary implementation mode, as shown in FIG. 19, FIG. 19 is a schematic diagram of a planar structure after the pattern of the third insulation layer is formed. The pattern of the third insulation layer differs from the pattern of the third insulation layer formed in above (104) in that a quantity of the eighteenth via V18 is one, the twenty-fifth via V25 and the twenty-sixth via V26 are not disposed, the twenty-seventh via V27 is disposed to penetrate through the third insulation layer, and the thirty-fourth via V34 to the thirty-sixth via V36 are disposed; the thirty-fourth via V34 to the thirty-fifth via V35 penetrate through the second insulation layer and the third insulation layer to expose the power supply connection line VCL, a quantity of thirty-fourth vias V34 is plural, and a plurality of thirty-fourth vias V34 are arranged in an array; a quantity of thirty-fifth vias V35 is plural, and a plurality of thirty-fifth vias V35 are arranged in an array; the thirty-sixth via V36 penetrates through the third insulation layer to expose the first signal output line EM_OUT, a quantity of thirty-sixth vias V36 may be plural, and a plurality of thirty-sixth vias V36 may be arranged along the first direction X.

(205) A pattern of a third conductive layer is formed. A preparation manner is the same as that in above (105), which will not be repeated here.

In an exemplary implementation mode, as shown in FIGS. 20a and 20b, FIG. 20a is a schematic diagram after the pattern of the third conductive layer is formed and FIG. 20b is a planar schematic diagram of the third conductive layer in FIG. 20a. The pattern of the third conductive layer differs from the pattern of the third conductive layer formed in above (105) in that first electrodes and second electrodes of the eleventh transistor T11 to the fourteenth transistor T14 are located on a side of the ninth transistor T9 away from the tenth transistor T10, the first electrode 3121 of the twelfth transistor T12 and the first electrode 3141 of the fourteenth transistor T14 are located between the first electrode 391 of the ninth transistor T9 and the second electrode 3142 of the fourteenth transistor T14 (which is also the second electrode 3132 of the thirteenth transistor T13), and the second electrode 3142 of the fourteenth transistor T14 is located between the first electrode 3141 of the fourteenth transistor T14, and the first electrode 3131 of the thirteenth transistor T13 and the first electrode 3111 of the eleventh transistor T11, the first electrode 3121 of the twelfth transistor T12 is of a strip structure extending along the first direction x, with one end connected with the third power supply line VGH2 and the other end connected with the first electrode 3141 of the fourteenth transistor T14; the first electrode 3141 of the fourteenth transistor T14 is of a strip structure extending along the first direction X, with one end connected with the first electrode 3121 of the twelfth transistor T12, and the other end may be independently disposed; the first electrode 3111 of the eleventh transistor T11 is of a strip structure extending along the first direction X, one end close to the first electrode 3131 of the thirteenth transistor T13 is connected with the first electrode 3131 of the thirteenth transistor T13, and one end away from the first electrode 3131 of the thirteenth transistor T13 may be independently disposed; the first electrode 3131 of the thirteenth transistor T13 may include a seventh structure 3131-1 and an eighth structure 3131-2, the seventh structure 3131-1 may be of a strip structure extending along the first direction X, with one end connected with the first electrode 311 of the eleventh transistor T11 and the other end connected with the eighth structure 3131-2, the eighth structure 3131-2 may be of a square structure and integrally formed with the seventh structure 3131-1, an orthographic projection of the eighth structure 3131-2 on the base substrate and an orthographic projection of the power supply connection line VCL on the base substrate have an overlapping region, and is connected with the first power supply line VCL through the thirty-fourth via V34; the second electrode 3132 of the thirteenth transistor T13 (which is also the second electrode 3142 of the fourteenth transistor T14) may be of a strip structure extending along the first direction X. The first electrode 391 of the ninth transistor T9 further includes a ninth structure 392-3, the ninth structure 392-3 may be of a strip structure extending along the first direction X and connected with a side of the fourth structure 392-2 away from the second power supply line VGL, and in the second direction Y, the ninth structure 392-3 may be located on a side of the second electrode 3132 of the thirteenth transistor T13 away from the first electrode 3131 of the thirteenth transistor T13, an orthographic projection of the ninth structure 392-3 on the base substrate and an orthographic projection of the control electrode 214 of the fourteenth transistor T14 on the base substrate have an overlapping region, and may be connected with the control electrode 214 of the fourteenth transistor T14 through the twenty-second via V22; an orthographic projection of the fourth structure 392-2 in the second electrode 392 of the ninth transistor T9 on the base substrate and an orthographic projection of the first signal output line EM_OUT on the base substrate have an overlapping region and may be connected with the first signal output line EM_OUT through the thirty-sixth via V36. An orthographic projection of the second power supply line VGL on the base substrate and an orthographic projection of the power supply connection line VCL on the base substrate have an overlapping region, and may be connected with the power supply connection line VCL through the thirty-fifth via V35.

The present disclosure also provides a display apparatus, including a display substrate. The display substrate is the display substrate according to any one of the above embodiments, and an implementation principle and an implementation effect are similar, which will not be repeated here.

In an exemplary implementation mode, the display apparatus may be a Liquid Crystal Display (LCD for short) or an Organic Light Emitting Diode (OLED for short) display apparatus. The display apparatus may be any product or component with a display function, such as a liquid crystal panel, electronic paper, an OLED panel, an Active-Matrix Organic Light Emitting Diode (AMOLED for short) panel, a mobile phone, a tablet computer, a television, a display, a notebook computer, a digital photo frame, or a navigator.

An embodiment of the present disclosure also provides a drive method of a shift register, which is configured to drive the shift register of any one of the above embodiments, the method may include following operations.

A first control sub-circuit provides a signal of a signal input terminal to a first node under control of a first clock signal terminal, a second clock signal terminal, a second node, and a first power supply terminal, and maintains a potential of the first node.

A second control sub-circuit provides a signal of a second power supply terminal or the first clock signal terminal to a second node under control of the first clock signal terminal and the first node.

A third control sub-circuit provides a signal of a second clock signal terminal or the first power supply terminal to a fourth node under control of the second clock signal terminal, the first node, and the second node, and maintains a potential of the fourth node.

A first output sub-circuit provides a signal of the first power supply terminal or the second power supply terminal to a first signal output terminal under control of the first node and the fourth node.

A second output sub-circuit provides a signal of the first power supply terminal or the second power supply terminal to a second signal output terminal under control of the third control sub-circuit and the first signal output terminal.

In a shift register, a drive method thereof, a display substrate, and a display apparatus according to the embodiments of the present disclosure, the shift register includes a first control sub-circuit, a second control sub-circuit, a third control sub-circuit, a first output sub-circuit, and a second output sub-circuit, the first output sub-circuit may provide a signal of a first power supply terminal or a second power supply terminal to a first signal output terminal under control of a first node and a fourth node; the second output sub-circuit may provide a signal of the first power supply terminal or the second power supply terminal to a second signal output terminal under control of the third control sub-circuit and the first signal output terminal, the first sub-output circuit and the second sub-output circuit output signals to the first signal output terminal and the second signal output terminal, respectively, which may satisfy a demand for different signals and overcome a problem of being unable to satisfy a demand for different signals in practical applications.

The drawings of the embodiments of the present disclosure only involve structures involved in the embodiments of the present disclosure, and other structures may refer to usual designs.

The embodiments of the present disclosure, that is, features in the embodiments, may be combined with each other to obtain new embodiments if there is no conflict.

Although implementation modes disclosed in the embodiments of the present disclosure are described above, contents are only implementation modes for facilitating understanding the embodiments of the present disclosure, which are not intended to limit the embodiments of the present disclosure. Any person skilled in the art to which the embodiments of the present disclosure pertain may make any modification and variation in forms and details of implementation without departing from the spirit and scope disclosed in the embodiments of the present disclosure. Nevertheless, the scope of patent protection of the embodiments of the present disclosure shall still be subject to the scope defined in the appended claims.

The invention claimed is:

1. A shift register, comprising a first control sub-circuit, a second control sub-circuit, a third control sub-circuit, a first output sub-circuit, and a second output sub-circuit;

the first control sub-circuit is respectively connected with a signal input terminal, a first node, a second node, a first clock signal terminal, a second clock signal terminal, and a first power supply terminal, and is configured to provide a signal of the signal input terminal to the first node under control of signals from the first clock signal terminal, the second clock signal terminal, the second node, and the first power supply terminal and maintain a potential of the first node;

the second control sub-circuit is respectively connected with a second power supply terminal, the first clock signal terminal, the first node, and the second node, and is configured to provide a signal of the second power supply terminal or the first clock signal terminal to the second node under control of signals from the first clock signal terminal and the first node;

the third control sub-circuit is respectively connected with the first node, the second node, a fourth node, the second clock signal terminal, and the first power supply terminal, and is configured to provide a signal of the second clock signal terminal or the first power supply terminal to the fourth node under control of signals from the second clock signal terminal, the first node, and the second node and maintain a potential of the fourth node;

the first output sub-circuit is respectively connected with the first power supply terminal, the second power supply terminal, the first node, the fourth node, and a first signal output terminal, and is configured to provide a signal of the first power supply terminal or the second power supply terminal to the first signal output terminal under control of signals from the first node and the fourth node; and the second output sub-circuit is connected with the first signal output terminal, the third control sub-circuit, the first power supply terminal, the second power supply terminal, and a second signal output terminal, respectively, and is configured to provide a signal of the first power supply terminal or the second power supply terminal to the second signal output terminal under control of signals from the third control sub-circuit and the first signal output terminal.

2. The shift register according to claim 1, wherein the first control sub-circuit comprises a first transistor, a fourth transistor, a fifth transistor, and a first capacitor, and the first capacitor comprises a first electrode plate and a second electrode plate;

a control electrode of the first transistor is connected with the first clock signal terminal, a first electrode of the first transistor is connected with the signal input terminal, and a second electrode of the first transistor is connected with the first node;

a control electrode of the fourth transistor is connected with the second node, a first electrode of the fourth transistor is connected with the first power supply terminal, and a second electrode of the fourth transistor is connected with a seventh node;

a control electrode of the fifth transistor is connected with the second clock signal terminal, a first electrode of the fifth transistor is connected with the seventh node, and a second electrode of the fifth transistor is connected with the first node;

the first electrode plate of the first capacitor is connected with the first node, and the second electrode plate of the first capacitor is connected with the second clock signal terminal, or, the first control sub-circuit comprises a first transistor, a fourth transistor, a fifth transistor, a first capacitor, and a fourth capacitor, the first capacitor comprises a first electrode plate and a second electrode plate, and the fourth capacitor comprises a first electrode plate and a second electrode plate;

a control electrode of the first transistor is connected with the first clock signal terminal, a first electrode of the first transistor is connected with the signal input terminal, and a second electrode of the first transistor is connected with the first node;

a control electrode of the fourth transistor is connected with the second node, a first electrode of the fourth transistor is connected with the first power supply terminal, and a second electrode of the fourth transistor is connected with a seventh node;

a control electrode of the fifth transistor is connected with the first node, a first electrode of the fifth transistor is connected with the second clock signal terminal, and a second electrode of the fifth transistor is connected with the seventh node;

the first electrode plate of the first capacitor is connected with the first node, and the second electrode plate of the first capacitor is connected with the first signal output terminal;

the first electrode plate of the fourth capacitor is connected with the seventh node, and the second electrode plate of the fourth capacitor is connected with the first node, or, the first control sub-circuit comprises a first transistor, a fourth transistor, a fifth transistor, and a first capacitor, and the first capacitor comprises a first electrode plate and a second electrode plate; the second control sub-circuit comprises a second transistor and a third transistor; the third control sub-circuit comprises a sixth transistor, a seventh transistor, an eighth transistor, a second capacitor, and a third capacitor; the first output sub-circuit comprises a ninth transistor and a tenth transistor; the second output sub-circuit comprises an eleventh transistor, a twelfth transistor, a thirteenth transistor, and a fourteenth transistor;

a control electrode of the first transistor is connected with the first clock signal terminal, a first electrode of the first transistor is connected with the signal input terminal, and a second electrode of the first transistor is connected with the first node;

a control electrode of the second transistor is connected with the first clock signal terminal, a first electrode of the second transistor is connected with the second power supply terminal, and a second electrode of the second transistor is connected with the second node;

a control electrode of the third transistor is connected with the first node, a first electrode of the third transistor is connected with the first clock signal terminal, and a second electrode of the third transistor is connected with the second node;

a control electrode of the fourth transistor is connected with the second node, a first electrode of the fourth transistor is connected with the first power supply terminal, and a second electrode of the fourth transistor is connected with a seventh node;

a control electrode of the fifth transistor is connected with the second clock signal terminal, a first electrode of the fifth transistor is connected with the seventh node, and a second electrode of the fifth transistor is connected with the first node;

a control electrode of the sixth transistor is connected with the second node, a first electrode of the sixth transistor is connected with the second clock signal terminal, and a second electrode of the sixth transistor is connected with a third node;

a control electrode of the seventh transistor is connected with the second clock signal terminal, a first electrode of the seventh transistor is connected with the third node, and a second electrode of the seventh transistor is connected with the fourth node;

a control electrode of the eighth transistor is connected with the first node, a first electrode of the eighth transistor is connected with the first power supply terminal, and a second electrode of the eighth transistor is connected with the fourth node;

a control electrode of the ninth transistor is connected with the fourth node, a first electrode of the ninth transistor is connected with the first power supply terminal, and a second electrode of the ninth transistor is connected with the first signal output terminal;

a control electrode of the tenth transistor is connected with the first node, a first electrode of the tenth transistor is connected with the second power supply terminal, and a second electrode of the tenth transistor is connected with the first signal output terminal;

a control electrode of the eleventh transistor is connected with the third node or the fourth node, a first electrode of the eleventh transistor is connected with the second power supply terminal, and a second electrode of the eleventh transistor is connected with a sixth node;

a control electrode of the twelfth transistor is connected with the first signal output terminal, a first electrode of the twelfth transistor is connected with the first power supply terminal, and a second electrode of the twelfth transistor is connected with the sixth node;

a control electrode of the thirteenth transistor is connected with the sixth node, a first electrode of the thirteenth transistor is connected with the second power supply terminal, and a second electrode of the thirteenth transistor is connected with the second signal output terminal;

a control electrode of the fourteenth transistor is connected with the first signal output terminal, a first electrode of the fourteenth transistor is connected with the first power supply terminal, and a second electrode of the fourteenth transistor is connected with the second signal output terminal;

the first electrode plate of the first capacitor is connected with the first node, and the second electrode plate of the first capacitor is connected with the second clock signal terminal;

a first electrode plate of the second capacitor is connected with the second node, and a second electrode plate of the second capacitor is connected with the third node;

a first electrode plate of the third capacitor is connected with the fourth node, and a second electrode plate of the third capacitor is connected with the first power supply terminal.

3. The shift register according to claim 1, wherein the second control sub-circuit comprises a second transistor and a third transistor;

a control electrode of the second transistor is connected with the first clock signal terminal, a first electrode of the second transistor is connected with the second power supply terminal, and a second electrode of the second transistor is connected with the second node;

a control electrode of the third transistor is connected with the first node, a first electrode of the third transistor is connected with the first clock signal terminal, and a second electrode of the third transistor is connected with the second node.

4. The shift register according to claim 1, wherein the third control sub-circuit comprises a sixth transistor, a seventh transistor, an eighth transistor, a second capacitor, and a third capacitor;

a control electrode of the sixth transistor is connected with the second node, a first electrode of the sixth transistor is connected with the second clock signal terminal, and a second electrode of the sixth transistor is connected with a third node;

a control electrode of the seventh transistor is connected with the second clock signal terminal, a first electrode of the seventh transistor is connected with the third node, and a second electrode of the seventh transistor is connected with the fourth node;

a control electrode of the eighth transistor is connected with the first node, a first electrode of the eighth transistor is connected with the first power supply terminal, and a second electrode of the eighth transistor is connected with the fourth node;

a first electrode plate of the second capacitor is connected with the second node, and a second electrode plate of the second capacitor is connected with the third node;

a first electrode plate of the third capacitor is connected with the fourth node, and a second electrode plate of the third capacitor is connected with the first power supply terminal.

5. The shift register according to claim 1, wherein the first output sub-circuit comprises a ninth transistor and a tenth transistor;

a control electrode of the ninth transistor is connected with the fourth node, a first electrode of the ninth transistor is connected with the first power supply terminal, and a second electrode of the ninth transistor is connected with the first signal output terminal;

a control electrode of the tenth transistor is connected with the first node, a first electrode of the tenth transistor is connected with the second power supply terminal, and a second electrode of the tenth transistor is connected with the first signal output terminal.

6. The shift register according to claim 1, wherein the second output sub-circuit comprises an eleventh transistor, a twelfth transistor, a thirteenth transistor, and a fourteenth transistor;

a control electrode of the eleventh transistor is connected with the third control sub-circuit, a first electrode of the eleventh transistor is connected with the second power supply terminal, and a second electrode of the eleventh transistor is connected with a sixth node;

a control electrode of the twelfth transistor is connected with the first signal output terminal, a first electrode of the twelfth transistor is connected with the first power supply terminal, and a second electrode of the twelfth transistor is connected with the sixth node;

a control electrode of the thirteenth transistor is connected with the sixth node, a first electrode of the thirteenth transistor is connected with the second power supply terminal, and a second electrode of the thirteenth transistor is connected with the second signal output terminal;

a control electrode of the fourteenth transistor is connected with the first signal output terminal, a first electrode of the fourteenth transistor is connected with the first power supply terminal, and a second electrode of the fourteenth transistor is connected with the second signal output terminal.

7. The shift register according to claim 6, wherein the second output sub-circuit further comprises a fifth capacitor, and the fifth capacitor comprises a first electrode plate and a second electrode plate;

the first electrode plate of the fifth capacitor is connected with the sixth node, and the second electrode plate of the fifth capacitor is connected with the first clock signal terminal or the second clock signal terminal.

8. A drive method of a shift register, configured to drive the shift register according to claim 1, wherein the method comprises:

providing, by a first control sub-circuit, a signal of a signal input terminal to a first node under control of signals from a first clock signal terminal, a second clock signal terminal, a second node, and a first power supply terminal and maintaining a potential of the first node;

providing, by a second control sub-circuit, a signal of a second power supply terminal or the first clock signal terminal to a second node under control of signals from the first clock signal terminal and the first node;

providing, by a third control sub-circuit, a signal of the second clock signal terminal or the first power supply terminal to a fourth node under control of signals from the second clock signal terminal, the first node, and the second node and maintaining a potential of the fourth node;

providing, by a first output sub-circuit, a signal of the first power supply terminal or the second power supply terminal to a first signal output terminal under control of signals from the first node and the fourth node; and providing, by a second output sub-circuit, a signal of the first power supply terminal or the second power supply terminal to a second signal output terminal under control of signals from the third control sub-circuit and the first signal output terminal.

9. A display substrate, comprising a base substrate and a circuit structure layer disposed on the base substrate, the circuit structure layer comprises a light emitting drive circuit, and the light emitting drive circuit comprises a plurality of cascaded shift registers;

a first signal output terminal of a shift register in an i-th stage is electrically connected with a signal input terminal of a shift register in an (i+1)-th stage, wherein 1≤i≤M−1 and M is a total number of stages of the shift registers;

at least one shift register comprises a first control sub-circuit, a second control sub-circuit, a third control sub-circuit, a first output sub-circuit, and a second output sub-circuit;

the first control sub-circuit is respectively connected with a signal input terminal, a first node, a second node, a first clock signal terminal, a second clock signal terminal, and a first power supply terminal, and is configured to provide a signal of the signal input terminal to the first node under control of signals from the first clock signal terminal, the second clock signal terminal, the second node, and the first power supply terminal and maintain a potential of the first node;

the second control sub-circuit is respectively connected with a second power supply terminal, the first clock signal terminal, the first node, and the second node, and is configured to provide a signal of the second power supply terminal or the first clock signal terminal to the second node under control of signals from the first clock signal terminal and the first node;

the third control sub-circuit is respectively connected with the first node, the second node, a fourth node, the second clock signal terminal, and the first power supply terminal, and is configured to provide a signal of the second clock signal terminal or the first power supply terminal to the fourth node under control of signals from the second clock signal terminal, the first node, and the second node and maintain a potential of the fourth node;

the first output sub-circuit is respectively connected with the first power supply terminal, the second power supply terminal, the first node, the fourth node, and the first signal output terminal, and is configured to provide a signal of the first power supply terminal or the second power supply terminal to the first signal output terminal under control of signals from the first node and the fourth node;

the second output sub-circuit is connected with the first signal output terminal, the third control sub-circuit, the first power supply terminal, the second power supply terminal, and the second signal output terminal, respectively, and is configured to provide a signal of the first power supply terminal or the second power supply terminal to the second signal output terminal under control of signals from the third control sub-circuit and the first signal output terminal.

10. The display substrate according to claim 9, further comprising: an initial signal line, a first clock signal line, a second clock signal line, a second power supply line, and a third power supply line extending along a second direction, the initial signal line, the first clock signal line, the second clock signal line, the third power supply line, and the second power supply line are arranged along a first direction, and the first direction intersects with the second direction;

a signal input terminal of a shift register in a first stage is electrically connected with the initial signal line, first power supply terminals of all shift registers are electrically connected with the third power supply line, second power supply terminals of all shift registers are electrically connected with the second power supply line, first clock signal terminals of shift registers in odd-numbered stages are connected with the first clock signal line, second clock signal terminals of shift registers in odd-numbered stages are connected with the second clock signal line, first clock signal terminals of shift registers in even-numbered stages are connected with the second clock signal line, and second clock signal terminals of shift registers in even-numbered stages are connected with the first clock signal line.

11. The display substrate according to claim 10, wherein the circuit structure layer comprises: a semiconductor layer, a first insulation layer, a first conductive layer, a second insulation layer, a second conductive layer, a third insulation layer, and a third conductive layer which are sequentially stacked on the base substrate;

the semiconductor layer comprises: active layers of all transistors located in the light emitting drive circuit;

the first conductive layer comprises: control electrodes of all transistors and a first electrode plate of a first capacitor to a first electrode plate of a third capacitor located in the light emitting drive circuit;

the second conductive layer comprises a second electrode plate of the first capacitor to a second electrode plate of the third capacitor located in the light emitting drive circuit;

the third conductive layer comprises an initial signal line, a first clock signal line, a second clock signal line, a first power supply line, and a second power supply line.

12. The display substrate according to claim 11, wherein the shift register comprises: a first transistor to a fourteenth transistor;

in a plane where the display substrate is located, in the first direction, all transistors and capacitors are located between the third power supply line and the second power supply line, a second capacitor is located between the third power supply line and an eighth transistor, the eighth transistor is located between the second capacitor and a ninth transistor and a tenth transistor, the ninth transistor and the tenth transistor are located between the eighth transistor and, an eleventh transistor and a twelfth transistor, the eleventh transistor and the twelfth transistor are located between the ninth transistor and the tenth transistor and a thirteenth transistor and the fourteenth transistor, and the thirteenth transistor and the fourteenth transistor are located between the eleventh transistor and the twelfth transistor and the second power supply line; in the second direction, the third capacitor, the ninth transistor, the tenth transistor, and the first capacitor are sequentially arranged along the second direction, the twelfth transistor and the eleventh transistor are sequentially arranged along the second direction, and the fourteenth transistor and the thirteenth transistor are sequentially arranged along the second direction.

13. The display substrate according to claim 12, wherein the third conductive layer further comprises a signal input line, the signal input line is in a shape of a broken line and extends along the first direction, the signal input line is located between the third power supply line and the second power supply line in the first direction in a plane where the third conductive layer is located; in the second direction, the signal input line is located on a side of the tenth transistor away from the ninth transistor;

in a plane where the second conductive layer is located, a second electrode plate of the second capacitor and the first electrode plate of the third capacitor are arranged along the first direction, and in the second direction, the second electrode plate of the second capacitor and the second electrode plate of the third capacitor are located on a same side of the second electrode plate of the first capacitor;

the second electrode plate of the first capacitor is in a shape of a broken line and extends along the first direction, and an orthographic projection of the second electrode plate of the first capacitor on the base substrate and an orthographic projection of the first electrode plate of the first capacitor on the base substrate have an overlapping region; the second electrode plate of the second capacitor is in a square shape, and an orthographic projection of the second electrode plate of the second capacitor on the base substrate and an orthographic projection of the first electrode plate of the second capacitor on the base substrate have an overlapping region; the second electrode plate of the third capacitor is in a shape of a strip and extends along the first direction, and an orthographic projection of the second electrode plate of the third capacitor on the base substrate and an orthographic projection of the first electrode plate of the third capacitor on the base substrate have an overlapping region, or, any one of the ninth transistor, the tenth transistor, the thirteenth transistor, and the fourteenth transistor comprises four sub-transistors connected in parallel with each other, and in any one of the transistors, active layers of the four sub-transistors are disposed independently of each other, control electrodes of the four sub-transistors are of an integrally formed structure, first electrodes of the four sub-transistors are of an integrally formed structure, second electrodes of the four sub-transistors are of an integrally formed structure, or, in the plane where the display substrate is located, in the first direction, the first transistor and the fourth transistor to the seventh transistor are located between the third power supply line and the second capacitor, and the second transistor and the third transistor are located between the fifth transistor and the first capacitor, or, the third conductive layer comprises first electrodes and second electrodes of the first transistor to the fourteenth transistor, a second electrode of the sixth transistor and a first electrode of the seventh transistor share one electrode, a second electrode of the ninth transistor and a second electrode of the tenth transistor share one electrode, and a second electrode of the thirteenth transistor and a second electrode of the fourteenth transistor share one electrode.

14. The display substrate according to claim 12, wherein the first conductive layer further comprises the first power supply line, the first power supply line is connected with the first power supply terminal; the first power supply line is in a shape of a broken line and extends along the first direction;

on a plane parallel to the display substrate, in the first direction, the first power supply line is located on a side of the third capacitor away from a control electrode of the eighth transistor; in the second direction, the first power supply line is located on a side of a control electrode of the fourteenth transistor away from a control electrode of the thirteenth transistor.

15. The display substrate according to claim 14, wherein the first conductive layer further comprises a first signal output line and a second signal output line; the first signal output line is in a shape of a strip and extends along the first direction, and the second signal output line is in an "L" shape;

in a plane where the first conductive layer is located, in the second direction, the first signal output line is located between the control electrode of the thirteenth transistor and the first power supply line, the first signal output line and the control electrode of the fourteenth transistor are of an integrally formed structure, and the second signal output line is located on a side of the first power supply line away from the first signal output line; in the first direction, the first signal output line is located on a side of the control electrode of the fourteenth transistor away from a control electrode of the twelfth transistor, and the second signal output line is located on a side of the first electrode plate of the third capacitor away from the control electrode of the eighth transistor.

16. The display substrate according to claim 15, wherein the first conductive layer further comprises a second connection line, the second connection line, the first electrode plate of the third capacitor, a control electrode of the ninth transistor are of an integrally formed structure, and a control electrode of the eleventh transistor is in an "L" shape;

the third conductive layer further comprises a fourth connection line, and first electrodes and second electrodes of the first transistor to the fourteenth transistor, the fourth connection line is in a shape of a broken line and extends along the second direction, and an orthographic projection of the fourth connection line on the base substrate is at least partially overlapped with orthographic projections of the control electrode of the eleventh transistor and the first electrode plate of the third capacitor on the base substrate, respectively;

a second electrode of the ninth transistor comprises a third structure and a fourth structure connected with each other, the third structure is in a shape of a strip and extends along the first direction, and is located between a second electrode of the eighth transistor and the fourth connection line, and is connected with the fourth structure at an end close to the fourth connection line; the fourth structure is in a shape of a strip and extends along the second direction, and one end close to the third structure is connected with the third structure.

17. The display substrate according to claim 11, wherein the shift register comprises: a first transistor to a fourteenth transistor;

in a plane where the display substrate is located, in the first direction, all transistors and capacitors are located between the third power supply line and the second power supply line, a second capacitor is located between the third power supply line and an eighth transistor, the eighth transistor is located between the second capacitor and, a ninth transistor and a tenth transistor, the ninth transistor and the tenth transistor are located between the eighth transistor and the second power supply line, an eleventh transistor and a twelfth transistor are located between the third power supply line and, a thirteenth transistor and the fourteenth transistor, and the thirteenth transistor and the fourteenth transistor are located between the eleventh transistor and the twelfth transistor and the second power supply line; in the second direction, the thirteenth transistor, the fourteenth transistor, the third capacitor, the ninth transistor, the tenth transistor, and the first capacitor are sequentially arranged along the second direction.

18. The display substrate according to claim 17, wherein the first conductive layer further comprises a first power supply line, the first power supply line is connected with the first power supply terminal; the first power supply line is in an "L" shape;

in a plane where the first conductive layer is located, in the first direction, the first power supply line is located on a side of the first electrode plate of the third capacitor away from a first electrode plate of the second capacitor; in the second direction, the first power supply line is located between a control electrode of the fourteenth transistor and the first electrode plate of the first capacitor.

19. The display substrate according to claim 18, wherein the first conductive layer further comprises a power supply connection line, and the second conductive layer further comprises a first signal output line and a second signal output line; the first signal output line and the second signal output line are both in a shape of a broken line extending along the first direction;

in a plane where the second conductive layer is located, in the second direction, the first signal output line is located between a second electrode plate of the first capacitor and a second electrode plate of the third capacitor, and the second signal output line is located on a side of the second electrode plate of the third capacitor away from the second electrode plate of the first capacitor; in the first direction, both the first signal output line and the second signal output line are located on a side of the second electrode plate of the third capacitor away from a second electrode plate of the second capacitor;

the power supply connection line is in an "n" shape, in the second direction, the power supply connection line is located on a side of a control electrode of the thirteenth transistor away from a control electrode of the fourteenth transistor, and is provided with an opening facing away from a side of the thirteenth transistor; an orthographic projection of the power supply connection line on the base substrate is at least partially overlapped with orthographic projections of the second power supply line and a first electrode of the thirteenth transistor on the base substrate, respectively, or, the first conductive layer further comprises a second connection line, the second connection line is integrally formed with the first electrode plate of the third capacitor, a control electrode of the ninth transistor, and a control electrode of the eleventh transistor, the control electrode of the eleventh transistor is in an "n" shape and is provided with an opening facing a side of the twelfth transistor;

the third conductive layer further comprises first electrodes and second electrodes of the first transistor to the fourteenth transistor, a second electrode of the ninth transistor comprises a third structure, a fourth structure, and a ninth structure connected with each other, the third structure is in a shape of a strip and extends along the first direction, is located between a second electrode of the eighth transistor and the second power supply line, and is connected with the fourth structure at an end close to the second power supply line; the fourth structure is in a shape of a strip, is located on a side of the second power supply line close to the third power supply line, extends along the second direction, and one end close to the third structure is connected with the third structure; the ninth structure is in a shape of a strip and is located on a side of the fourth structure away from the second power supply line, and an orthographic projection of the fourth structure on the base substrate is at least partially overlapped with an orthographic projection of a control electrode of the fourth transistor on the base substrate.

20. A display apparatus, comprising a display substrate according to claim 12.

* * * * *

UNITED STATES PATENT AND TRADEMARK OFFICE
CERTIFICATE OF CORRECTION

PATENT NO. : 12,456,533 B2  
APPLICATION NO. : 18/689081  
DATED : October 28, 2025  
INVENTOR(S) : Wang et al.

Page 1 of 1

It is certified that error appears in the above-identified patent and that said Letters Patent is hereby corrected as shown below:

In the Claims

Column 88, Line 63, Claim 20, should be as shown below:
20. A display apparatus, comprising a display substrate according to claim 9.

Signed and Sealed this  
Ninth Day of December, 2025

John A. Squires  
*Director of the United States Patent and Trademark Office*